United States Patent
Tsubata

(10) Patent No.: US 8,847,352 B2
(45) Date of Patent: Sep. 30, 2014

(54) ACTIVE MATRIX DEVICE INCLUDING FIRST AND SECOND CAPACITOR ELECTRODES AND MULTIPLE CAPACITORS

(75) Inventor: Toshihide Tsubata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 705 days.

(21) Appl. No.: 13/124,705

(22) PCT Filed: Jul. 9, 2009

(86) PCT No.: PCT/JP2009/062546
§ 371 (c)(1),
(2), (4) Date: Apr. 18, 2011

(87) PCT Pub. No.: WO2010/052954
PCT Pub. Date: May 14, 2010

(65) Prior Publication Data
US 2011/0205200 A1 Aug. 25, 2011

(30) Foreign Application Priority Data

Nov. 5, 2008 (JP) .................. 2008-284806

(51) Int. Cl.
*H01L 21/22* (2006.01)
*G02F 1/1362* (2006.01)
*G09G 3/36* (2006.01)
*G02F 1/1343* (2006.01)

(52) U.S. Cl.
CPC .............. *G02F 1/136213* (2013.01); *G02F 2001/134354* (2013.01); *G02F 2001/134345* (2013.01); *G09G 2300/0876* (2013.01); *G09G 2300/0447* (2013.01); *G02F 1/136259* (2013.01); *G09G 2300/0426* (2013.01); *G09G 3/3648* (2013.01); *G09G 2330/08* (2013.01)
USPC ......................................... 257/532; 257/390

(58) Field of Classification Search
CPC .............. G02F 1/136213; G02F 2001/134354; G02F 1/134309; G02F 1/136209; G02F 2201/123; G02F 2001/134345; G02F 1/136259; G02F 2001/136218; H01L 27/12; H01L 27/1214; H01L 27/13; H01L 27/3272
USPC ............................ 257/532, 390.532; 345/206
See application file for complete search history.

(56) References Cited

U.S. PATENT DOCUMENTS

| 5,777,700 A | 7/1998 | Kaneko et al. |
| 2005/0057552 A1 | 3/2005 | Foo et al. |

(Continued)

FOREIGN PATENT DOCUMENTS

| EP | 0 375 233 A2 | 6/1990 |
| GB | 2 259 392 A | 3/1993 |

(Continued)

OTHER PUBLICATIONS

International Search Report for PCT/JP2009/062546, dated Aug. 25, 2009.

*Primary Examiner* — Duy T Nguyen
(74) *Attorney, Agent, or Firm* — Nixon & Vanderhye P.C.

(57) ABSTRACT

Disclosed herein is a liquid crystal panel including: first and second pixel electrode (17a and 17b) in a single pixel (101); a first upper capacitor electrode (37a) connected with the first pixel electrode (17a); a second upper capacitor electrode (37b) connected with the second pixel electrode (17b); a first lower capacitor electrode (47a) that is provided in a layer in which a scanning signal line (16x) is provided and that is connected with the first pixel electrode (17a); and a second lower capacitor electrode (47b) that is provided in the layer and that is connected with the second pixel electrode (17b), the first pixel electrode (17a) being connected with a data signal line (15x) via a transistor (12a), a capacitor being formed between the first upper capacitor electrode (37a) and the second lower capacitor electrode (47b), a capacitor being formed between the second upper capacitor electrode (37b) and the first lower capacitor electrode (47a).

27 Claims, 42 Drawing Sheets

(56) References Cited

U.S. PATENT DOCUMENTS

| | | |
|---|---|---|
| 2006/0023137 A1 | 2/2006 | Kamada et al. |
| 2006/0028590 A1 | 2/2006 | Shin et al. |
| 2006/0158575 A1 | 7/2006 | Shin et al. |
| 2006/0170835 A1 | 8/2006 | Jun et al. |
| 2006/0268186 A1 | 11/2006 | Kamada et al. |
| 2006/0290826 A1* | 12/2006 | Paik et al. ........................ 349/38 |
| 2007/0120798 A1* | 5/2007 | Lee et al. ......................... 345/92 |
| 2007/0201824 A1* | 8/2007 | Masaki et al. .................. 386/83 |

FOREIGN PATENT DOCUMENTS

| | | | |
|---|---|---|---|
| JP | 7-028091 | A | 1/1995 |
| JP | 9-054341 | A | 2/1997 |
| JP | 9-269509 | | 10/1997 |
| JP | 11007046 | * | 1/1999 |
| JP | 2006-39290 | | 2/2006 |
| JP | 2006-184737 | | 7/2006 |
| RU | 2004 125 803 | A | 2/2006 |

* cited by examiner

ACTIVE MATRIX DEVICE INCLUDING FIRST AND SECOND CAPACITOR ELECTRODES AND MULTIPLE CAPACITORS

This application is the U.S. national phase of International Application No. PCT/JP2009/062546 filed 9 Jul. 2009 which designated the U.S. and claims priority to JP 2008-284806 filed 5 Nov. 2008, the entire contents of each of which are hereby incorporated by reference.

TECHNICAL FIELD

The present invention relates to (i) an active matrix substrate in which a plurality of pixel electrodes are provided in one pixel region and (ii) a liquid crystal display device (based on a pixel division system) including the active matrix substrate.

BACKGROUND ART

In order to improve a viewing angle dependency of a γ characteristic of a liquid crystal display device (for example, to prevent excess brightness on a screen), there has been proposed a liquid crystal display device (based on a pixel division system; see, for example, Patent Literature 1) in which a plurality of sub-pixels in one pixel are controlled to have different luminances so that area coverage modulation of the sub-pixels allows displaying a half tone.

In an active matrix substrate disclosed in Patent Literature 1 (see FIG. 48), three pixel electrodes 121a to 121c are provided in one pixel region in such a manner as to be along a data signal line 115, a source electrode 116s of a transistor 116 is connected with a contact electrode 117a, the contact electrode 117a and a control electrode 118 are connected with each other via an extracting line 119, the control electrode 118 and a contact electrode 117b are connected with each other via an extracting line 126, the contact electrode 117a and the pixel electrode 121a are connected with each other via a contact hole 120a, the contact electrode 117b and the pixel electrode 121c are connected with each other via a contact hole 120b, the pixel electrode 121b, which is electrically floating, overlaps the control electrode 118 via an insulating layer, and the pixel electrode 121b is capacitance-coupled to each of the pixel electrodes 121a and 121c (capacitance-coupling pixel division system). Further, a retention capacitor is formed at a portion where the control electrode 118 and a capacitor line 113 overlap each other. In a liquid crystal display device including the active matrix substrate, each of sub-pixels corresponding to the pixel electrodes 121a and 121c can serve as a bright sub-pixel, and a sub-pixel corresponding to the pixel electrode 121b can serve as a dark sub-pixel. Area coverage modulation of the two bright sub-pixels and the one dark sub-pixel allows displaying a half tone.

CITATION LIST

Patent Literature 1

Japanese Patent Application Publication, Tokukai, No. 2006-39290 Å(Publication Date: Feb. 9, 2006)

SUMMARY OF INVENTION

Technical Problem

The active matrix substrate of FIG. 48, however, poses the following problem: In a case where, for example, there has occurred a short circuit between the control electrode 118 and the pixel electrode 121b, although cutting the extracting line 119 allows preventing a signal potential from being supplied from the data signal line to the pixel electrode 121b, the pixel electrode 121b will then no longer be capacitance-coupled to the pixel electrode 121a. This indicates that in a conventional active matrix substrate, a sub-pixel (dark sub-pixel) corresponding to the pixel electrode 121b easily becomes defective, which in turn poses a risk of decreasing a process yield.

In view of the above problem, the present invention proposes an active matrix substrate based on capacitance-coupling pixel division system which active matrix substrate can be produced with a higher process yield.

Solution to Problem

An active matrix substrate of the present invention includes: a scanning signal line; a data signal line; a transistor connected with the scanning signal line and the data signal line; a first pixel electrode; and a second pixel electrode, the first and second pixel electrodes being provided in a single pixel region, the active matrix substrate further including: a first electric conductor electrically connected with the first pixel electrode; a second electric conductor electrically connected with the second pixel electrode; a first capacitor electrode that is provided in a first layer in which the scanning signal line is provided and that is electrically connected with the first pixel electrode; and a second capacitor electrode that is provided in the first layer and that is electrically connected with the second pixel electrode, the first pixel electrode being connected with the data signal line via the transistor, a first capacitor being formed between the first electric conductor and the second capacitor electrode, a second capacitor being formed between the second electric conductor and the first capacitor electrode.

According to the arrangement, the first pixel electrode and the second pixel electrode each provided in a single pixel region are connected with each other via two parallel capacitors (coupling capacitors) in an active matrix substrate of a pixel division system of a capacitive coupling type. Even if one of the two parallel capacitors has a failure in a production step or the like, the arrangement makes it possible to maintain the capacitive coupling between the first and second pixel electrodes with use of the other capacitor. Even if, for example, there has occurred a short circuit between the first electric conductor and the second pixel electrode, it is possible to maintain the capacitive coupling between the first and second pixel electrodes by cutting the first electric conductor between (i) a portion at which it is connected with the first pixel electrode and (ii) a portion at which the short circuit has occurred. This makes it possible to improve a process yield of producing the active matrix substrate and a liquid crystal panel including the active matrix substrate.

The active matrix substrate of the present invention may be arranged such that a third capacitor is formed either between the first electric conductor and the second pixel electrode or between the second electric conductor and the first pixel electrode.

The active matrix substrate of the present invention may be arranged such that the second electric conductor is provided in a layer between the first capacitor electrode and the first pixel electrode; the second capacitor is formed by the first capacitor electrode and the second electric conductor overlapping each other via a first insulating film; and, the second electric conductor and the first pixel electrode overlap each other via a second insulating film so that a third capacitor is formed between the second electric conductor and the first pixel electrode.

The active matrix substrate of the present invention may be arranged such that the first electric conductor is provided in a layer between the second capacitor electrode and the second pixel electrode; the first capacitor is formed by the second capacitor electrode and the first electric conductor overlapping each other via a first insulating film; and the first electric conductor and the second pixel electrode overlap each other via a second insulating film so that a fourth capacitor is formed between the first electric conductor and the second pixel electrode.

The active matrix substrate of the present invention may be arranged such that a fourth capacitor is formed between the first electric conductor and the second pixel electrode; and a third capacitor is formed between the second electric conductor and the first pixel electrode.

The active matrix substrate of the present invention may be arranged such that the second electric conductor is provided in a layer between the first capacitor electrode and the first pixel electrode; the second capacitor is formed by the first capacitor electrode and the second electric conductor overlapping each other via a first insulating film; the second electric conductor and the first pixel electrode overlap each other via a second insulating film so that a third capacitor is formed between the second electric conductor and the first pixel electrode; the first electric conductor is provided in a layer between the second capacitor electrode and the second pixel electrode; the first capacitor is formed by the second capacitor electrode and the first electric conductor overlapping each other via the first insulating film; and the first electric conductor and the second pixel electrode overlap each other via the second, insulating film so that a fourth capacitor is formed between the first electric conductor and the second pixel electrode.

The active matrix substrate of the present invention may be arranged such that the first electric conductor and the second capacitor electrode overlap each other at a first overlapping portion; the second electric conductor and the first capacitor electrode overlap each other at a second overlapping portion; and the first and second overlapping portions each cross a gap between the first and second pixel electrodes.

The active matrix substrate of the present invention may further include a third pixel electrode in the pixel region, the third pixel electrode being electrically connected with the first pixel electrode.

The active matrix substrate of the present invention may further include a third electric conductor electrically connected with the second pixel electrode; and a third capacitor electrode that is provided in the first layer and that is electrically connected with the third pixel electrode, a fifth capacitor being formed between the third electric conductor and the third capacitor electrode.

The active matrix substrate of the present invention may be arranged such that a sixth capacitor is formed between the third electric conductor and the third pixel electrode.

The active matrix substrate of the present invention may be arranged such that the first and second electric conductors are provided in a layer in which a conductive electrode of the transistor is provided.

The active matrix substrate of the present invention may be arranged such that the first insulating film includes a gate insulating film.

The active matrix substrate of the present invention may be arranged such that the second insulating film includes an interlayer insulating film covering a channel of the transistor.

The active matrix substrate of the present invention may be arranged such that a conductive electrode of the transistor is connected with (i) the first pixel electrode via a contact hole and with (ii) the first electric conductor via an extracting line extracted from the conductive electrode.

The active matrix substrate of the present invention may be arranged such that a conductive electrode of the transistor is connected with the first pixel electrode via a contact hole; and the first pixel electrode is connected with the first electric conductor via a contact hole.

The active matrix substrate of the present invention may be arranged such that a first one of the first and second pixel electrodes encloses a second one of the first and second pixel electrodes.

The active matrix substrate of the present invention may be arranged such that the first and second pixel electrodes are arranged in a column direction with respect to a row direction in which the scanning signal line extends.

The active matrix substrate of the present invention may be arranged such that the first pixel electrode provided in a first one of two pixel regions adjacent to each other in the row direction is adjacent in the row direction to the second pixel electrode provided in a second one of the two pixel regions.

The active matrix substrate of the present invention may be arranged such that the first pixel electrode provided in a first one of two pixel regions adjacent to each other in the column direction is adjacent in the column direction to the second pixel electrode provided in a second one of the two pixel regions.

The active matrix substrate of the present invention may further include: a retention capacitor line for (i) forming a seventh capacitor together with either the first pixel electrode or an electric conductor electrically connected with the first pixel electrode and (ii) forming an eighth capacitor together with either the second pixel electrode or an electric conductor electrically connected with the second pixel electrode.

The active matrix substrate of the present invention may be arranged such that the retention capacitor line includes a retention capacitor line extension which branches off from the retention capacitor line; and the retention capacitor line extension extends, in a plan view, along the data signal line and the scanning signal line so as to surround the pixel region and overlap the first and second pixel electrodes.

The active matrix substrate of the present invention may be arranged such that a gap between the first and second pixel electrodes serves as an alignment-controlling structure.

The active matrix substrate of the present invention may be arranged such that the first electric conductor is larger in area than the second capacitor electrode, and the second electric conductor is larger in area than the first capacitor electrode; or the first electric conductor is smaller in area than the second capacitor electrode, and the second electric conductor is smaller in area than the first capacitor electrode.

An active matrix substrate of the present invention includes: a scanning signal line; a data signal line; a transistor connected with the scanning signal line and the data signal line; a first pixel electrode; and a second pixel electrode, the first and second pixel electrodes being provided in a single pixel region, the active matrix substrate further including: a first electric conductor electrically connected with the first pixel electrode; a second electric conductor electrically connected with the second pixel electrode; and a second, capacitor electrode that is provided in a layer in which the scanning signal line is provided and that is electrically connected with the second pixel electrode, the first pixel electrode being connected with the data signal line via the transistor, a first capacitor being formed between the first electric conductor and the second capacitor electrode, a second capacitor being formed between the second electric conductor and the first pixel electrode.

An active matrix substrate of the present invention includes: a scanning signal line; a data signal line; a transistor connected with the scanning signal line and the data, signal line; a first pixel electrode; and a second pixel electrode, the first and second pixel electrodes being provided in a single pixel region, the active matrix substrate further including: a first electric conductor electrically connected with the first pixel electrode; a second electric conductor electrically connected with the second pixel electrode; and a first capacitor electrode that is provided in a layer in which the scanning signal line is provided and that is electrically connected with the first pixel electrode, the first pixel electrode being connected with the data signal line via the transistor, a first capacitor being formed between the first electric conductor and the second pixel electrode, a second capacitor being formed between the second electric conductor and the first capacitor electrode.

The active matrix substrate of the present invention may be arranged such that a third capacitor is formed between the first electric conductor and the second pixel electrode.

The active matrix substrate of the present invention may be arranged such that a third capacitor is formed between the second electric conductor and the first pixel electrode.

A method of the present invention for producing an active matrix substrate is a method, for producing an active matrix substrate including: a scanning signal line; a data signal line; a transistor connected with the scanning signal line and the data signal line; a first pixel electrode; and a second pixel electrode, the first and second pixel electrodes being provided in a single pixel region, the method including the steps of: forming (i) a first capacitor electrode electrically connected with the first pixel electrode and (ii) a second capacitor electrode electrically connected with the second pixel electrode; forming (i) a first electric conductor which is electrically connected with the first pixel electrode and a conductive electrode of the transistor and which forms a capacitor together with the second, capacitor electrode and (ii) a second electric conductor which is electrically connected with the second pixel electrode and which forms a capacitor together with the first capacitor electrode; detecting at least one of (i) a first short circuit between the first electric conductor and the second pixel electrode and (ii) a second short circuit between the second electric conductor and the first pixel electrode; and in a case where the first short circuit has been detected, cutting the first electric conductor at a portion present between (i) a portion at which the first electric conductor is connected with the first pixel electrode and (ii) a portion at which the first short circuit has occurred, and in a case where the second short circuit has been detected, cutting the second electric conductor at a portion present between (i) a portion at which the second electric conductor is connected with the second pixel electrode and (ii) a portion at which the second short circuit has occurred.

A method of the present invention for producing a liquid crystal panel is a method for producing a liquid crystal panel including: a scanning signal line; a data signal line; a transistor connected with the scanning signal line and the data signal line; a first pixel electrode; and a second pixel electrode, the first and second pixel electrodes being provided in a single pixel, the method including the steps of: forming (i) a first capacitor electrode electrically connected with the first pixel electrode and (ii) a second capacitor electrode electrically connected with the second pixel electrode; forming (i) a first electric conductor which is electrically connected with the first pixel electrode and a conductive electrode of the transistor and which forms a capacitor together with the second capacitor electrode and (ii) a second electric conductor which is electrically connected with the second pixel electrode and which forms a capacitor together with the first capacitor electrode; detecting at least one of (i) a first short circuit between the first electric conductor and the second pixel electrode and (ii) a second short circuit between the second electric conductor and the first pixel electrode; and in a case where the first short circuit has been detected, cutting the first electric conductor at a portion present between (i) a portion at which the first electric conductor is connected with the first pixel electrode and (ii) a portion at which the first short circuit has occurred, and in a case where the second short circuit has been detected, cutting the second electric conductor at a portion present between (i) a portion at which the second electric conductor is connected with the second pixel electrode and (ii) a portion at which the second short circuit has occurred.

A liquid crystal panel of the present invention includes one of the above active matrix substrates. A liquid crystal display unit of the present invention includes: the liquid crystal panel; and a driver. A liquid crystal display device of the present invention includes: the liquid crystal display unit; and a light source device. A television receiver of the present invention includes: the liquid crystal display device; and a tuner section for receiving television broadcasting.

Advantageous Effects of Invention

As described above, according to the present invention, the first pixel electrode and the second pixel electrode each provided in a single pixel region are connected with each other via two parallel capacitors (coupling capacitors) in an active matrix substrate based on a capacitance-coupling pixel division system. Even if one of the two parallel capacitors has a failure in a production step or the like, the arrangement makes it possible to maintain the capacitive coupling between the first and second pixel electrodes with use of the other capacitor, and consequently improve a process yield of producing the active matrix substrate.

(a) is a view schematically illustrating a configuration of a liquid crystal display unit of the present invention, and (b) a view schematically illustrating a configuration of a liquid crystal display device of the present invention.

Figure 43:
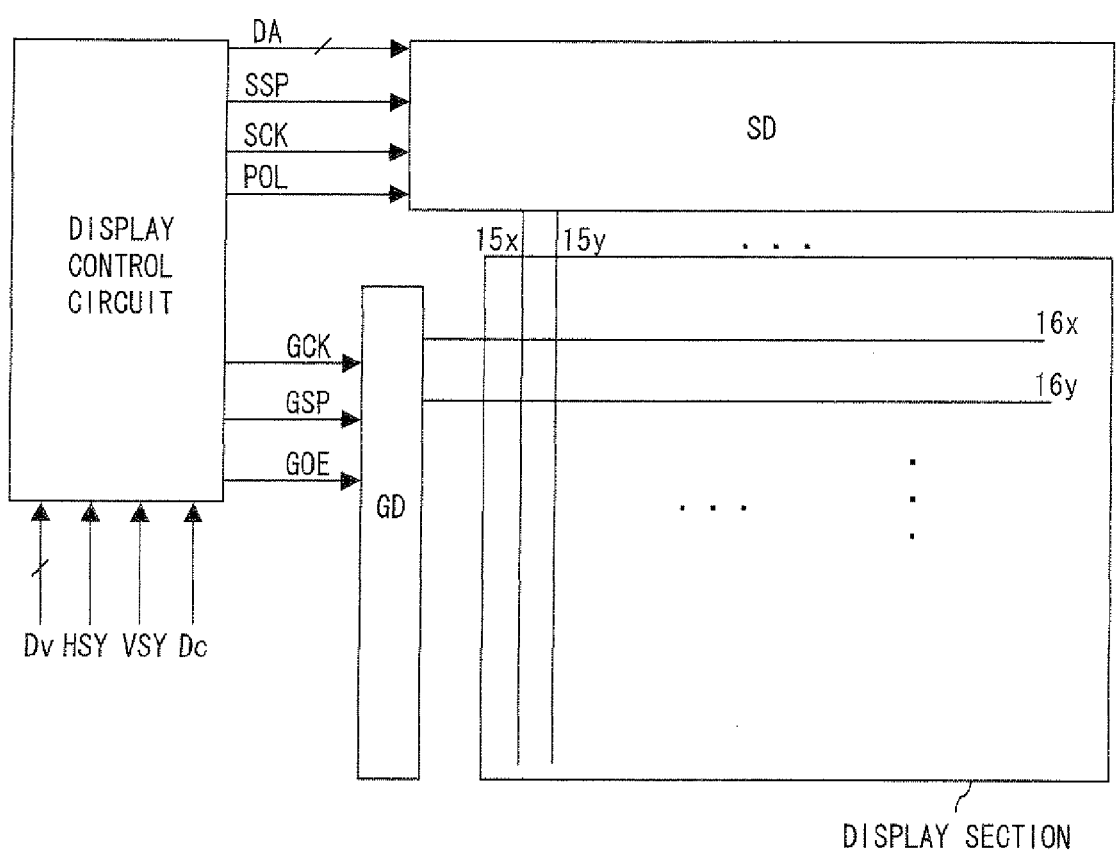

FIG. 43 is a block diagram illustrating an entire configuration of the liquid crystal display device.

Figure 44:
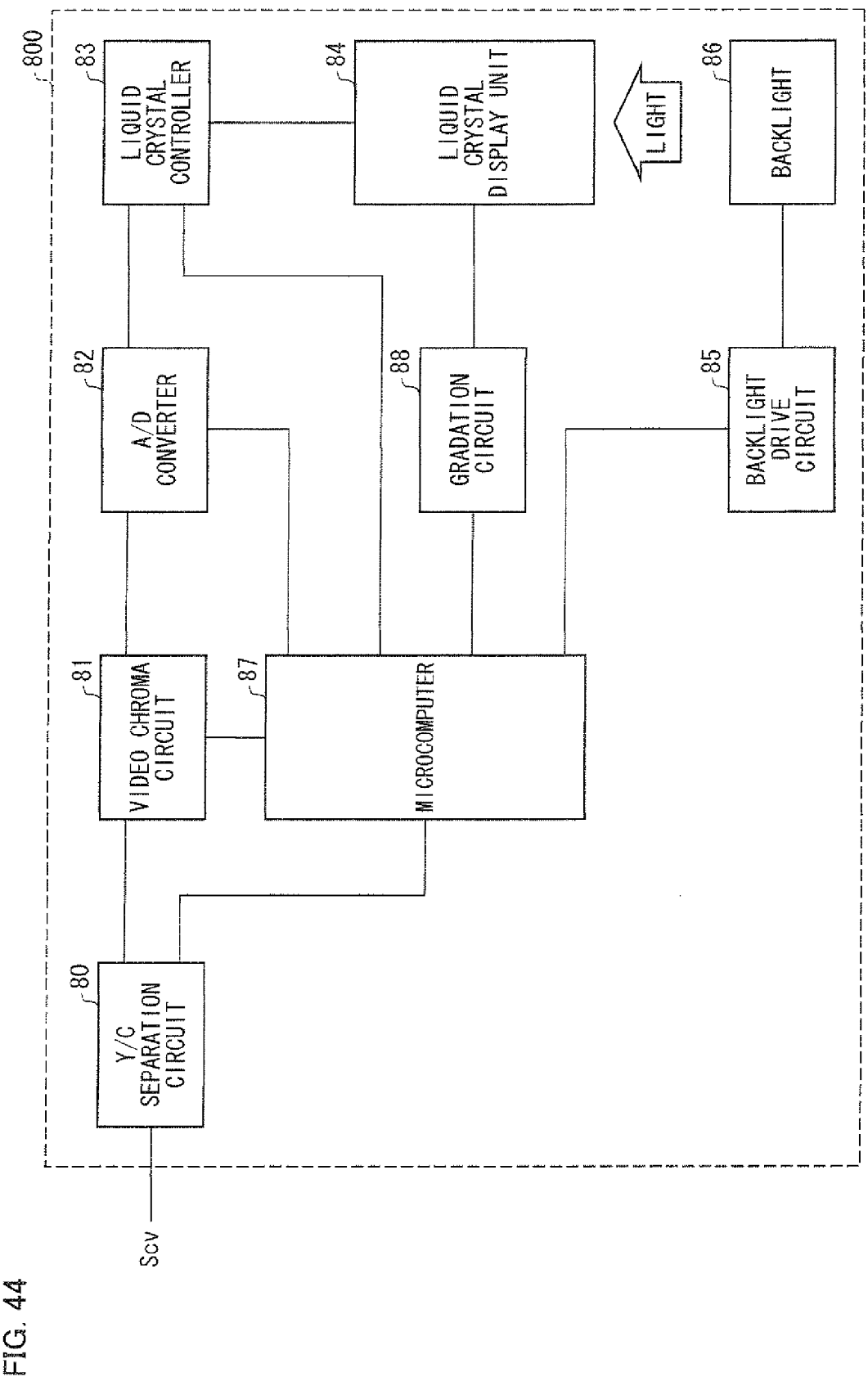

FIG. 44 is a block diagram illustrating functions of the liquid crystal display device.

Figure 45:
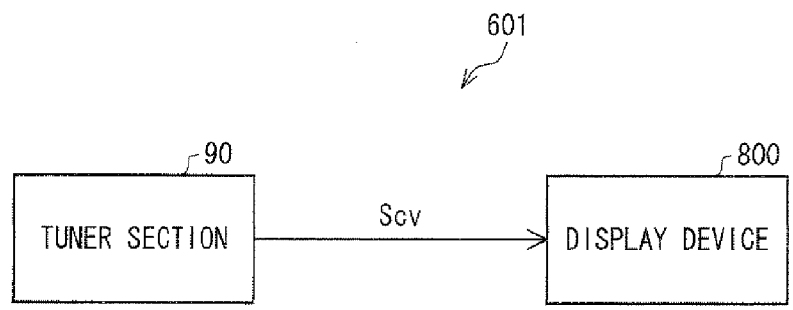

FIG. 45 is a block diagram illustrating functions of a television receiver of the present invention.

Figure 46:
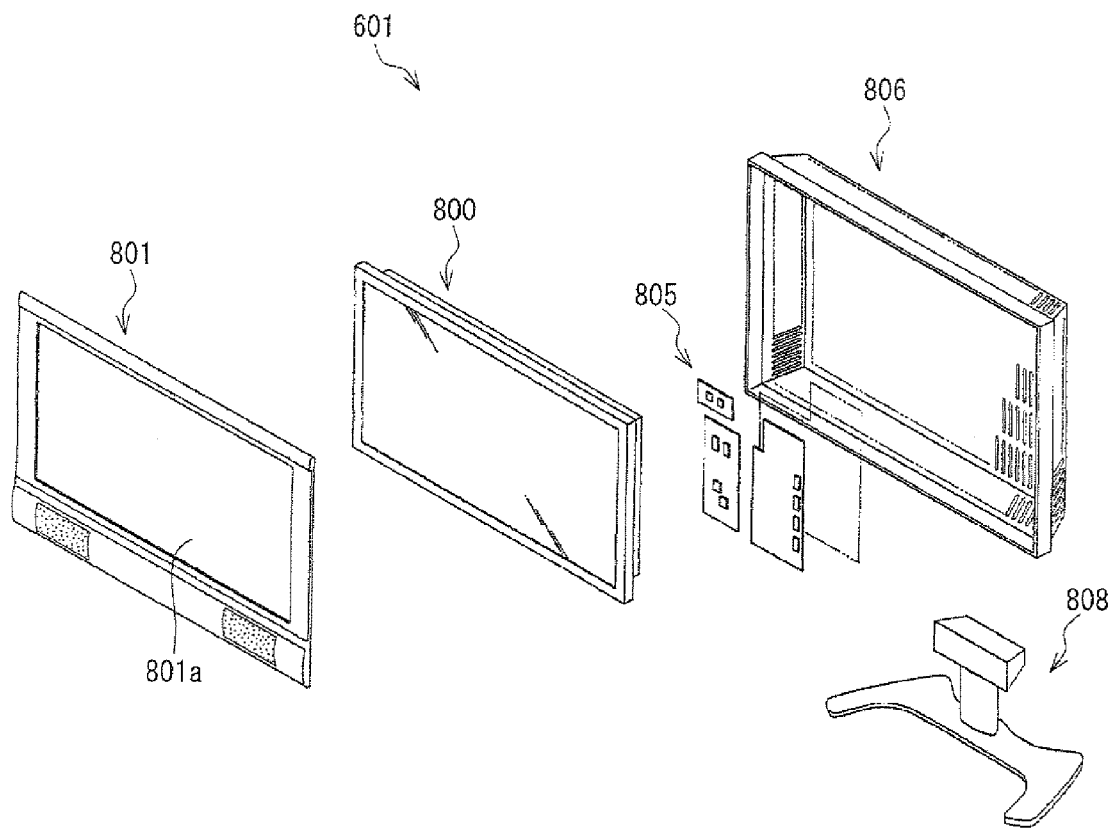

FIG. 46 is an exploded perspective view illustrating a configuration of the television receiver.

Figure 35:
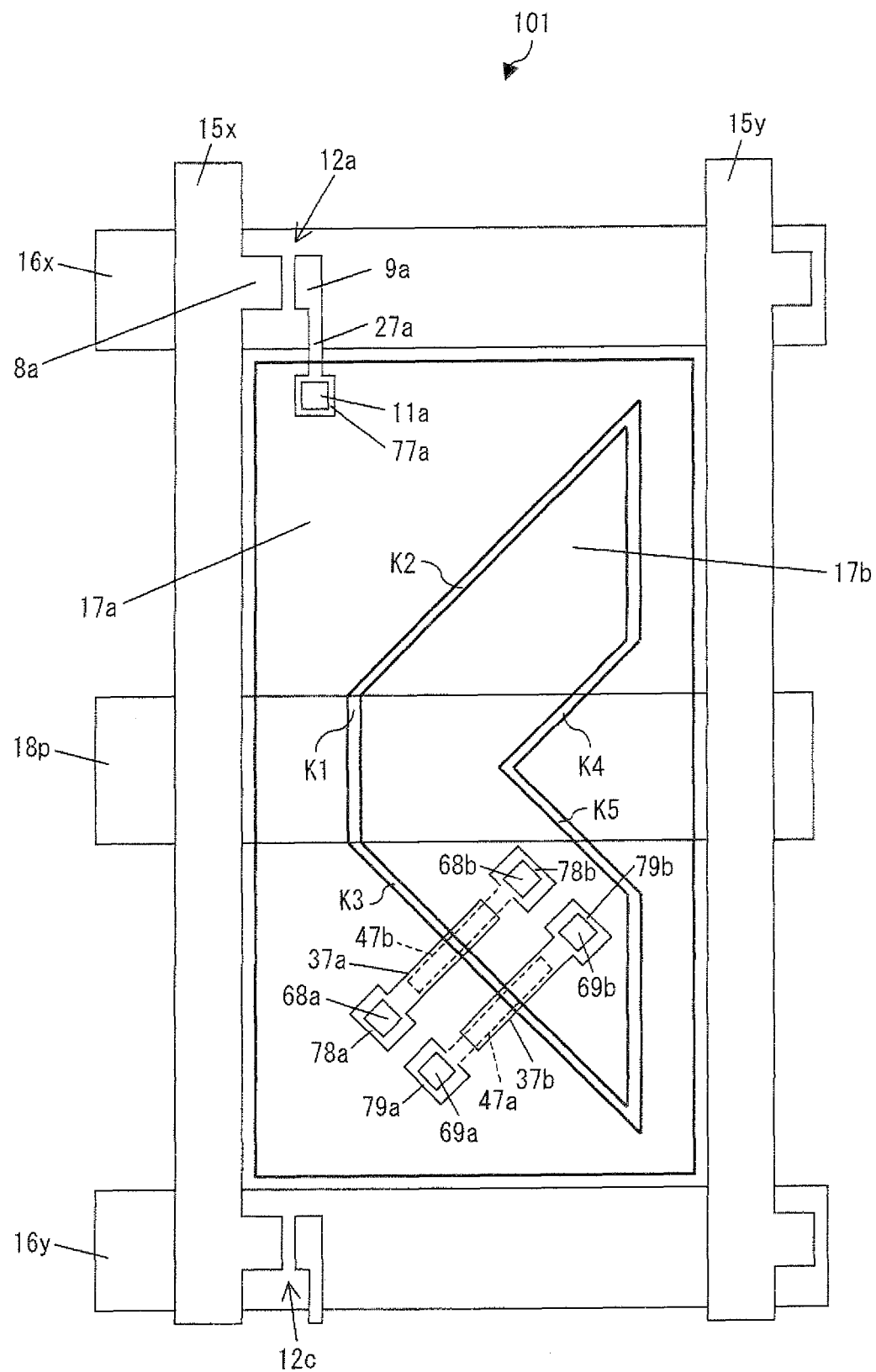
FIG. 35 is a plan view illustrating a specific example of the liquid crystal panel of FIG. 34.
Figure 47:
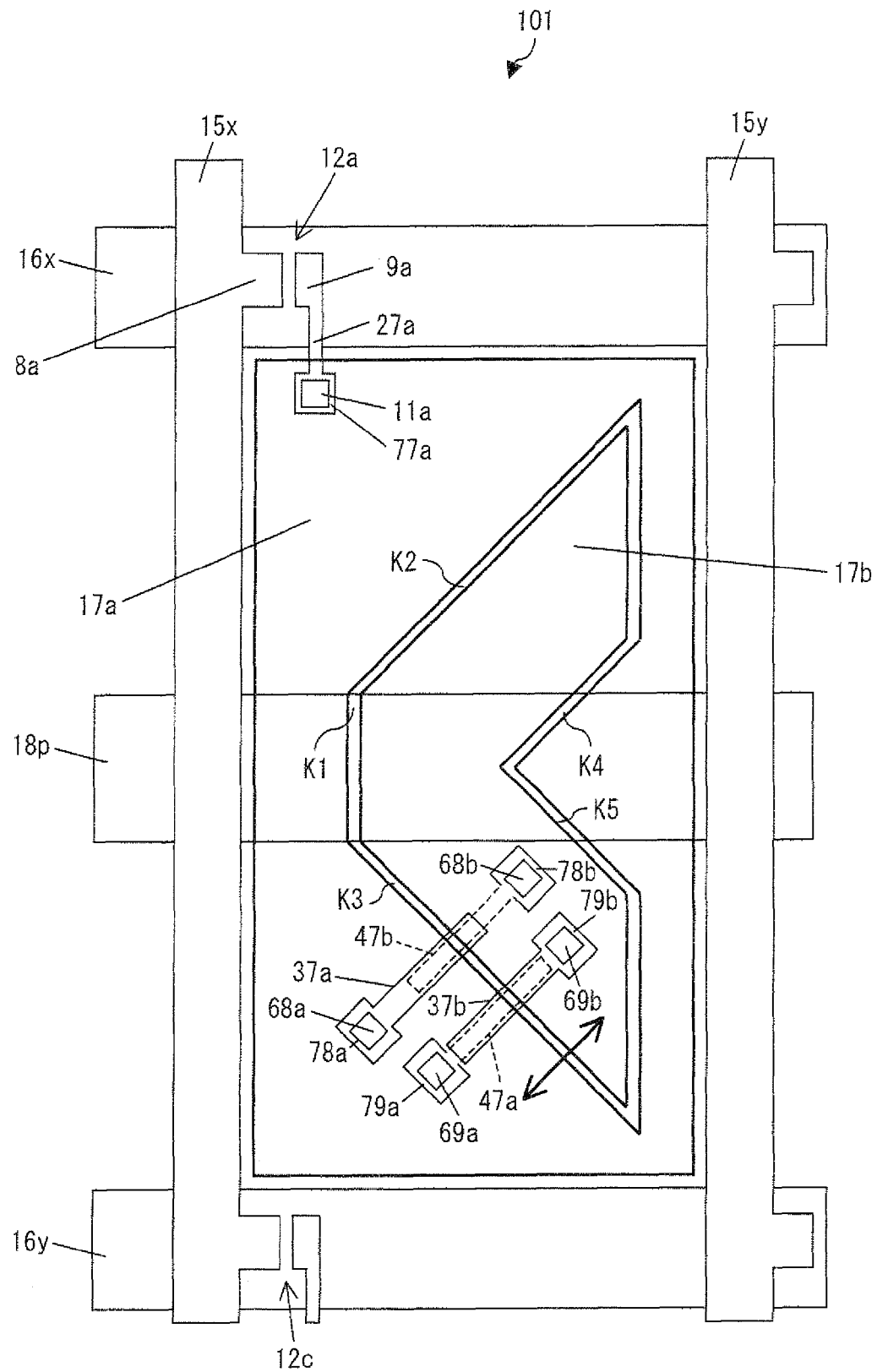

FIG. 47 is a plan view illustrating a state of the liquid crystal panel of FIG. 35 in which state misalignment has occurred.

Figure 48:
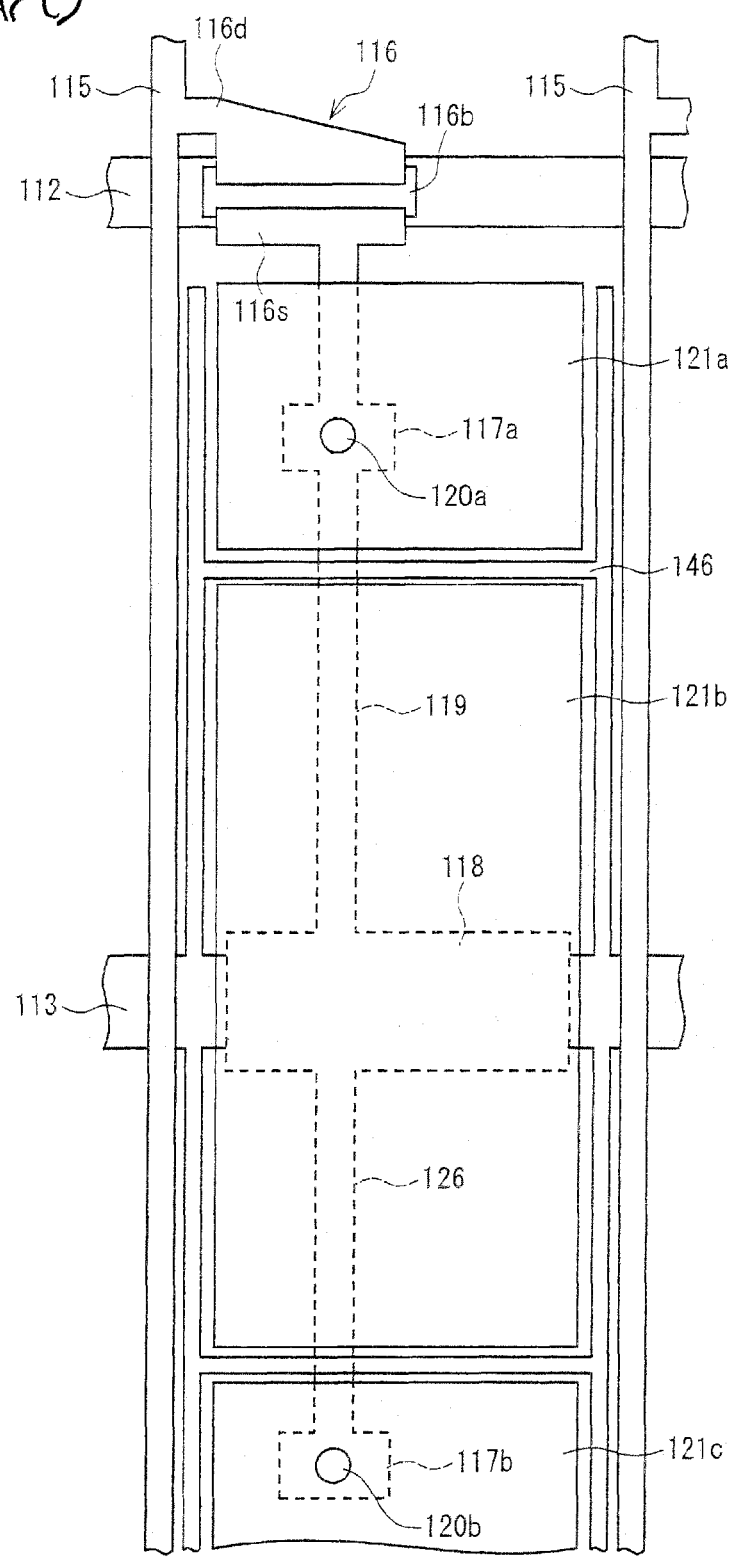

FIG. 48 is a plan view illustrating a configuration of a conventional liquid crystal panel.

DESCRIPTION OF EMBODIMENTS

Example embodiments of the present invention are explained below with reference to drawings. For convenience of explanation, a direction in which scanning signal lines extend is regarded as a row direction. Needless to say, when a liquid crystal display device including a liquid crystal display panel of the present invention (or an active matrix substrate used in the liquid crystal display panel) is used (viewed), the scanning signal lines may extend either in a lateral direction or in a longitudinal direction. Further, a description of an alignment-controlling structure formed in the liquid crystal panel is omitted as appropriate.

Embodiment 1

Figure 1:
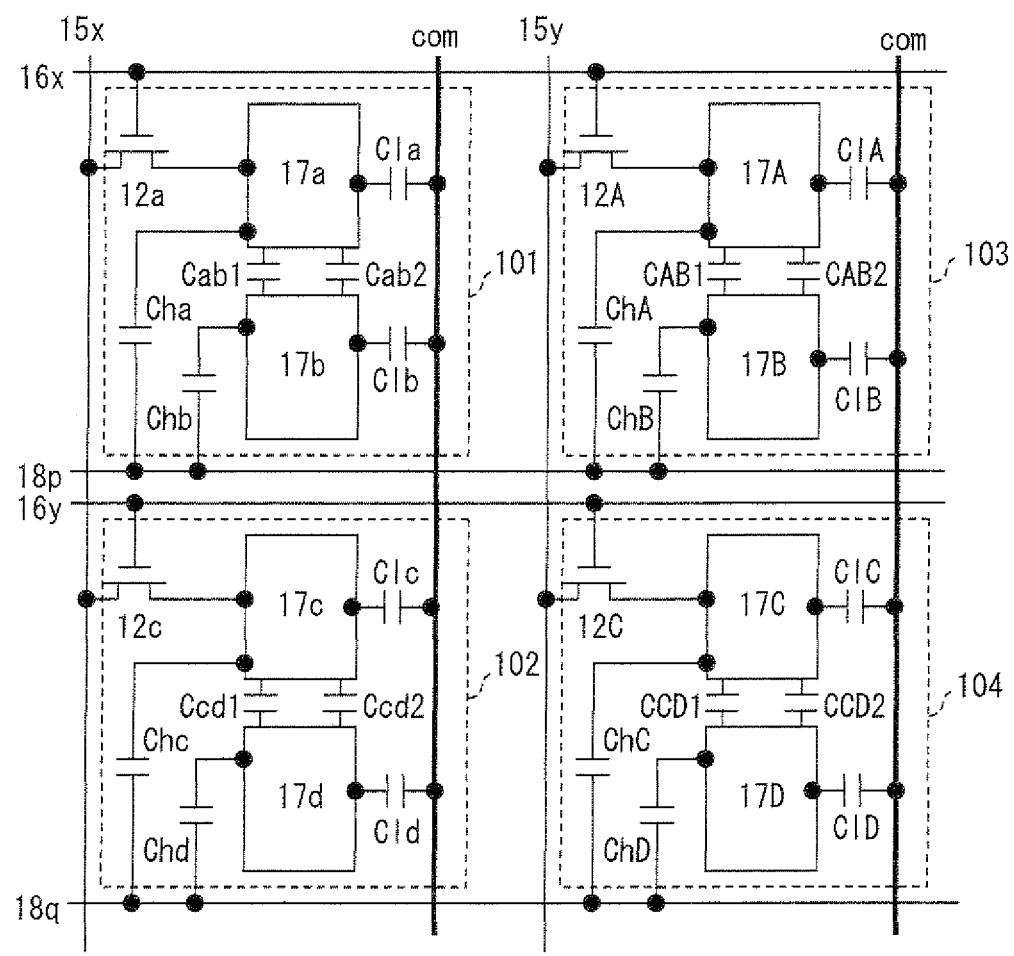
FIG. 1 is a circuit diagram illustrating a configuration of a liquid crystal panel in accordance with Embodiment 1.

FIG. 1 is an equivalent circuit diagram showing a part of a liquid crystal display panel in accordance with Embodiment 1. As illustrated in FIG. 1, the liquid crystal display panel includes: data signal lines ($15x$ and $15y$) extending in a column direction (up-down direction in the drawing); scanning signal lines ($16x$ and $16y$) extending in a row direction (right-left direction in the drawing); pixels (101-104) positioned in row and column directions; retention capacitor lines ($18p$ and $18q$); and a common electrode (counter electrode) com. Each pixel has the same structure. A pixel column including the pixels 101 and 102 is adjacent to a pixel column including the pixels 103 and 104. A pixel row including the pixels 101 and 103 is adjacent to a pixel row including the pixels 102 and 104.

In the liquid crystal panel, one data signal line and one scanning signal line are provided for each pixel. Further, each pixel includes two pixel electrodes arranged in the column direction: The pixel 101 includes two pixel electrodes $17a$ and $17b$, the pixel 102 includes two pixel electrodes $17c$ and $17d$, and the pixel electrodes $17a$, $17b$, $17c$, and $17d$ are arranged in a line; the pixel 103 includes two pixel electrodes 17A and 17B, the pixel 104 includes two pixel electrodes 17C and 17D, and the pixel electrodes 17A, 17B, 17C, and 17D are arranged in a line. The pixel electrodes $17a$ and 17A are adjacent to each other in the row direction, the pixel electrodes $17b$ and 17B are adjacent to each other in the row direction, the pixel electrodes $17c$ and 17C are adjacent to each other in the row direction, and the pixel electrodes $17d$ and 17D are adjacent to each other in the row direction.

In the pixel 101, the pixel electrodes 17a and 17b are connected with each other via coupling capacitors Cab1 and Cab2 formed in parallel to each other, the pixel electrode 17a is connected with the data signal line 15x via a transistor 12a connected with the scanning signal line 16x, a retention capacitor Cha is formed between the pixel electrode 17a and the retention capacitor line 18p, a retention capacitor Chb is formed between the pixel electrode 17b and the retention capacitor line 18p, a liquid crystal capacitor Cla is formed between the pixel electrode 17a and the common electrode com, and a liquid crystal capacitor Clb is formed between the pixel electrode 17b and the common electrode com.

In the pixel 102 adjacent to the pixel 101 in the column direction, the pixel electrodes 17c and 17d are connected with each other via coupling capacitors Ccd1 and Ccd2 formed in parallel to each other, the pixel electrode 17c is connected with the data signal line 15x via a transistor 12c connected with the scanning signal line 16y, a retention capacitor Chc is formed between the pixel electrode 17c and the retention capacitor line 18q, a retention capacitor Chd is formed between the pixel electrode 17d and the retention capacitor line 18q, a liquid crystal capacitor Clc is formed between the pixel electrode 17c and the common electrode com, and a liquid crystal capacitor Cld is formed between the pixel electrode 17d and the common electrode com.

In the pixel 103 adjacent to the pixel 101 in the row direction, the pixel electrodes 17A and 17B are connected with each other via coupling capacitors CAB1 and CAB2 formed in parallel to each other, the pixel electrode 17A is connected with the data signal line 15y via a transistor 12A connected with the scanning signal line 16x, a retention capacitor ChA is formed between the pixel electrode 17A and the retention capacitor line 18p, a retention capacitor ChB is formed between the pixel electrode 17B and the retention capacitor line 18p, a liquid crystal capacitor ClA is formed between the pixel electrode 17A and the common electrode com, and a liquid crystal capacitor ClB is formed between the pixel electrode 17B and the common electrode com.

A liquid crystal display device including the above liquid crystal panel carries out sequential scanning: the scanning signal lines 16x and 16y are sequentially selected. In a case where, for example, the scanning signal line 16x is selected, the pixel electrode 17a is connected with the data signal line 15x (via the transistor 12a). Since the pixel electrodes 17a and 17b are capacitance-coupled to each other via the coupling capacitors Cab1 and Cab2, $$Vb = Va \times [(C1+C2)/(C1+Ch+C1+C2)],$$

where C1 is a capacitance value of Cla, which is equal to a capacitance value of Clb; Ch is a capacitance value of Cha, which is equal to a capacitance value of Chb; C1 is a capacitance value of Cab1; C2 is a capacitance value of Cab2; Va is an electric potential of the pixel electrode 17a observed after the transistor 12a is turned off; and Vb is an electric potential of the pixel electrode 17b observed after the transistor 12a is turned off. That is, $$|Va| \geq |Vb|,$$

where |Va|, for example, is a potential difference between Va and an electric potential of the common electrode com (Vcom). With this arrangement, the liquid crystal display device can display a half tone with use of area coverage modulation of (i) a bright sub-pixel including the pixel electrode 17a and (ii) a dark sub-pixel including the pixel electrode 17b. As such, the liquid crystal display device has an improved viewing angle characteristic.

Figure 2:
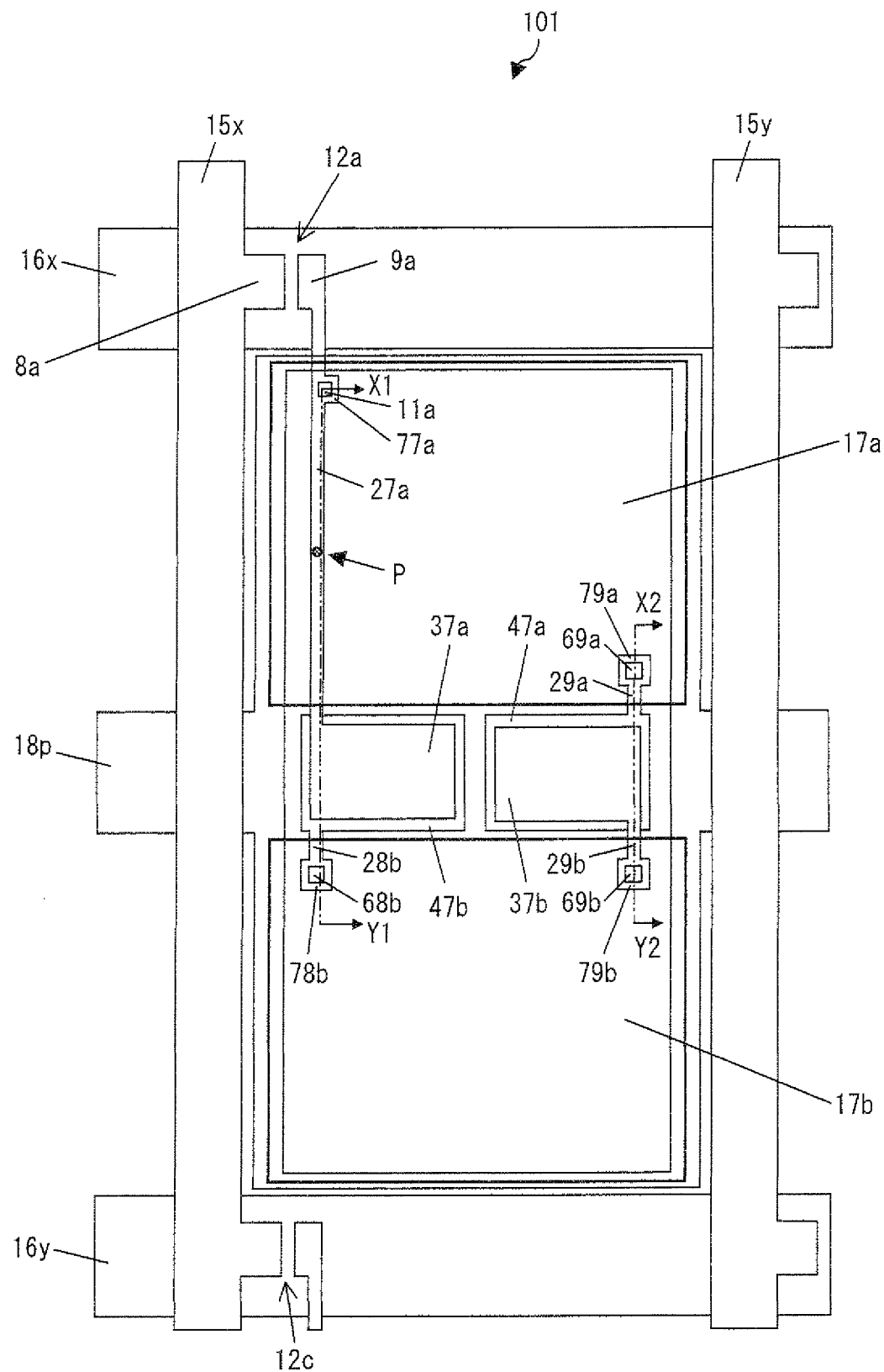
FIG. 2 is a plan view illustrating a specific example of the liquid crystal panel of FIG. 1.

A specific example of the pixel 101 of FIG. 1 is illustrated in FIG. 2. As illustrated in FIG. 2, the pixel 101 is configured as follows: The transistor 12a is provided in the vicinity of an intersection of the data signal line 15x with the scanning signal line 16x. The two signal lines (15x and 16x) define a pixel region, in which the pixel electrodes 17a and 17b, each in a rectangular shape, are arranged in the column direction. One of four sides forming a periphery of a first pixel electrode is adjacent to one of four sides forming a periphery of a second pixel electrode. The pixel 101 includes first and second upper capacitor electrodes 37a and 37b, which are both provided so as to overlap a gap between the above two adjacent sides (that is, a gap between the pixel electrodes 17a and 17b). The pixel 101 further includes first and second lower capacitor electrodes 47a and 47b. The first lower capacitor electrode 47a is provided so as to overlap (i) the gap between the two adjacent sides (that is, the gap between the pixel electrodes 17a and 17b) and (ii) the second upper capacitor electrode 37b (second electric conductor). The second lower capacitor electrode 47b is provided so as to overlap (i) the gap between the two adjacent sides (that is, the gap between the pixel electrodes 17a and 17b) and (ii) the first upper capacitor electrode 37a (first electric conductor). The retention capacitor line 18p includes a retention capacitor line extension which branches off from the retention capacitor line 18p. The retention capacitor line extension extends so as to overlap a part of an edge of each of the pixel electrodes 17a and 17b in a plan view.

More specifically, within the gap between the pixel electrodes 17a and 17b, the first and second upper capacitor electrodes 37a and 37b are arranged in the row direction, and the first and second lower capacitor electrodes 47a and 47b are also arranged in the row direction. The first upper capacitor electrode 37a overlaps the second lower capacitor electrode 47b at a first portion, whereas the second upper capacitor electrode 37b overlaps the first lower capacitor electrode 47a at a second portion, the first and second portions being arranged in the row direction. The retention capacitor line extension of the retention capacitor line 18p extends along the data signal lines 15x and 15y and the scanning signal lines 16x and 16y so as to (i) surround the pixel region and (ii) overlap three sides of each of the pixel electrodes 17a and 17b which three sides are sides other than the side that defines the gap between the pixel electrodes 17a and 17b. With the retention capacitor line 18p having such a shape, it is possible to prevent electric charge from coming from the data signal lines 15x and 15y or the scanning signal lines 16x and 16y, and consequently prevent image sticking of a floating pixel. Further, the above branching structure allows the retention capacitor line 18p to have redundancy, and thus improves a process yield. The structure of the retention capacitor line 18p can be applied to a liquid crystal panel of any embodiment below, and can achieve an effect similar to the above in the liquid crystal panel.

The transistor 12a has a source electrode 8a and a drain electrode 9a both formed above the scanning signal line 16x. The source electrode 8a is connected with the data signal line 15x. The drain electrode 9a is connected with a drain extracting line 27a. The drain extracting line 27a is connected with (i) the first upper capacitor electrode 37a formed in a layer in which the drain extracting line 27a is formed and (ii) a contact electrode 77a, which is in turn connected with the pixel electrode 17a via a contact hole 11a.

The first upper capacitor electrode 37a overlaps the second lower capacitor electrode 47b via a gate insulating film. The second lower capacitor electrode 47b is connected with a second lower capacitor electrode extension 28b. The second lower capacitor electrode extension 28b is connected with a contact electrode 78b, which is in turn connected with the pixel electrode 17b via a contact hole 68b. With this configuration, the coupling capacitor Cab1 (see FIG. 1) between the pixel electrodes 17a and 17b is formed at the portion at which the first upper capacitor electrode 37a overlaps the second lower capacitor electrode 47b.

The second upper capacitor electrode 37b overlaps the first lower capacitor electrode 47a via the gate insulating film. Further, the second upper capacitor electrode 37b is connected with a second upper capacitor electrode extension 29b. The second upper capacitor electrode extension 29b is connected with a contact electrode 79b, which is in turn connected with the pixel electrode 17b via a contact hole 69b. Further, the first lower capacitor electrode 47a is connected with a first lower capacitor electrode extension 29a. The first lower capacitor electrode extension 29a is connected with a contact electrode 79a, which is in turn connected with the pixel electrode 17a via a contact hole 69a. With this configuration, the coupling capacitor Cab2 (see FIG. 1) between the pixel electrodes 17a and 17b is formed at the portion at which the second upper capacitor electrode 37b overlaps the first lower capacitor electrode 47a.

The pixel electrode 17a overlaps the retention capacitor line 18p via an interlayer insulating film and the gate insulating film. With this configuration, the retention capacitor Cha (see FIG. 1) is formed at a portion at which the pixel electrode 17a overlaps the retention capacitor line 18p. Further, the pixel electrode 17b overlaps the retention capacitor line 18p via the interlayer insulating film and the gate insulating film. With this configuration, the retention capacitor Chb (see FIG. 1) is formed at a portion at which the pixel electrode 17b overlaps the retention capacitor line 18p. Other pixels each have a configuration (specifically, how pixel constituents are shaped, positioned and connected) identical to that of the pixel 101.

According to the above arrangement, the sub-pixel including the pixel electrode 17a serves as "bright," and the sub-pixel including the pixel electrode 17b serves as "dark."

Further, according to the above configuration, the coupling capacitors (Cab1 and Cab2) are formed between the upper capacitor electrodes (37a and 37b) and the lower capacitor electrodes (47a and 47b) via a gate insulating film. In other words, according to the present configuration, the insulating film via which coupling capacitors are formed is a gate insulating film. According to conventional configurations (for example, a configuration disclosed in Patent Literature 1), in contrast, an insulating film via which coupling capacitors are formed is an interlayer insulating film with which transistors are coated. A gate insulating film in general is formed at a temperature higher than a temperature at which an interlayer insulating film with which transistors are coated is formed. A gate insulating film is thus likely to be more elaborate than an interlayer insulating film. As such, the present configuration is more suitable than conventional configurations in prevention of short-circuiting between electrodes at a portion at which coupling capacitors are formed. This structure, in which coupling capacitors are formed via a gate insulating film, can be applied to a liquid crystal panel of any embodiment below, and can achieve an effect similar to the above in the liquid crystal panel.

Figure 3:
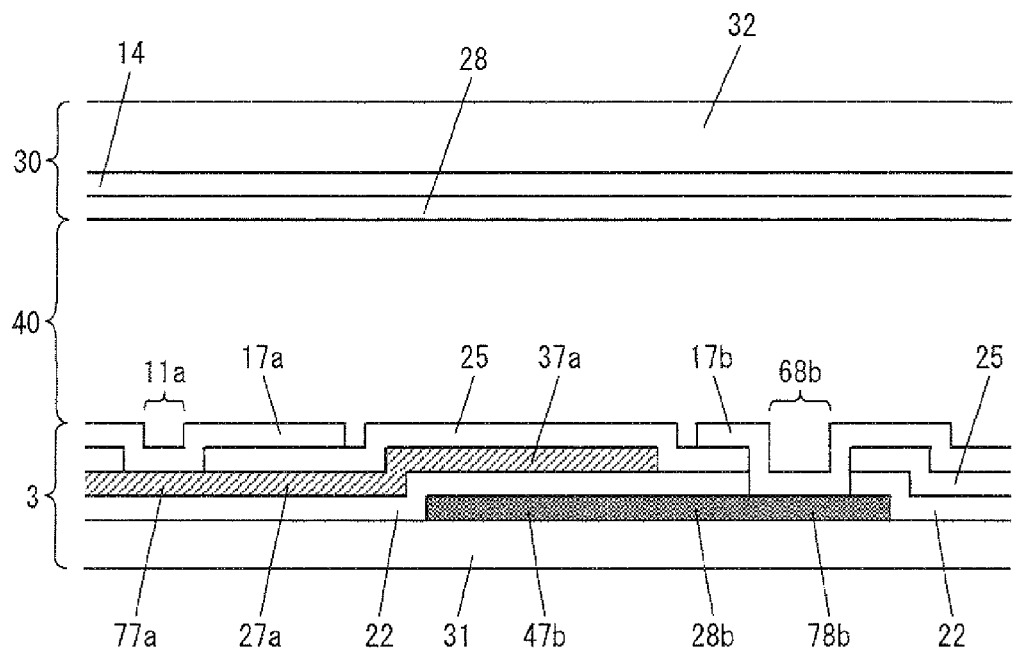
FIG. 3 is a cross-sectional view taken along a line X1-Y1 of FIG. 2.

FIG. 3 is a cross-sectional view taken along a line X1-Y1 of FIG. 2. As illustrated in FIG. 3, the present liquid crystal panel includes: an active matrix substrate 3; a color filter substrate 30 facing the active matrix substrate 3; and a liquid crystal layer 40 provided between the two substrates (3 and 30).

In the active matrix substrate 3, the second lower capacitor electrode 47b, the second lower capacitor electrode extension 28b, and the contact electrode 78b are formed on a glass substrate 31. An inorganic gate insulating film 22 is formed so as to cover the above members. Scanning signal lines (not shown) are also formed on the glass substrate 31. Formed on the inorganic gate insulating film 22 are members such as a semiconductor layer (i layer and n+ layer; not shown), the source electrode and the drain electrode (not shown) which have contact with the n+ layer, the drain extracting line 27a, the first upper capacitor electrode 37a, and the contact electrode 77a. An inorganic interlayer insulating film 25 is formed so as to cover the above members on the inorganic gate insulating film 22. The pixel electrodes 17a and 17b are formed on the inorganic interlayer insulating film 25. Further, an alignment film (not shown) is formed so as to cover the pixel electrodes 17a and 17b.

The inorganic interlayer insulating film 25 is penetrated at the contact hole 11a, which connects the pixel electrode 17a with the contact electrode 77a. The inorganic interlayer insulating film 25 and the inorganic gate insulating film 22 are penetrated at the contact hole 68b, which connects the pixel electrode 17b with the contact electrode 78b. In other words, the pixel electrode 17a and the first upper capacitor electrode 37a are electrically connected with each other, and the pixel electrode 17b and the second lower capacitor electrode 47b are electrically connected with each other. The first upper capacitor electrode 37a overlaps the second lower capacitor electrode 47b via the inorganic gate insulating film 22. As such, the coupling capacitor Cab1 is formed (see FIG. 1).

Figure 4:
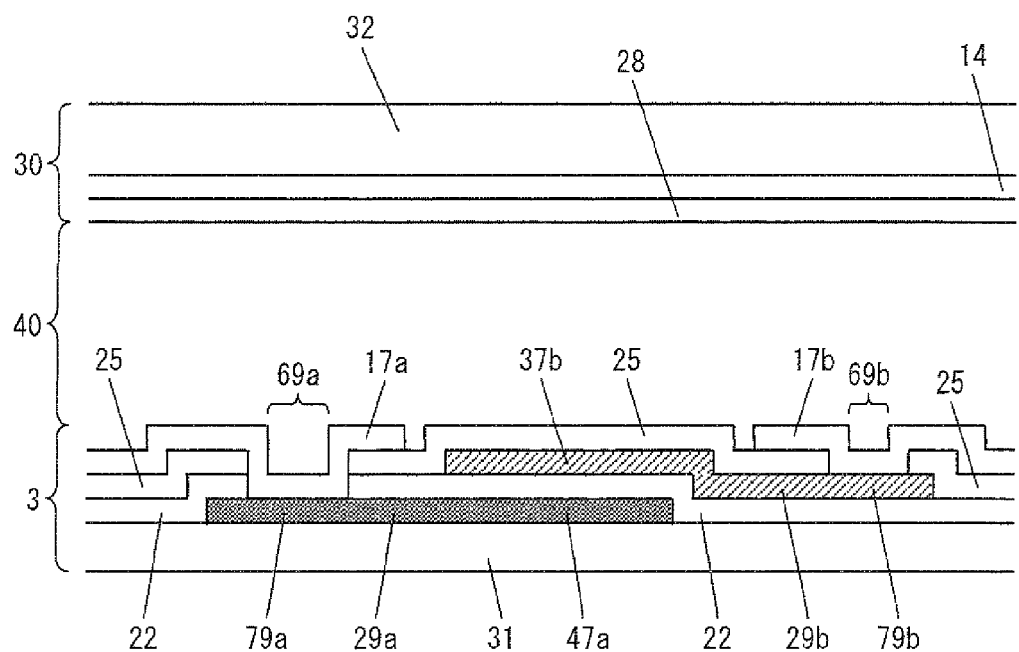
FIG. 4 is a cross-sectional view taken along a line X2-Y2 of FIG. 2.

FIG. 4 is a cross-sectional view taken along a line X2-Y2 of FIG. 2. As illustrated in FIG. 4, in the active matrix substrate 3, the first lower capacitor electrode 47a, the first lower capacitor electrode extension 29a, and the contact electrode 79a are formed on the glass substrate 31. The inorganic gate insulating film 22 is formed so as to cover the above members. Scanning signal lines (not shown) are also formed on the glass substrate 31. Formed on the inorganic gate insulating film 22 are members such as a semiconductor layer (i layer and n+ layer; not shown), the source electrode and the drain electrode (not shown) which have contact with the n+ layer, the second upper capacitor electrode 37b, the second upper capacitor electrode extension 29b, and the contact electrode 79b. The inorganic interlayer insulating film 25 is formed so as to cover the above members on the inorganic gate insulating film 22. The pixel electrodes 17a and 17b are formed on the inorganic interlayer insulating film 25. Further, an alignment film (not shown) is formed so as to cover the pixel electrodes 17a and 17b.

The inorganic interlayer insulating film 25 and the inorganic gate insulating film 22 are penetrated at the contact hole 69a, which connects the pixel electrode 17a with the contact electrode 79a. The inorganic interlayer insulating film 25 is penetrated at the contact hole 69b, which connects the pixel electrode 17b with the contact electrode 79b. In other words, the pixel electrode 17a and the first lower capacitor electrode 47a are electrically connected with each other, and the pixel electrode 17b and the second upper capacitor electrode 37b are electrically connected with each other. The second upper capacitor electrode 37b overlaps the first lower capacitor electrode 47a via the inorganic gate insulating film 22. As such, the coupling capacitor Cab2 is formed (see FIG. 1).

As illustrated in FIGS. 3 and 4, in the color filter substrate 30, a colored layer 14 is provided on a glass substrate 32, a common electrode (corn) 28 is provided on the colored layer 14, and an alignment film (not shown) is provided in such a manner as to cover the common electrode 28.

Figure 5:
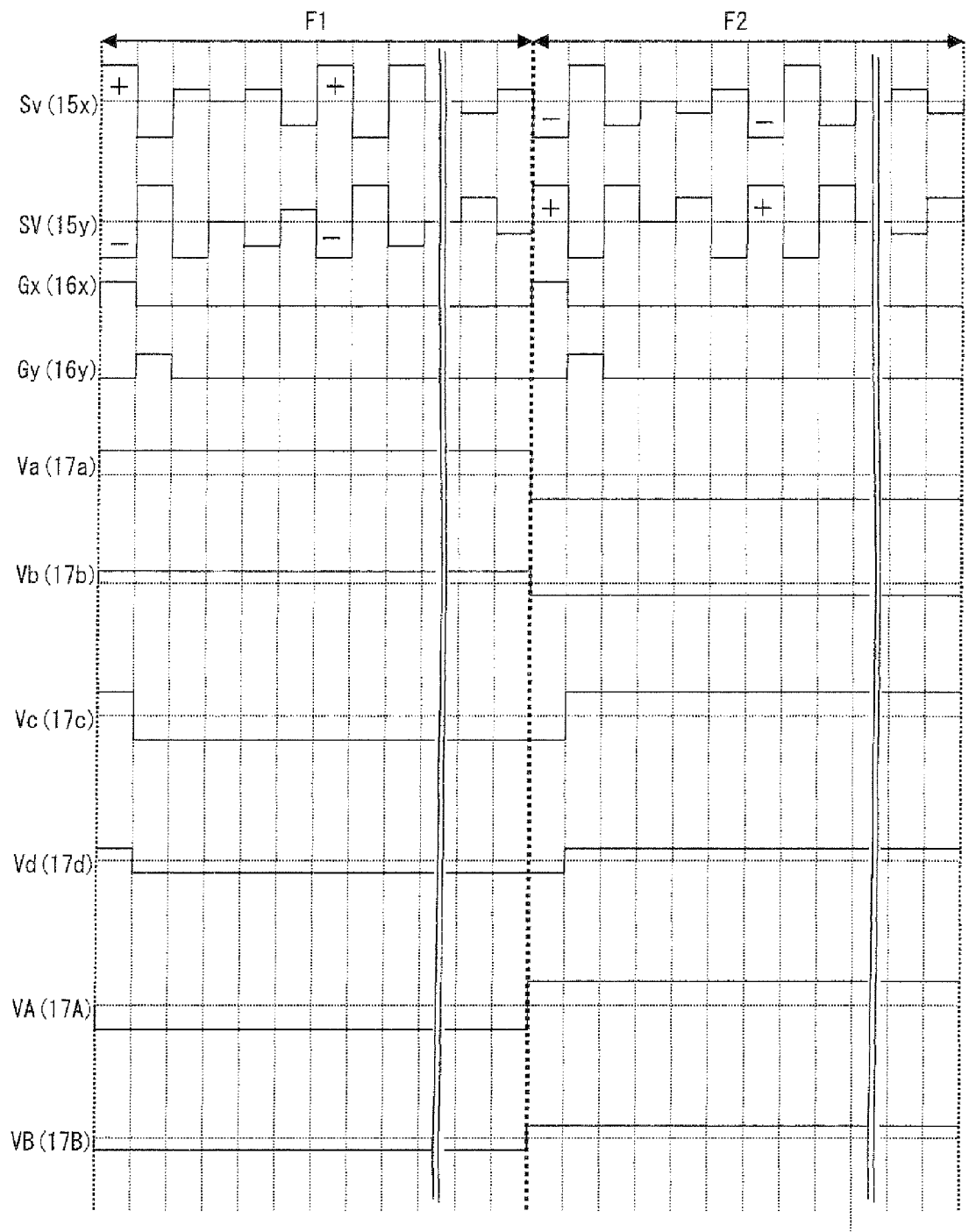
FIG. 5 is a timing chart illustrating a method for driving a liquid crystal display device including the liquid crystal panel of FIG. 1.

FIG. 5 is a timing chart showing a driving method of the present liquid crystal display device (normally black mode liquid crystal display device), including the liquid crystal panel shown in FIGS. 1 and 2. Sv and SV indicate signal potentials supplied to two adjacent data signal lines (for example, 15x and 15y), respectively. Gx and Gy indicate gate ON pulse signals supplied to the scanning signal lines 16x and 16y, respectively. Va, Vb, VA, VB, Vc, and Vd indicate potentials of the pixel electrodes 17a, 17b, 17A, 17B, 17c, and 17d, respectively.

In this driving method, as illustrated in FIG. 5, scanning signal lines are sequentially selected, the polarity of a signal potential supplied to a data signal line is inverted with respect to every one horizontal scanning period (1H), the polarity of a signal potential supplied to a specific horizontal scanning period in individual frames is inverted with respect to every one frame, and signal potentials with different polarities are supplied to two adjacent data signal lines in an identical horizontal scanning period.

Specifically, consecutive frames F1 and F2 are designed as follows: in the frame F1, scanning signal lines are sequentially selected (for example, the scanning signal lines 16x and 16y are selected in that order). One of two adjacent data signal lines (for example, the data signal line 15x) is supplied with a signal potential having a positive polarity in a first horizontal scanning period (including a writing period for the pixel electrode 17a, for example) and a signal potential having a negative polarity in a second horizontal scanning period (including a writing period for the pixel electrode 17c, for example). The other of the two adjacent data signal lines (for example, the data signal line 15y) is supplied with a signal potential having a negative polarity in the first horizontal scanning period (including a writing period for the pixel electrode 17A, for example) and a signal potential having a positive polarity in the second horizontal scanning period (including a writing period for the pixel electrode 17C, for example). Consequently, as illustrated in FIG. 5, $|Va| \geq |Vb|$, $|Vc| \geq |Vd|$, and $|VA| \geq |VB|$.

Figure 6:
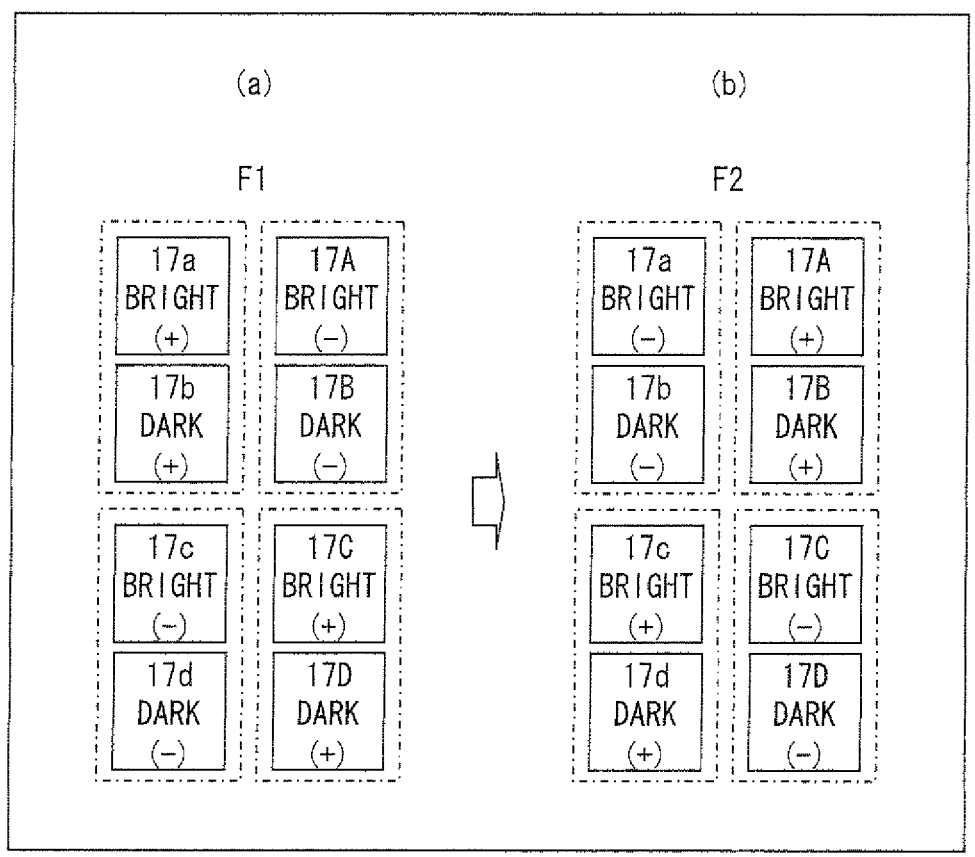
FIG. 6 is a view schematically illustrating respective display states for different frames which display states are observed in a case where the driving method of FIG. 5 is used.

A sub-pixel including the pixel electrode 17a (positive polarity) serves as a bright sub-pixel (hereinafter referred to as "bright"), a sub-pixel including the pixel electrode 17b (positive polarity) serves as a dark sub-pixel (hereinafter referred to as "dark"), a sub-pixel including the pixel electrode 17c (negative polarity) serves as "bright," a sub-pixel including the pixel electrode 17d (negative polarity) serves as "dark," a sub-pixel including the pixel electrode 17A (negative polarity) serves as "bright," and a sub-pixel including the pixel electrode 17B (negative polarity) serves as "dark." (a) of FIG. 6 illustrates an overall state of the above sub-pixels for the frame F1.

Further, in the frame F2, the scanning signal lines are sequentially selected (for example, the scanning signal lines 16x and 16y are selected in that order). One of the two adjacent data signal lines (for example, the data signal line 15x) is supplied with a signal potential having a negative polarity in a first horizontal scanning period (including a writing period for the pixel electrode 17a, for example) and a signal potential having a positive polarity in a second horizontal scanning period (including a writing period for the pixel electrode 17c, for example). The other of the two adjacent data signal lines (for example, the data signal line 15y) is supplied with a signal potential having a positive polarity in the first horizontal scanning period (including a writing period for the pixel electrode 17A, for example) and a signal potential having a negative polarity in the second horizontal scanning period (including a writing period for the pixel electrode 17C, for example). Consequently, as illustrated in FIG. 5, $|Va| \geq |Vb|$, $|Vc| \geq |Vd|$, and $|VA| \geq |VB|$.

The sub-pixel including the pixel electrode 17a (negative polarity) serves as "bright," the sub-pixel including the pixel electrode 17b (negative polarity) serves as "dark," the sub-pixel including the pixel electrode 17c (positive polarity) serves as "bright," the sub-pixel including the pixel electrode 17d (positive polarity) serves as "dark," the sub-pixel including the pixel electrode 17A (positive polarity) serves as "bright," and the sub-pixel including the pixel electrode 17B (positive polarity) serves as "dark." (b) of FIG. 6 illustrates an overall state of the above sub-pixels for the frame F2.

Figure 41:
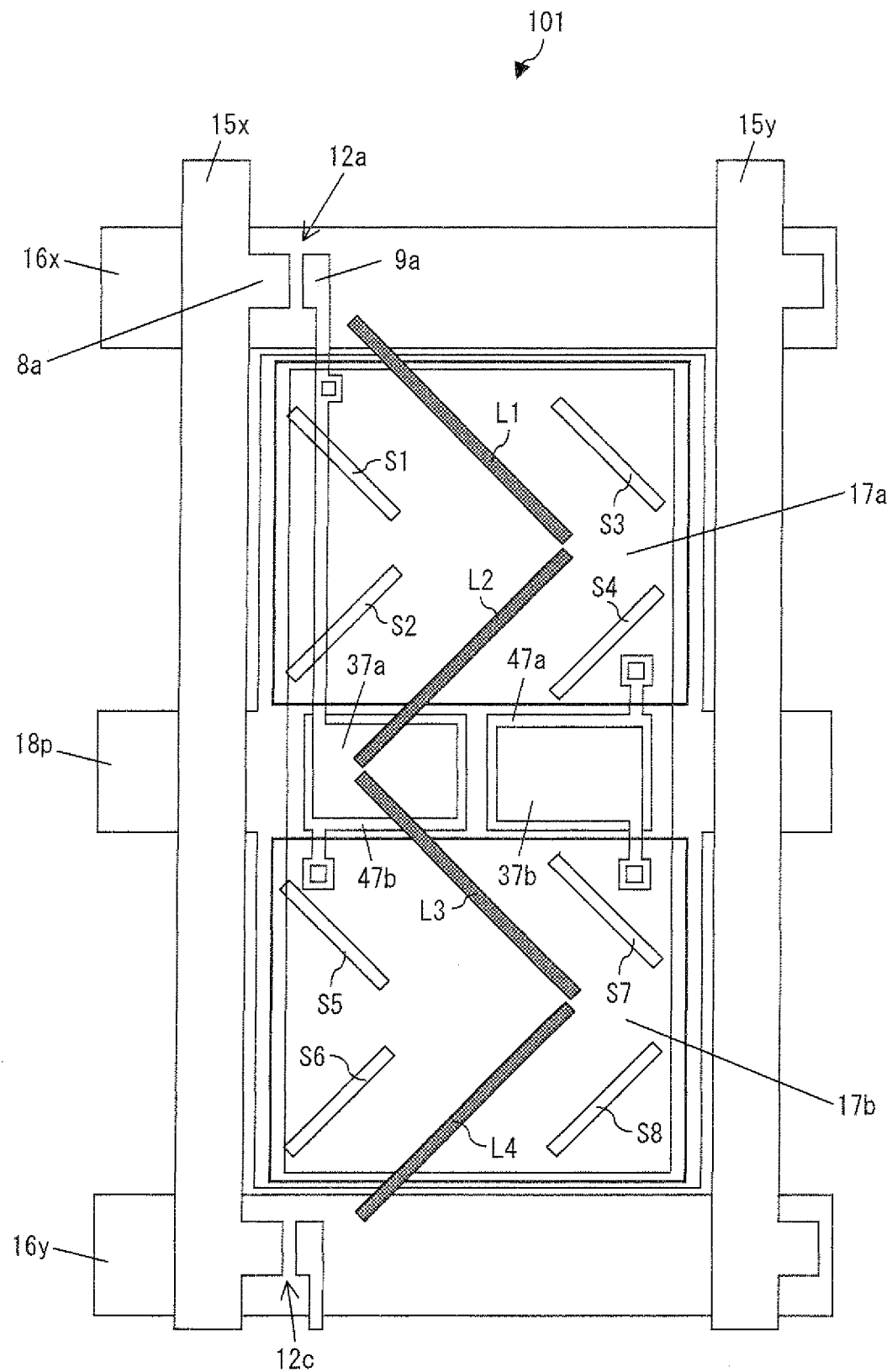
FIG. 41 is a plan view illustrating a variation of the liquid crystal panel of FIG. 2.

Although alignment controlling structures are not shown in FIG. 2, an MVA (Multidomain Vertical Alignment) liquid crystal panel is designed, for example, such that as illustrated in FIG. 41, (i) the pixel electrode 17a has alignment controlling slits S1-S4, (ii) the color filter substrate has alignment controlling ribs L1 and L2 at a portion corresponding to the pixel electrode 17a, (iii) the pixel electrode 17b has alignment controlling slits S5-S8, and (iv) the color filter substrate has alignment controlling ribs L3 and L4 at a portion corresponding to the pixel electrode 17b. Instead of the alignment controlling ribs as above, a common electrode of the color filter substrate may be provided with alignment controlling slits.

In the liquid crystal panel illustrated in FIG. 2, the pixel electrodes 17a and 17b are connected (capacitance-coupled) with each other via the two coupling capacitors (Cab1 and Cab2) which are provided in parallel to each other. Therefore, even if, for example, the drain extracting line 27a is broken at P in FIG. 2 (during a production step or the like), it is possible to maintain the capacitive coupling between the pixel electrodes 17a and 17b with use of the second upper capacitor electrode 37b. In a case where there has occurred a short circuit between the first upper capacitor electrode 37a and the second lower capacitor electrode 47b, it is possible to maintain the capacitive coupling between the pixel electrodes 17a and 17b by carrying out a correction step of (i) cutting the drain extracting line 27a at a portion between the contact hole 11a and the first upper capacitor electrode 37a, (ii) cutting with a laser beam the first upper capacitor electrode 37a at a portion at which it is connected with the drain extracting line 27a, or (iii) cutting with a laser beam the second lower capacitor electrode 47b at a portion at which it is connected with the pixel electrode 17b. In a case where there has occurred a short circuit between the second upper capacitor electrode 37b and the first lower capacitor electrode 47a, it is simply necessary to cut with a laser beam (i) the second upper capacitor electrode 37b at a portion at which it is connected with the pixel electrode 17b or (ii) the first lower capacitor electrode 47a at a portion at which it is connected with the pixel electrode 17a. In a case where there has occurred a short circuit between the first upper capacitor electrode 37a and the data signal line 15x, it is simply necessary to cut with a laser beam both (i) the first upper capacitor electrode 37a at a portion at which it is connected with the pixel electrode 17a and (ii) the second lower capacitor electrode 47b at the portion at which it is connected with the pixel electrode 17b. Similarly, in a case where there has occurred a short circuit between the second upper capacitor electrode 37b and the data signal line 15y, it is simply necessary to cut with a laser beam both (i) the second upper capacitor electrode 37b at the portion at which it is connected with the pixel electrode 17b and (ii) the first lower capacitor electrode 47a at a portion at which it is connected with the pixel electrode 17a.

Figure 7:
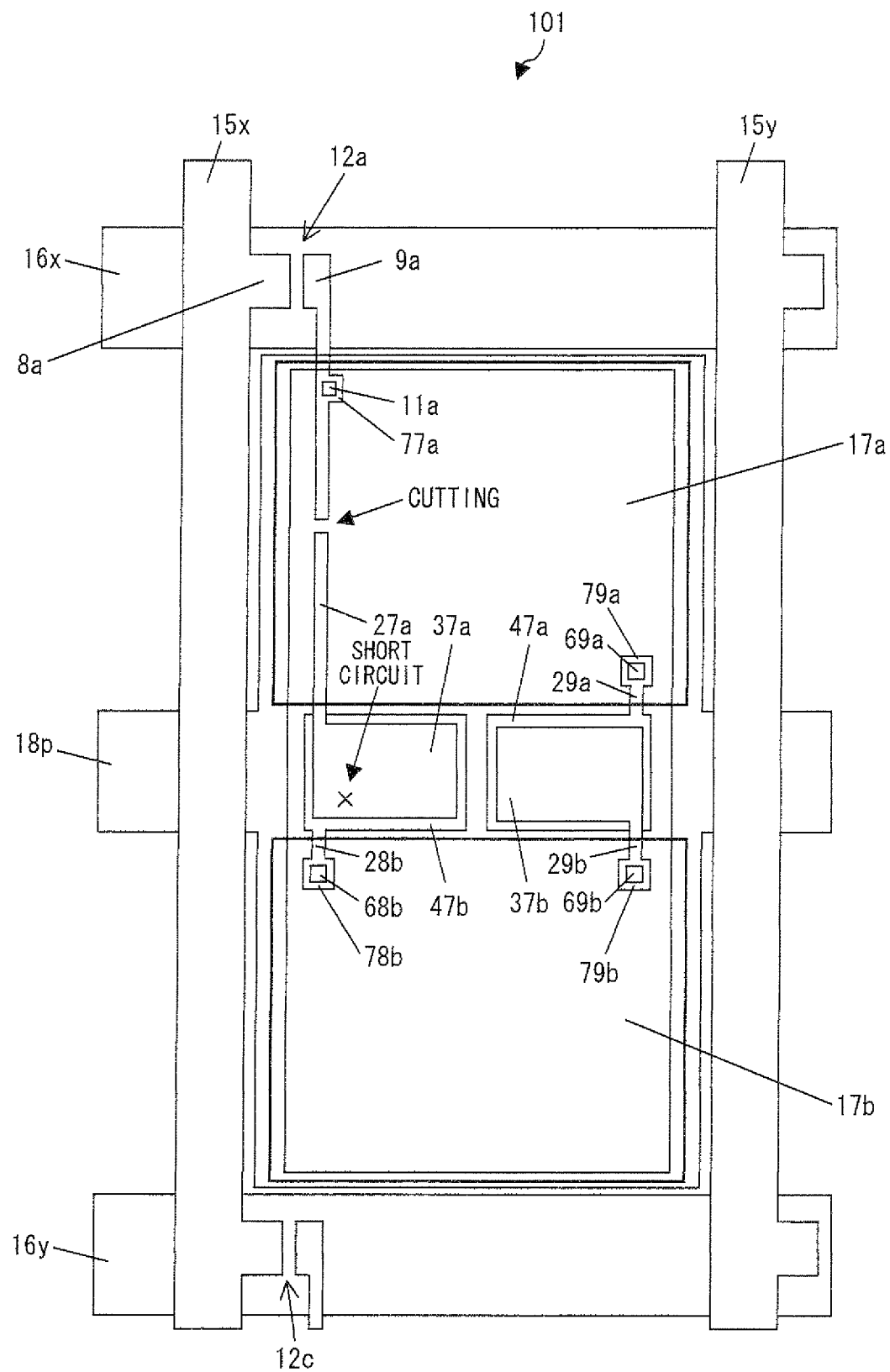
FIG. 7 is a plan view illustrating a method for correcting the liquid crystal panel of FIG. 2.

In a case where the correction step is carried out with respect to the active matrix substrate 3, the drain extracting line 27a (i.e., a portion of the drain extracting line 27a which portion is present between the contact hole 11a and the first upper capacitor electrode 37a) is irradiated with a laser beam from a back surface side of the active matrix substrate 3 (i.e., from a glass substrate 31 side) so as to be cut (see FIG. 7). Alternatively, the first upper capacitor electrode 37a is irradiated with a laser beam from a top surface side of the active matrix substrate 3 (i.e., from a counter side to the glass substrate 31 side) via the gap between the pixel electrodes 17a and 17b so as to be cut. Such a technique by which the first upper capacitor electrode 37a is irradiated with a laser beam from the top surface side of the active matrix substrate 3 so as to be cut has an advantage in that there is no need to reverse the active matrix substrate 3 in the correction step. In a case where the correction step is carried out with respect to the liquid crystal panel, it is simply necessary to cut, by laser irradiation from a back surface side of the liquid crystal panel (i.e., from the glass substrate 31 side), either (i) the drain extracting line 27a (i.e., the portion of the drain extracting line 27a which portion is present between the contact hole 11a and the first upper capacitor electrode 37a) or (ii) the first upper capacitor electrode 37a via a gap between the pixel electrodes 17a and 17b.

Thus, according to the present embodiment, it is possible to improve a process yield of producing a liquid crystal panel and an active matrix substrate to be provided in the liquid crystal panel. In the case of the conventional active matrix substrate illustrated in FIG. 48, potential control of the pixel electrode 121b cannot be carried out if the extracting line 119 is broken. In a case where there has occurred a short circuit between the control electrode 118 and the capacitor electrode 113, cutting the extracting line 119 allows a signal potential to be supplied to the pixel electrode 121a. However, the pixel electrode 121b cannot be capacitance-coupled to the pixel electrode 121a.

In the liquid crystal panel of FIG. 2, each of the first and second lower capacitor electrodes 47a and 47b is larger in area than a corresponding one of the first and second upper capacitor electrodes 37a and 37b. The liquid crystal panel is thus advantageous in that even if the above capacitor electrodes are misaligned with respect to one another to an extent, a change is not easily caused to a total amount of the two coupling capacitors (Cab1 and Cab2), that is, a total amount of (i) an area by which the first lower capacitor electrode 47a overlaps the second upper capacitor electrode 37b and (ii) an area by which the second lower capacitor electrode 47b overlaps the first upper capacitor electrode 37a. Note that each of the first and second upper capacitor electrodes 37a and 37b may alternatively be larger in area than a corresponding one of the first and second lower capacitor electrodes 47a and 47b. The above advantage can be achieved even in this case.

The following explains a process for producing the liquid crystal panel of the present invention. The process includes an active matrix substrate producing step, a color filter substrate producing step, and a fabricating step of attaching the substrates to each other and filling the space between the substrates with liquid crystal to make the liquid crystal panel. Further, an inspection step is carried out while or after at least one of the active matrix substrate producing step and the fabricating step is carried out. If a defect of a pixel (or sub-pixel) is detected in the inspection step, a correction step for correcting the defect is additionally carried out.

The active matrix substrate producing step will be described first.

Initially, a film of a metal such as titanium, chrome, aluminum, molybdenum, tantalum, tungsten, and copper; an alloy film thereof; or a laminate film thereof (with a thickness of 1000 Å-3000 Å) is formed by sputtering on a substrate made of a material such as glass and plastic. Thereafter, the film thus formed is patterned by a photolithography technique (Photo Engraving Process; hereinafter referred to as "PEP technique") to form scanning signal lines, gate electrodes of transistors (in some cases, scanning signal lines double as gate electrodes), a gate metal layer (the first and second lower capacitor electrodes 47a and 47b), and retention capacitor lines.

Subsequently, an inorganic insulating film (with a thickness of approximately 3000 Å-5000 Å) made of silicon nitride or silicon oxide is formed by CVD (Chemical Vapor Deposition) on the whole substrate on which the scanning signal lines etc. have been formed, thereby forming a gate insulating film. A silicon nitride film, for example, is formed while the substrate is kept at a temperature of 350° C.

Subsequently, on the gate insulating film (whole substrate), an intrinsic amorphous silicon film (with a thickness of 1000 Å-3000 Å) and an n+ amorphous silicon film (with a thickness of 400 Å-700 Å) doped with phosphorous are sequentially formed. Thereafter, the films thus formed are patterned by the PEP technique so as to form a silicon laminate made of an intrinsic amorphous silicon layer and an n+ amorphous silicon layer in such a manner that the silicon laminate has an insular shape.

Subsequently, on the substrate where the silicon laminate has been formed, a film of a metal such as titanium, chrome, aluminum, molybdenum, tantalum, tungsten, and copper; an alloy film thereof; or a laminate film thereof (with a thickness of 1000 Å-3000 Å) is formed by sputtering. Thereafter, the film thus formed is patterned by the PEP technique so as to form data signal lines, source electrodes and drain electrodes of transistors, drain extracting lines, and electric conductors (the first and second upper capacitor electrodes 37a and 37b).

Further, using the source electrodes and the drain electrodes as masks, the n+ amorphous silicon layer constituting the silicon laminate is removed by etching so as to form channels for the transistors. The semiconductor layer may be made of the amorphous silicon film as described above. Alternatively, the semiconductor layer may be made of a polysilicon film, or may be made of an amorphous silicon film and a polysilicon film each subjected to a laser annealing in order to improve crystallinity. This increases the moving velocity of electrons in the semiconductor layer, which improves characteristics of the transistor (TFT).

Subsequently, on the whole substrate where the data signal lines etc. have been formed, an inorganic insulating film (with a thickness of 2000 Å-5000 Å) made of silicon nitride or silicon oxide is formed by CVD so as to form an inorganic interlayer insulating film. A silicon nitride film, for example, is formed while the substrate is kept at a temperature of 250° C.

Thereafter, either the interlayer insulating film or the interlayer insulating film and the gate insulating film are removed by etching by the PEP technique to form contact holes. Then, a transparent conductive film (with a thickness of 1000 Å-2000 Å) made of a material such as ITO (Indium Tin Oxide), IZO (Indium Zinc Oxide), zinc oxide, and tin oxide is formed by sputtering on the whole substrate so as to be on the interlayer insulating film where the contact holes have been formed. Thereafter, the transparent conductive film is patterned by the PEP technique to form pixel electrodes.

Lastly, polyimide resin with a thickness of 500 Å-1000 Å is printed on the whole substrate so as to be on the pixel electrodes, and is thereafter sintered and subjected to a one-direction rubbing treatment with a rotating cloth so as to form an alignment film. Thus, the active matrix substrate is produced.

The following explains the color filter substrate producing step.

Initially, either a chrome thin film or a resin containing a black pigment is formed on a substrate (whole substrate) made of a material such as glass and plastic, and then the film thus formed is patterned by the PEP technique to form black matrices. Then, at spaces between the black matrices, red, green, and blue color filter layers (with a thickness of approximately 2 μm) are pattern-formed by a method such as pigment diffusing method.

Subsequently, a transparent conductive film (with a thickness of appropriately 1000 Å) made of a material such as ITO, IZO, zinc oxide, and tin oxide is formed on the whole substrate to be on the color filter layers to form a common electrode (com).

Lastly, polyimide resin with a thickness of 500 Å-1000 Å is printed on the whole substrate so as to be on the common electrode, and is then sintered and subjected to a one-direction rubbing treatment with a rotating cloth so as to form an alignment film. Thus, the color filter substrate is produced.

The following explains the fabricating step.

Initially, a sealing material made of thermosetting epoxy resin is applied by screen printing to one of the active matrix substrate and the color filter substrate in such a manner that the sealing material forms a frame pattern with a cut via which liquid crystal is to be injected, and spherical spacers made of plastic or silica with a diameter corresponding to the thickness of the liquid crystal layer are dispersed on the other of the substrates.

Subsequently, the active matrix substrate and the color filter substrate are attached to each other, and the sealing material is cured.

Lastly, a liquid crystal material is poured into a space surrounded by the active matrix substrate, the color filter substrate, and the sealing material by a vacuum method, and then UV curing resin is applied to a part via which the liquid crystal has been poured, and the substrates are subjected to UV radiation so as to seal the liquid crystal material and thus form a liquid crystal layer therebetween. Thus, the liquid crystal panel is produced.

The following describes a first inspection step to be carried out either during the active matrix substrate producing step (e.g., after the pixel electrodes are formed and before the alignment film is formed) or after the active matrix substrate producing step is carried out. In the first inspection step, the active matrix substrate is subjected to inspection such as visual inspection and electro-optical inspection so that a portion where a short circuit, if any, has occurred (short-circuiting section) is detected. Short circuits encompass, for example, (i) a short circuit between an electric conductor (the first and second upper capacitor electrodes 37a and 37b) and a capacitor electrode (the first and second lower capacitor electrodes 47a and 47b) and (ii) a short circuit between an electric conductor (the first and second upper capacitor electrodes 37a and 37b) and a data signal line (15x and 15y). In the visual inspection, a wiring pattern is optically inspected by use of a CCD camera or the like. In the electro-optical inspection, first, a modulator (electro-optical element) is placed so as to face the active matrix substrate. Then, a voltage is applied between the active matrix substrate and the modulator. In addition, light is emitted between the active matrix substrate and the modulator. The CCD camera captures a change in luminance of the light so that the wiring pattern is electro-optically inspected.

If a portion where a short circuit has occurred is detected, the correction step is carried out in which an electric conductor involved in the short circuit or an electrically conductive part (e.g., drain extracting line) connected with the electric conductor is cut with a laser beam. In this laser beam cutting, a fourth harmonic (wavelength of 266 nm) of a YAG (Yttrium Aluminum Garnet) laser beam is used, for example. This makes it possible to improve accuracy of the laser beam cutting. In a case where a portion where short-circuiting has occurred is detected, a correction step can be carried out in some cases, in such a manner that a portion of a pixel electrode connected with the short-circuited electric conductor via the contact hole which portion corresponds to a contact hole is removed (trimmed) with a laser beam or the like. In the correction step to be carried out after the first inspection step is carried out, it is usually possible to emit a laser beam from a top surface side of an active matrix substrate (i.e., from a pixel electrodes side) or from a back surface side of the active matrix substrate (i.e., from a glass substrate side).

Other than a timing after the pixel electrodes are formed, the first inspection step and the correction step can be carried out after the electric conductors (the first and second upper capacitor electrodes 37a and 37b) are formed, or after the channels of the transistors are formed. This makes it possible to correct a defect at an earlier stage in the production step. As a result, it is possible to improve a process yield of producing the active matrix substrate.

The following describes a second inspection step to be carried out after the fabricating step is carried out. In the second inspection step, a lighting inspection of the liquid crystal panel is carried out so that a portion where a short circuit, if any, has occurred is detected. Short circuits encompass, for example, a short circuit between (i) the first and second upper capacitor electrodes 37a and 37b and (ii) a capacitor electrode (the first and second lower capacitor electrodes 47a and 47b); and a short circuit between (i) the first and second upper capacitor electrodes 37a and 37b and (ii) the data signal lines 15x and 15y. Specifically, for example, a gate inspection signal which is a pulse voltage of +15V, having: a bias voltage of −10V; a cycle of 16.7 msec; and a pulse width of 50 μsec, is supplied to each of the scanning signal lines so that all TFTs have an ON state. In addition, a source inspection signal is supplied to each of the data signal lines. The source inspection signal has an electric potential of ±2V which is reversed in polarity every 16.7 msec. Thus, a signal potential corresponding to the electric potential of ±2V is supplied to each of the pixel electrodes via a source electrode and a drain electrode of a corresponding one of the TFTs. Simultaneously, a common electrode inspection signal which is a DC potential of −1V is supplied to the common electrode (com) and each of the retention capacitor lines. Accordingly, a voltage is applied to a liquid crystal capacitor formed between each of the pixel electrodes and the common electrode, and to a retention capacitor formed between each of the retention capacitor lines and a corresponding one of the pixel electrodes. As a result, sub-pixels which are realized respectively by the pixel electrodes have a lighted state. In a portion where there has occurred a short circuit between an electric conductor and a data signal line, a pixel electrode and a corresponding data signal line become electrically conductive with each other. This results in a bright point (i.e., normally black mode). The part where the short circuit has occurred is thus detected.

If a portion where there has occurred a short circuit is detected, the correction step is carried out in which an electric conductor involved in the short circuit or an electrically conductive part (e.g., drain extracting line) connected with the electric conductor is cut with a laser beam. In the correction step to be carried out after the second inspection step is carried out, a laser beam is usually emitted from the back surface side of the active matrix substrate (i.e., from the glass substrate side of the active matrix substrate).

Figure 8:
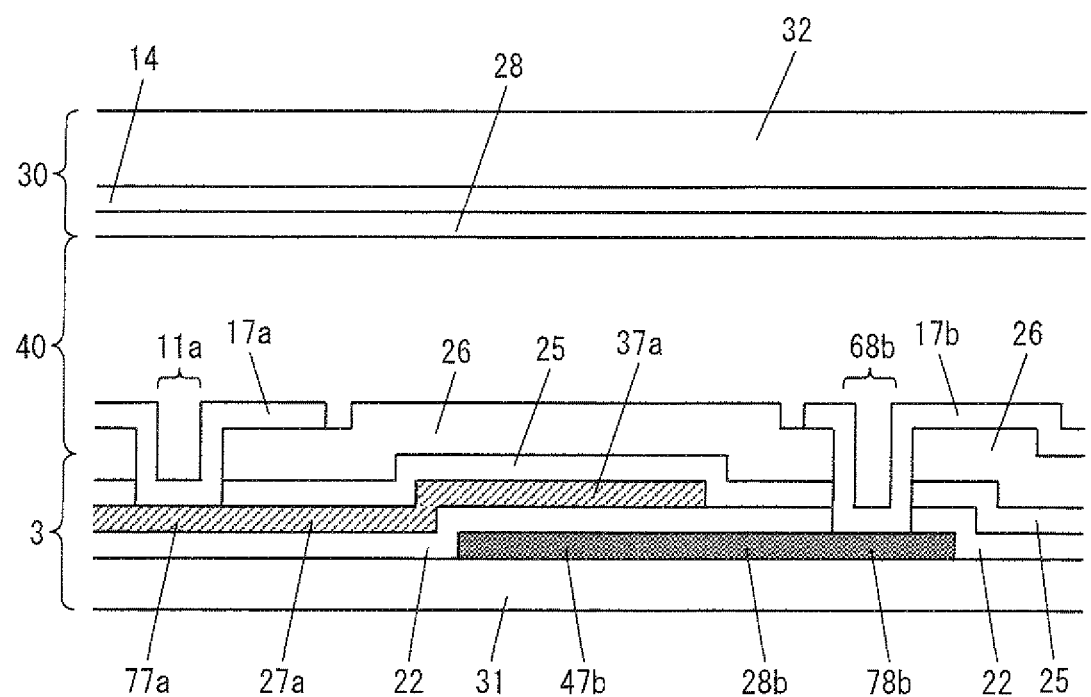
FIG. 8 is a cross-sectional view taken along a line X-Y in a variation of the liquid crystal panel of FIG. 2.

On the inorganic interlayer insulating film 25 illustrated in FIG. 3, an organic interlayer insulating film thicker than the inorganic interlayer insulating film 25 can be provided so that a channel protection film (interlayer insulating film) has a double layer structure as illustrated in FIG. 8. This realizes effects such as a reduction in various parasitic capacitances, prevention of short-circuiting, and a reduction in ripping and the like of a pixel electrode due to planarization.

The following description deals with how to provide the inorganic interlayer insulating film 25, the organic interlayer insulating film 26, and the contact holes 11a and 68b, each of which is illustrated in FIG. 8. After the transistors and the data signal lines are provided, CVD is carried out with respect to an entire surface of the substrate by use of a mixed gas of an $SiH_4$ gas, an $NH_3$ gas, and an $N_2$ gas, so as to provide the inorganic interlayer insulating film 25 (passivation film). The resultant inorganic interlayer insulating film 25 is made from SiNx, and has a thickness of approximately 3000 Å. Then, the organic interlayer insulating film 26 is provided by a spin coating method or a die coating method. The organic interlayer insulating film 26 is made from a positive photosensitive acrylate resin, and has a thickness of approximately 3 μm. Next, the organic interlayer insulating film 26 is subjected to photolithography so as to have hollowed parts and various contact patterns. Further, with the use of the patterned organic interlayer insulating film 26 as a mask, the inorganic interlayer insulating film 25 is subjected to dry etching at each portion corresponding to the contact hole 11a, and the inorganic interlayer insulating film 25 and the gate insulating film 22 are subjected to dry etching at each portion corresponding to the contact hole 68b. The dry etching is carried out by use of a mixed gas of a $CF_4$ gas and an $O_2$ gas. Specifically, in the photolithography, the organic insulating film is (i) partially half-exposed so that after a development step, the organic interlayer insulating film thinly remains at the portion corresponding to the contact hole 11a, and (ii) is partially full-exposed so that after the development step, no organic interlayer insulating film 26 remains at the portion corresponding to the contact hole 68b. The dry etching with use of a mixed gas of a $CF_4$ gas and an $O_2$ gas (i) removes the remainder (of the organic interlayer insulating film) and then the inorganic interlayer insulating film 25 at the portion corresponding to the contact hole 11a, and (ii) removes the inorganic interlayer insulating film 25 below the organic interlayer insulating film and then the gate insulating film 22 at the portion corresponding to the contact hole 68b. The organic interlayer insulating film 26 may be an insulating film made of, for example, an SOG (spin on glass) material. The organic interlayer insulating film 26 may include at least one of acrylic resin, epoxy resin, polyimide resin, polyurethane resin, novolak resin, and siloxane resin.

Figure 9:
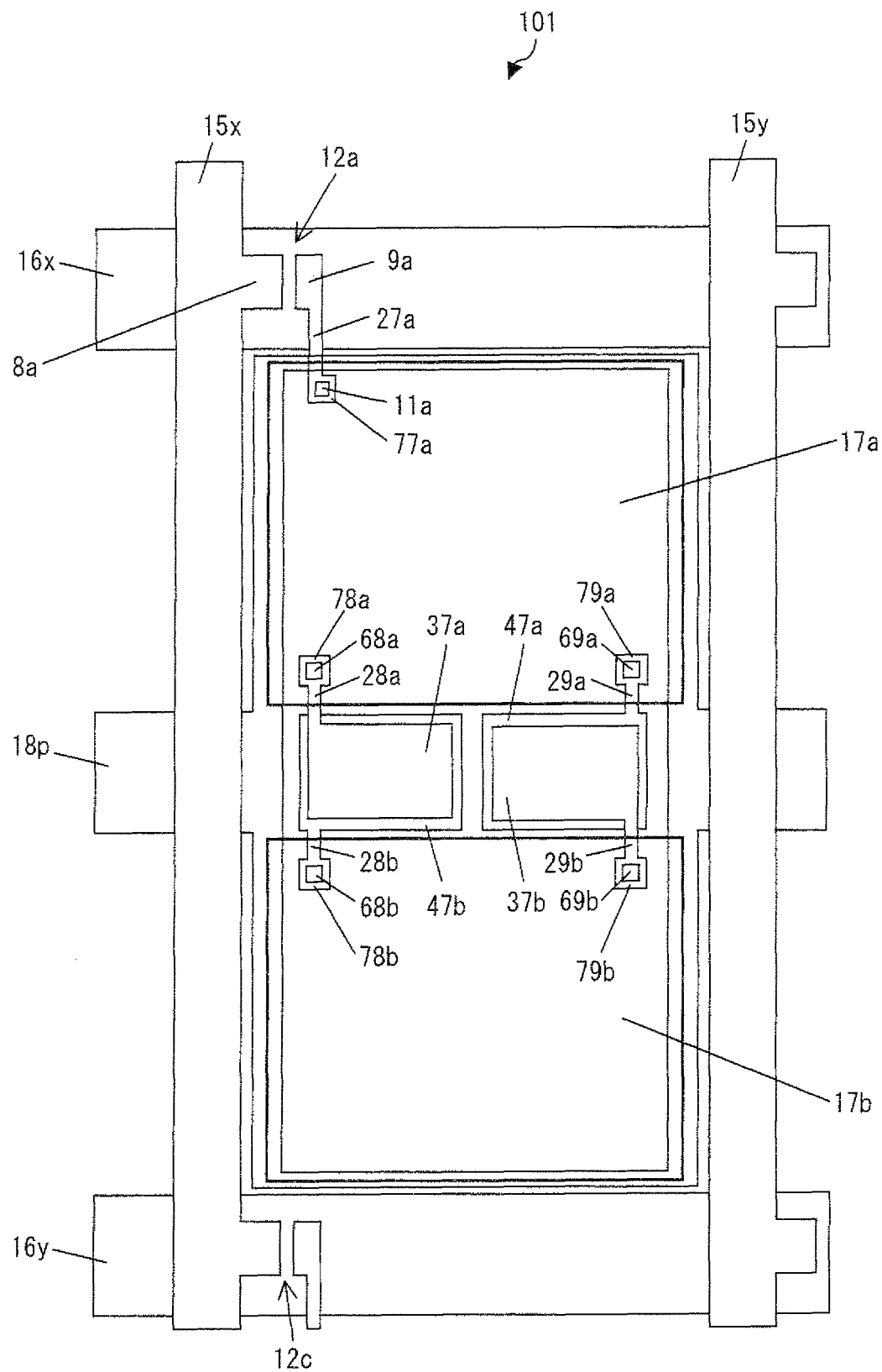
FIG. 9 is a plan view illustrating another specific example of the liquid crystal panel of FIG. 1.
Figure 10:
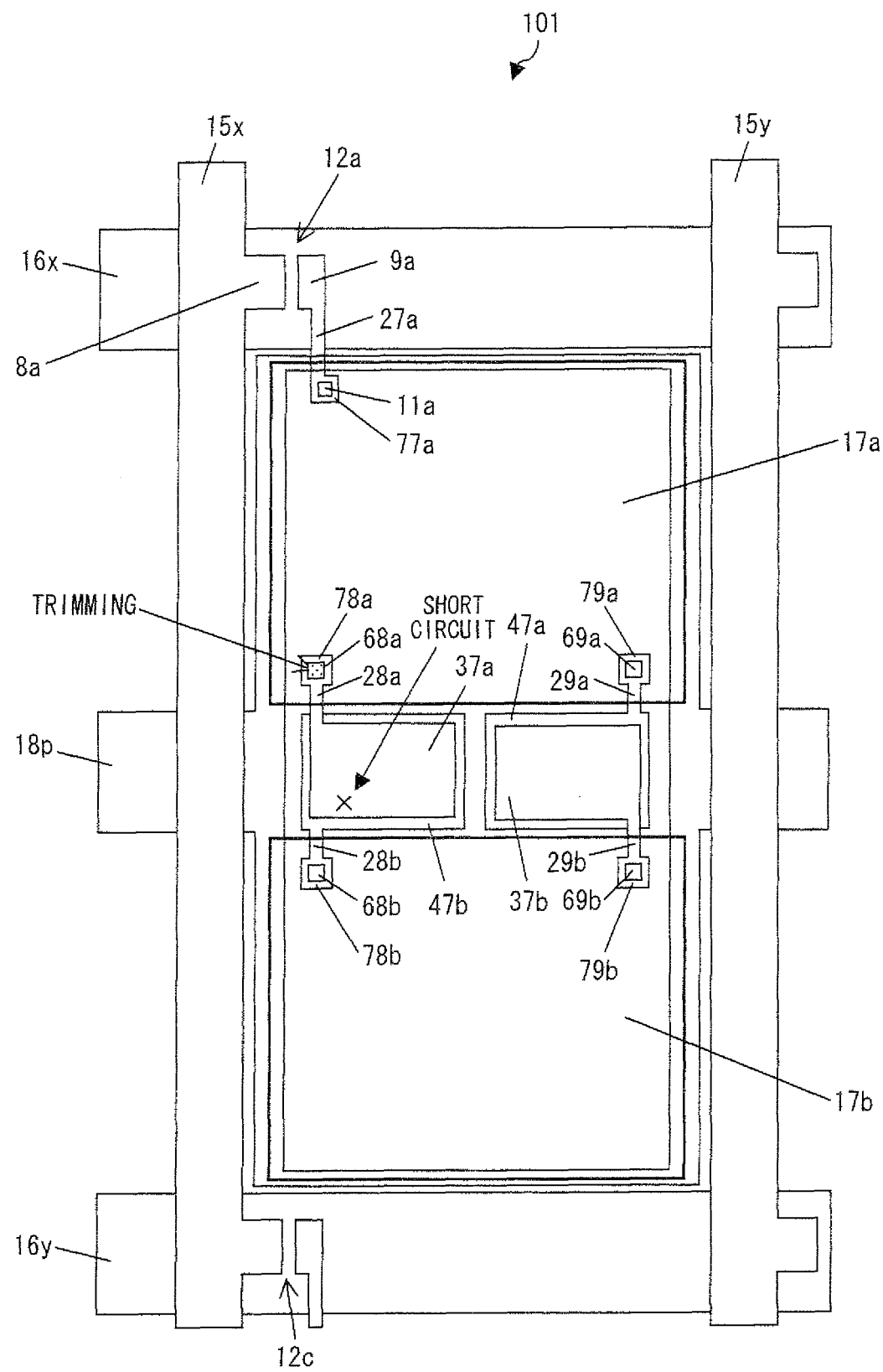
FIG. 10 is a plan view illustrating a method for correcting the liquid crystal panel of FIG. 9.

The pixel 101 illustrated in FIG. 2 can be modified as illustrated in FIG. 9. According to an arrangement illustrated in FIG. 9, the drain electrode 9a of the transistor 12a is connected with the pixel electrode 17a via the contact hole 11a, and the pixel electrode 17a and the first upper capacitor electrode 37a are connected with each other via the contact hole 68a. This makes it possible to shorten the drain extracting line connecting the drain electrode 9a and the first upper capacitor electrode 37a. As a result, an aperture ratio can be increased. In a liquid crystal panel illustrated in FIG. 9, the pixel electrodes 17a and 17b are connected (capacitance-coupled) with each other via the two coupling capacitors (Cab1 and Cab2) which are provided in parallel to each other. Therefore, even if the contact hole 68a becomes defective during a production process or the like, it is possible to maintain the capacitive coupling between the pixel electrodes 17a and 17b. If a short circuit has occurred between the first upper capacitor electrode 37a and the second lower capacitor electrode 47b or the data signal line 15x (during a production process or the like), a portion of the pixel electrode 17a which portion corresponds to the contact hole 68a is removed (trimmed), as illustrated in FIG. 10, with a laser beam or the like so that the pixel electrode 17a and the first upper capacitor electrode 37a are electrically separated. This makes it possible to maintain the capacitive coupling between the pixel electrodes 17a and 17b.

In the liquid crystal panel illustrated in FIG. 1, a transistor is connected with a first one of two pixel electrodes provided in one pixel which first one is closer to the transistor. However, the present invention is not limited to this. That is, as illustrated in FIG. 11, the transistor can be connected with a second one of the two pixel electrodes provided in the one pixel which second one is farther from the transistor.

Figure 11:
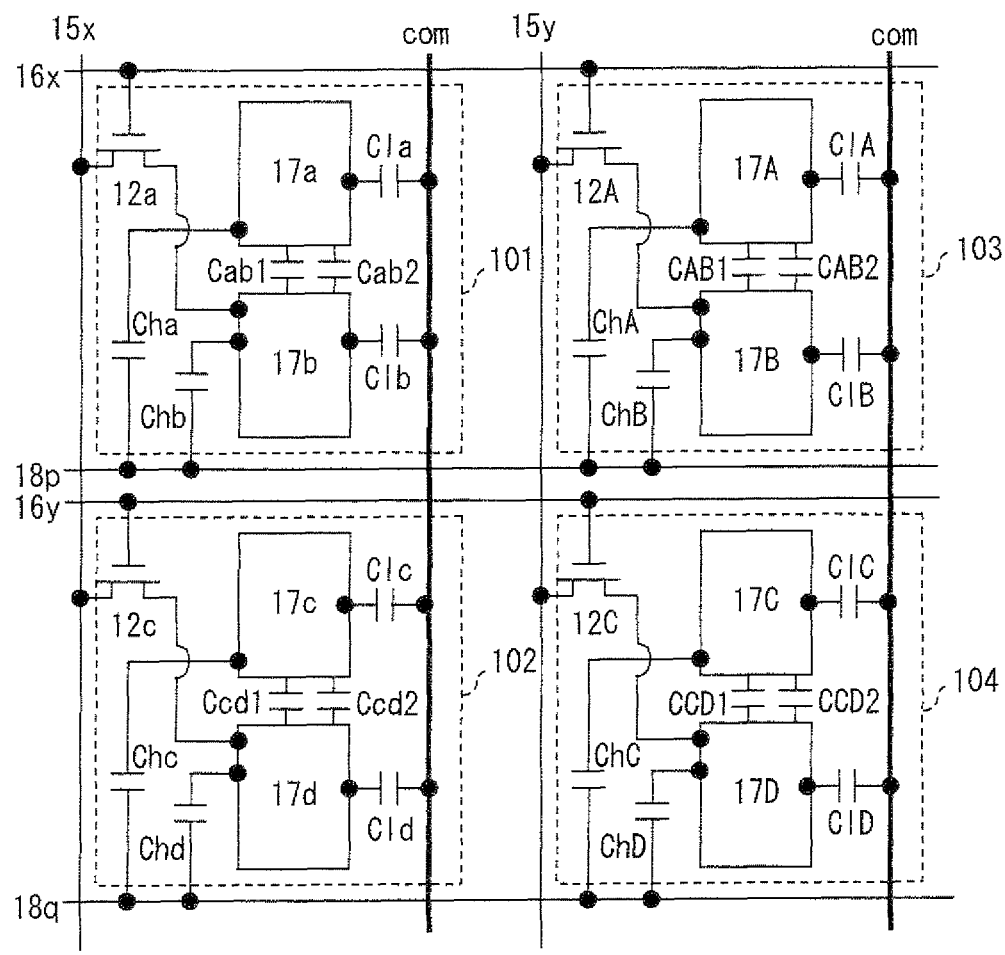
FIG. 11 is a circuit diagram illustrating another configuration of the liquid crystal panel in accordance with Embodiment 1.
Figure 12:
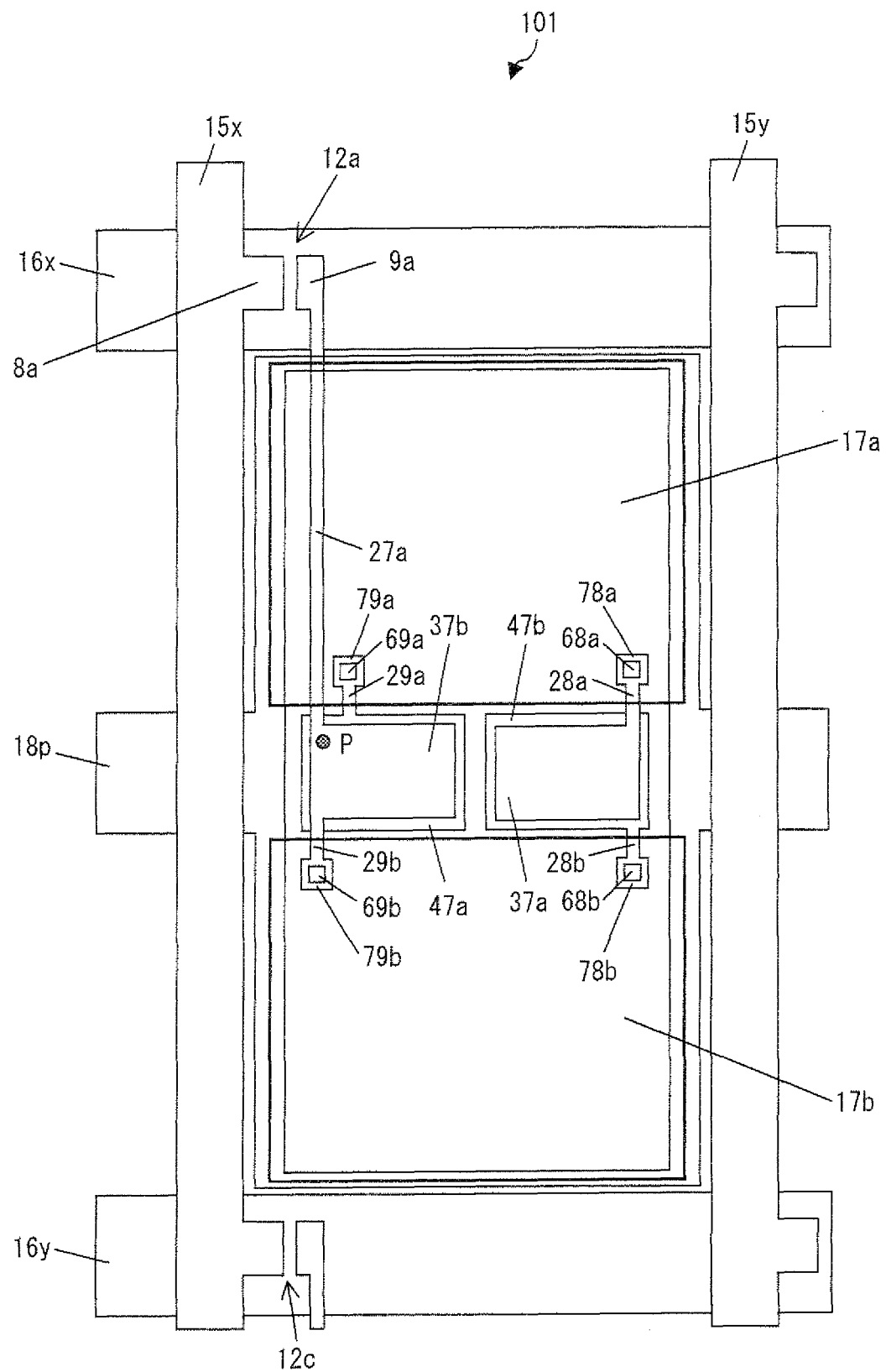
FIG. 12 is a plan view illustrating a specific example of the liquid crystal panel of FIG. 11.

A specific example of the pixel 101 of FIG. 11 is illustrated in FIG. 12. In a liquid crystal panel illustrated in FIG. 12, the pixel 101 is configured as follows: The transistor 12a is provided in the vicinity of an intersection of the data signal line 15x with the scanning signal line 16x. The two signal lines (15x and 16x) define a pixel region, in which the pixel electrodes 17a and 17b, each in a rectangular shape, are arranged in the column direction. One of four sides forming a periphery of a first pixel electrode is adjacent to one of four sides forming a periphery of a second pixel electrode. The pixel 101 includes first and second upper capacitor electrodes 37a and 37b, which are both provided so as to overlap (i) the pixel electrodes 17a, (ii) the pixel electrodes 17b and (iii) a gap between the above two adjacent sides (that is, a gap between the pixel electrodes 17a and 17b). The pixel 101 further includes first and second lower capacitor electrodes 47a and 47b. The first lower capacitor electrode 47a is provided so as to overlap (i) the gap between the two adjacent sides (that is, the gap between the pixel electrodes 17a and 17b) and (ii) the second upper capacitor electrode 37b. The second lower capacitor electrode 47b is provided so as to overlap (i) the gap between the two adjacent sides (that is, the gap between the pixel electrodes 17a and 17b) and (ii) the first upper capacitor electrode 37a. The retention capacitor line 18p includes a retention capacitor line extension which branches off from the retention capacitor line 18p. The retention capacitor line extension extends so as to overlap a part of an edge of each of the pixel electrodes 17a and 17b in a plan view.

More specifically, within the gap between the pixel electrodes 17a and 17b, the first and second upper capacitor electrodes 37a and 37b are arranged in the row direction, and the first and second lower capacitor electrodes 47a and 47b are also arranged in the row direction. The first upper capacitor electrode 37a overlaps the second lower capacitor electrode 47b at a first portion, whereas the second upper capacitor electrode 37b overlaps the first lower capacitor electrode 47a at a second portion, the first and second portions being arranged in the row direction. The retention capacitor line extension of the retention capacitor line 18p extends so as to (i) surround the pixel region and (ii) overlap three sides of each of the pixel electrodes 17a and 17b which three sides are sides other than the side that defines the gap between the pixel electrodes 17a and 17b.

The transistor 12a has a source electrode 8a and a drain electrode 9a both formed above the scanning signal line 16x. The source electrode 8a is connected with the data signal line 15x. The drain electrode 9a is connected with a drain extracting line 27a. The drain extracting line 27a is connected with the second upper capacitor electrode 37b formed in a layer in which the drain extracting line 27a is formed. The second upper capacitor electrode extension 29b connected with the second upper capacitor electrode 37b is connected with the contact electrode 79b, which is in turn connected with the pixel electrode 17b via a contact hole 69b.

The second upper capacitor electrode 37b overlaps the first lower capacitor electrode 47a via a gate insulating film. The first lower capacitor electrode 47a is connected with a first lower capacitor electrode extension 29a. The first lower capacitor electrode extension 29a is connected with a contact electrode 79a, which is in turn connected with the pixel electrode 17a via a contact hole 69a. With this configuration, the coupling capacitor Cab2 (see FIG. 11) between the pixel electrodes 17a and 17b is formed at the portion at which the second upper capacitor electrode 37b overlaps the first lower capacitor electrode 47a.

The first upper capacitor electrode 37a overlaps the second lower capacitor electrode 47b via the gate insulating film. Further, the first upper capacitor electrode 37a is connected with a first upper capacitor electrode extension 28a. The first upper capacitor electrode extension 28a is connected with a contact electrode 78a, which is in turn connected with the pixel electrode 17a via a contact hole 68a. Further, the second lower capacitor electrode 47b is connected with the second lower capacitor electrode extension 28b. The second lower capacitor electrode extension 28b is connected with a contact electrode 78b, which is in turn connected with the pixel electrode 17b via a contact hole 68b. With this configuration, the coupling capacitor Cab1 (see FIG. 11) between the pixel electrodes 17a and 17b is formed at the portion at which the first upper capacitor electrode 37a overlaps the second lower capacitor electrode 47b.

The pixel electrode 17a overlaps the retention capacitor line 18p via an interlayer insulating film and the gate insulating film. With this configuration, the retention capacitor Cha (see FIG. 11) is formed at a portion at which the pixel electrode 17a overlaps the retention capacitor line 18p. Further, the pixel electrode 17b overlaps the retention capacitor line 18p via the interlayer insulating film and the gate insulating film. With this configuration, the retention capacitor Chb (see FIG. 11) is formed at a portion at which the pixel electrode 17b overlaps the retention capacitor line 18p. Other pixels each have a configuration (specifically, how pixel constituents are shaped, positioned and connected) identical to that of the pixel 101.

According to the above arrangement, the sub-pixel including the pixel electrode 17a serves as "dark," and the sub-pixel including the pixel electrode 17b serves as "bright."

In the liquid crystal panel illustrated in FIG. 12, the pixel electrodes 17a and 17b are connected (capacitance-coupled) with each other via the two coupling capacitors (Cab1 and Cab2) which are provided in parallel to each other. Therefore, in a case where there has occurred a short circuit between, for example, the second upper capacitor electrode 37b and the first lower capacitor electrode 47a at P in FIG. 12 (during a production step or the like), it is possible to maintain the capacitive coupling between the pixel electrodes 17a and 17b by carrying out a correction step of cutting with a laser beam the second upper capacitor electrode 37b between (i) a portion at which it is connected with the pixel electrode 17b and (ii) a portion at which the short circuit has occurred. In a case where there has occurred a short circuit between the first upper capacitor electrode 37a and the second lower capacitor electrode 47b, it is simply necessary to cut with a laser beam the first upper capacitor electrode 37a between (i) a portion at which it is connected with the pixel electrode 17a and (ii) a portion at which the short circuit has occurred.

In the liquid crystal panel of FIG. 12, each of the first and second lower capacitor electrodes 47a and 47b is larger in area than a corresponding one of the first and second upper capacitor electrodes 37a and 37b. The liquid crystal panel is thus advantageous in that even if the above capacitor electrodes are misaligned with respect to one another to an extent, a change is not easily caused to a total amount of the coupling capacitors (Cab1 and Cab2), that is, a total amount of (i) an area by which the first lower capacitor electrode 47a overlaps the second upper capacitor electrode 37b and (ii) an area by which the second lower capacitor electrode 47b overlaps the first upper capacitor electrode 37a. Note that each of the first and second upper capacitor electrodes 37a and 37b may alternatively be larger in area than a corresponding one of the first and second lower capacitor electrodes 47a, and 47b. The above advantage can be achieved even in this case.

In each of the pixels of the liquid crystal panel illustrated in FIG. 1, a transistor is connected with a first one of two pixel electrodes provided in the pixel which first one is closer to the transistor. However, the present invention is not limited to this. That is, as illustrated in FIG. 13, it can be arranged such that in one of two pixels which are adjacent to each other in the row direction, a first one of two pixel electrodes which first one is closer to a corresponding transistor is connected to the transistor whereas in the other of the two pixels, a second one of the two pixel electrodes which is farther from a corresponding transistor is connected to the transistor.

Figure 13:
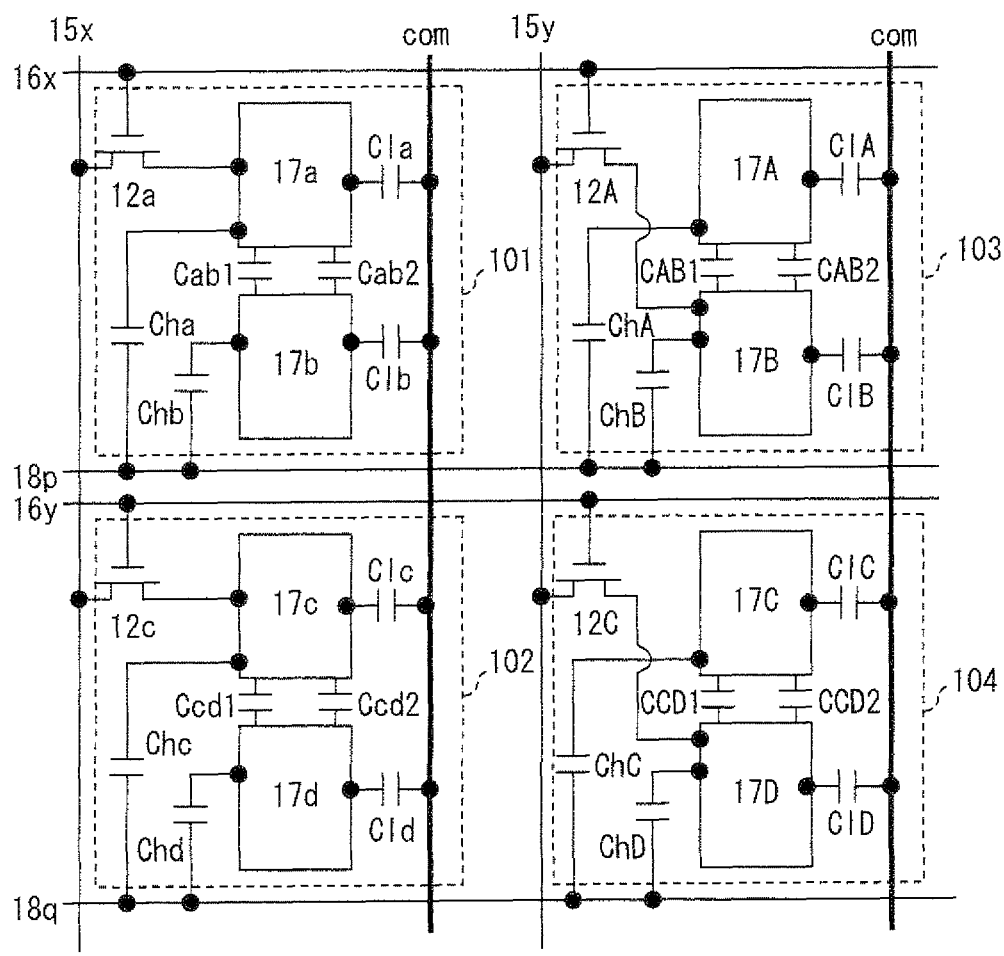
FIG. 13 is a circuit diagram illustrating still another configuration of the liquid crystal panel in accordance with Embodiment 1.
Figure 14:
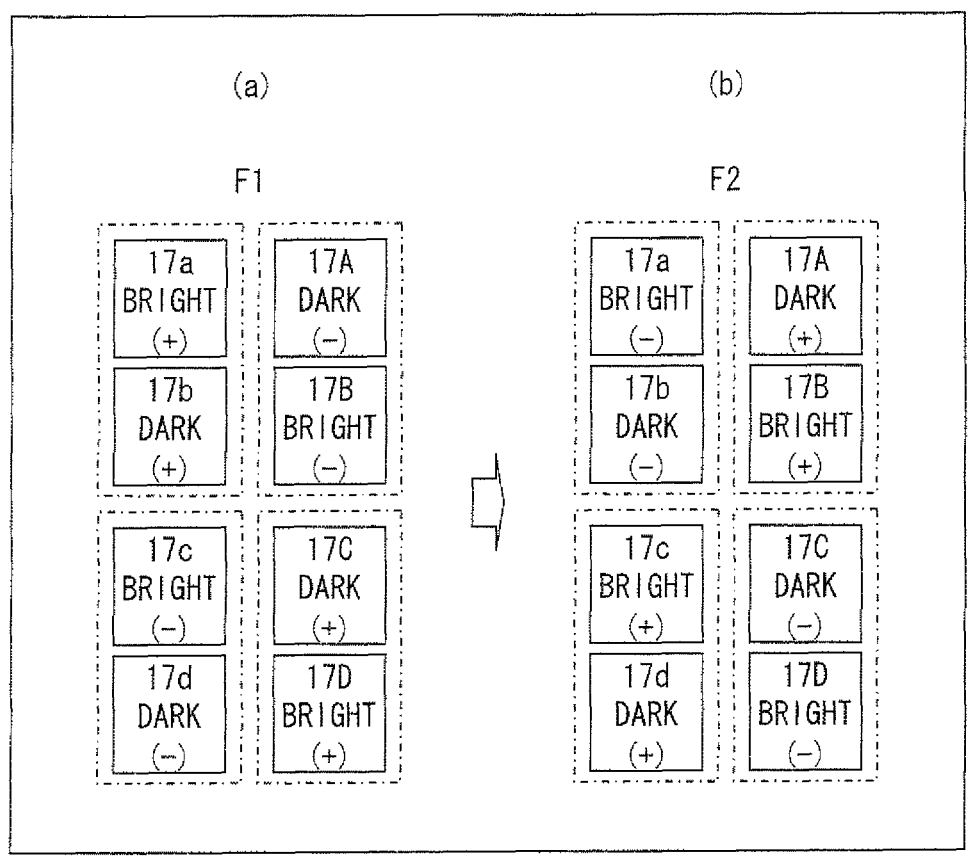
FIG. 14 is a view schematically illustrating respective display states for different frames which display states are observed in a case where the driving method of FIG. 5 is used in a liquid crystal display device including the liquid crystal panel of FIG. 13.

Assume that in a liquid crystal display device including the liquid crystal panel illustrated in FIG. 13, the data signal lines 15x and 15y are driven as illustrated in FIG. 5. In this case, in the frame F1, the sub-pixel including the pixel electrode 17a (positive polarity) serves as "bright," the sub-pixel including the pixel electrode 17b (positive polarity) serves as "dark," the sub-pixel including the pixel electrode 17c (negative polarity) serves as "bright," the sub-pixel including the pixel electrode 17d (negative polarity) serves as "dark," the sub-pixel including the pixel electrode 17A (negative polarity) serves as "dark," and the sub-pixel including the pixel electrode 17B (negative polarity) serves as "bright." (a) of FIG. 14 illustrates an overall state of the above sub-pixels for the frame F1. In the frame F2, the sub-pixel including the pixel electrode 17a (negative polarity) serves as "bright," the sub-pixel including the pixel electrode 17b (negative polarity) serves as "dark," the sub-pixel including the pixel electrode 17c (positive polarity) serves as "bright," the sub-pixel including the pixel electrode 17d (positive polarity) serves as "dark," the sub-pixel including the pixel electrode 17A (positive polarity) serves as "dark," and the sub-pixel including the pixel electrode 17B (positive polarity) serves as "bright." (b) of FIG. 14 illustrates an overall state of the above sub-pixels for the frame F2.

In the liquid crystal panel illustrated in FIG. 13, no bright sub-pixel is adjacent to another bright sub-pixel in the row direction, nor no dark sub-pixel is adjacent to another dark sub-pixel in the row direction. This makes it possible to reduce striped display unevenness in the row direction.

Figure 15:
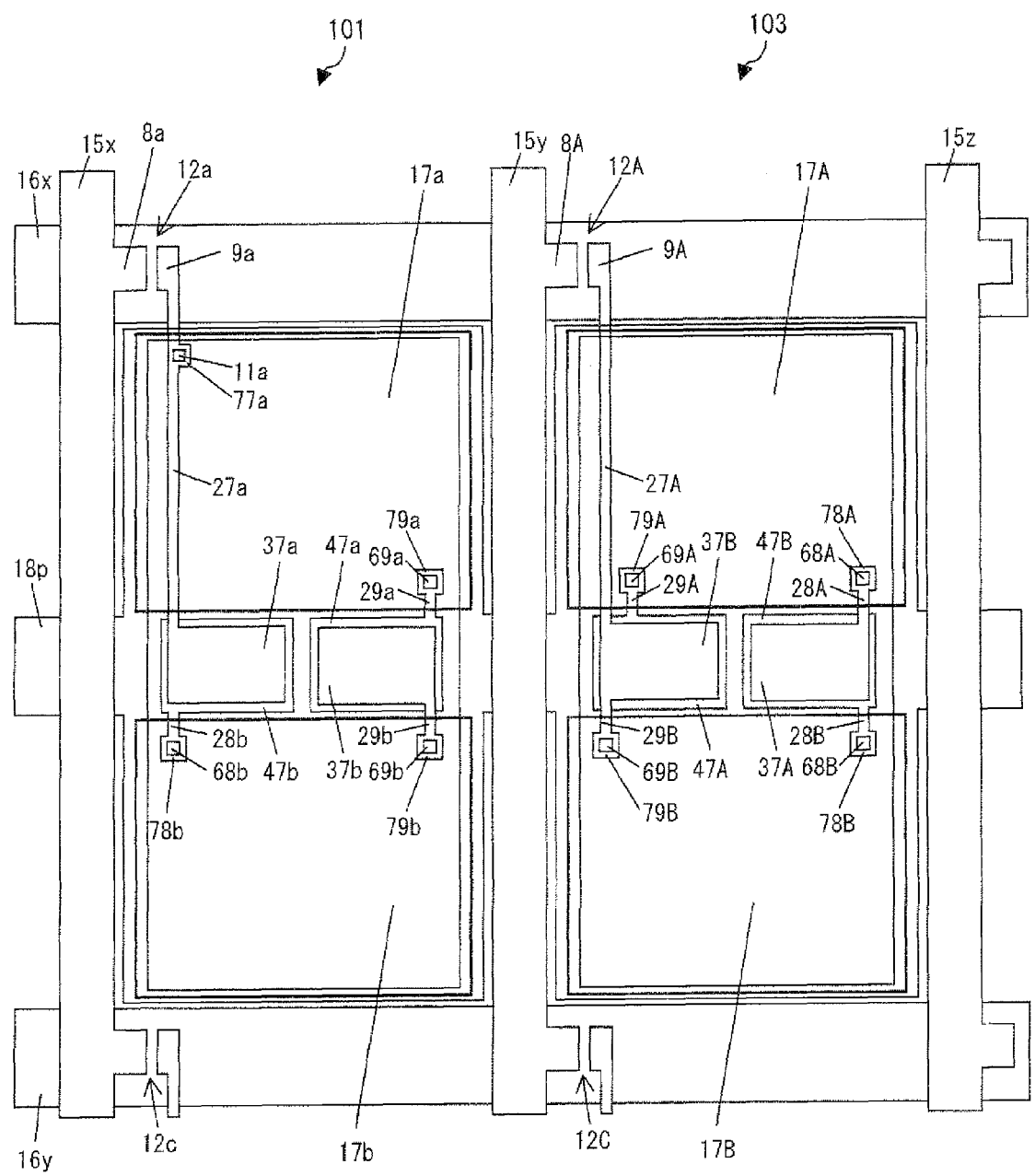
FIG. 15 is a plan view illustrating a specific example of the liquid crystal panel of FIG. 13.

A specific example of each of the pixels 101 and 103 of FIG. 13 is illustrated in FIG. 15. As illustrated in FIG. 15, the pixel 101 is configured as follows: The transistor 12a is provided in the vicinity of an intersection of the data signal line 15x with the scanning signal line 16x. The two signal lines (15x and 16x) define a pixel region, in which the pixel electrodes 17a and 17b, each in a rectangular shape, are arranged in the column direction. One of four sides forming a periphery of a first pixel electrode is adjacent to one of four sides forming a periphery of a second pixel electrode. The pixel 101 includes first and second upper capacitor electrodes 37a and 37b, which are both provided so as to overlap a gap between the above two adjacent sides (that is, a gap between the pixel electrodes 17a and 17b). The pixel 101 further includes first and second lower capacitor electrodes 47a and 47b. The first lower capacitor electrode 47a is provided so as to overlap (i) the gap between the two adjacent sides (that is, the gap between the pixel electrodes 17a, and 17b) and (ii) the second upper capacitor electrode 37b. The second lower capacitor electrode 47b is provided so as to overlap (i) the gap between the two adjacent sides (that is, the gap between the pixel electrodes 17a and 17b) and (ii) the first upper capacitor electrode 37a. The retention capacitor line 18p includes a retention capacitor line extension which branches off from the retention capacitor line 18p. The retention capacitor line extension extends so as to overlap a part of an edge of each of the pixel electrodes 17a and 17b in a plan view.

More specifically, within the gap between the pixel electrodes 17a and 17b, the first and second upper capacitor electrodes 37a and 37b are arranged in the row direction, and the first and second lower capacitor electrodes 47a and 47b are also arranged in the row direction. The first upper capacitor electrode 37a overlaps the second lower capacitor electrode 47b at a first portion, whereas the second upper capacitor electrode 37b overlaps the first lower capacitor electrode 47a at a second portion, the first and second portions being arranged in the row direction. The retention capacitor line extension of the retention capacitor line 18p extends so as to (i) surround the pixel region and (ii) overlap three sides of each of the pixel electrodes 17a and 17b which three sides are sides other than the side that defines the gap between the pixel electrodes 17a and 17b.

The transistor 12a has a source electrode 8a and a drain electrode 9a both formed above the scanning signal line 16x. The source electrode 8a is connected, with the data signal line 15x. The drain electrode 9a is connected with a drain extracting line 27a. The drain extracting line 27a is connected with (i) the first upper capacitor electrode 37a formed in a layer in which the drain extracting line 27a is formed and (ii) a contact electrode 77a, which is in turn connected with the pixel electrode 17a via a contact hole 11a.

The first upper capacitor electrode 37a overlaps the second lower capacitor electrode 47b via a gate insulating film. The second lower capacitor electrode 47b is connected with a second lower capacitor electrode extension 28b. The second lower capacitor electrode extension 28b is connected with a contact electrode 78b, which is in turn connected with the pixel electrode 17b via a contact hole 68b. With this configuration, the coupling capacitor Cab1 (see FIG. 13) between the pixel electrodes 17a and 17b is formed at the portion at which the first upper capacitor electrode 37a overlaps the second lower capacitor electrode 47b.

The second upper capacitor electrode 37b overlaps the first lower capacitor electrode 47a via the gate insulating film. Further, the second upper capacitor electrode 37b is connected with a second upper capacitor electrode extension 29b. The second upper capacitor electrode extension 29b is connected with a contact electrode 79b, which is in turn connected with the pixel electrode 17b via a contact hole 69b. Further, the first lower capacitor electrode 47a is connected with a first lower capacitor electrode extension 29a. The first lower capacitor electrode extension 29a is connected with a contact electrode 79a, which is in turn connected with the pixel electrode 17a via a contact hole 69a. With this configuration, the coupling capacitor Cab2 (see FIG. 13) between the pixel electrodes 17a and 17b is formed at the portion at which the second upper capacitor electrode 37b overlaps the first lower capacitor electrode 47a.

The pixel electrode 17a overlaps the retention capacitor line 18p via an interlayer insulating film and the gate insulating film. With this configuration, the retention capacitor Cha (see FIG. 13) is formed at a portion at which the pixel electrode 17a overlaps the retention capacitor line 18p. Further, the pixel electrode 17b overlaps the retention capacitor line 18p via the interlayer insulating film and the gate insulating film. With this configuration, the retention capacitor Chb (see FIG. 13) is formed at a portion at which the pixel electrode 17b overlaps the retention capacitor line 18p.

According to the above arrangement, in the pixel 101, the sub-pixel including the pixel electrode 17a, serves as "bright," and the sub-pixel including the pixel electrode 17b serves as "dark."

The pixel 103 is, in contrast, configured as follows: The transistor 12A is provided in the vicinity of an intersection of the data signal line 15y with the scanning signal line 16x. The two signal lines (15y and 16x) define a pixel region, in which the pixel electrodes 17A and 17B, each in a rectangular shape, are arranged in the column direction. One of four sides forming a periphery of a first pixel electrode is adjacent to one of four sides forming a periphery of a second pixel electrode. The pixel 103 includes first and second upper capacitor electrodes 37A and 37B, which are both provided so as to overlap a gap between the above two adjacent sides (that is, a gap between the pixel electrodes 17A and 17B). The pixel 103 further includes first and second lower capacitor electrodes 47A and 47B. The first lower capacitor electrode 47A is provided so as to overlap (i) the gap between the two adjacent sides (that is, the gap between the pixel electrodes 17A and 17B) and (ii) the second upper capacitor electrode 3713. The second lower capacitor electrode 47B is provided so as to overlap (i) the gap between the two adjacent sides (that is, the gap between the pixel electrodes 17A and 17B) and (ii) the first upper capacitor electrode 37a. The retention capacitor line 18p includes a retention capacitor line extension which branches off from the retention capacitor line 18p. The retention capacitor line extension extends so as to overlap a part of an edge of each of the pixel electrodes 17A and 17B in a plan view.

More specifically, within the gap between the pixel electrodes 17A and 17B, the first and second upper capacitor electrodes 37A and 37B are arranged in the row direction, and the first and second lower capacitor electrodes 47A and 47B are also arranged in the row direction. The first upper capacitor electrode 37A overlaps the second lower capacitor electrode 47B at a first portion, whereas the second upper capacitor electrode 37B overlaps the first lower capacitor electrode 47A at a second portion, the first and second portions being arranged in the row direction. The retention capacitor line extension of the retention capacitor line 18p extends so as to (i) surround the pixel region and (ii) overlap three sides of each of the pixel electrodes 17A and 17B which three sides are sides other than the side that defines the gap between the pixel electrodes 17A and 17B.

The transistor 12A has a source electrode 8A and a drain electrode 9A both formed above the scanning signal line 16x. The source electrode 8A is connected with the data signal line 15y. The drain electrode 9A is connected with a drain extracting line 27A. The drain extracting line 27A is connected with the second upper capacitor electrode 37B formed in a layer in which the drain extracting line 27A is formed. The second upper capacitor electrode 37B is connected with a second upper capacitor electrode extension 29B. The second upper capacitor electrode extension 29B is connected with the contact electrode 79B, which is in turn connected with the pixel electrode 17B via a contact hole 69B.

The second upper capacitor electrode 37B overlaps the first lower capacitor electrode 47A via a gate insulating film. The first lower capacitor electrode 47A is connected with a first lower capacitor electrode extension 29A. The first lower capacitor electrode extension 29A is connected with a contact electrode 79A, which is in turn connected with the pixel electrode 17A via a contact hole 69A. With this configuration, the coupling capacitor CAB2 (see FIG. 13) between the pixel electrodes 17A and 17B is formed at the portion at which the second upper capacitor electrode 37B overlaps the first lower capacitor electrode 47A.

The first upper capacitor electrode 37A overlaps the second lower capacitor electrode 478 via the gate insulating film. Further, the first upper capacitor electrode 37A is connected with a first upper capacitor electrode extension 28A. The first upper capacitor electrode extension 28A is connected with a contact electrode 78A, which is in turn connected with the pixel electrode 17A via a contact hole 68A. Further, the second lower capacitor electrode 47B is connected with the second lower capacitor electrode extension 28B. The second lower capacitor electrode extension 28B is connected with a contact electrode 78B, which is in turn connected with the pixel electrode 17B via a contact hole 68B. With this configuration, the coupling capacitor CAB1 (see FIG. 13) between the pixel electrodes 17A and 17B is formed at the portion at which the first upper capacitor electrode 37A overlaps the second lower capacitor electrode 47B.

The pixel electrode 17A overlaps the retention capacitor line 18p via an interlayer insulating film and the gate insulating film. With this configuration, the retention capacitor ChA (see FIG. 13) is formed at a portion at which the pixel electrode 17A overlaps the retention capacitor line 18p. Further, the pixel electrode 17B overlaps the retention capacitor line 18p via the interlayer insulating film and the gate insulating film. With this configuration, the retention capacitor ChB (see FIG. 13) is formed at a portion at which the pixel electrode 17B overlaps the retention capacitor line 18p.

According to the above arrangement, in the pixel 103, the sub-pixel including the pixel electrode 17A serves as "dark," and the sub-pixel including the pixel electrode 17B serves as "bright."

Figure 16:
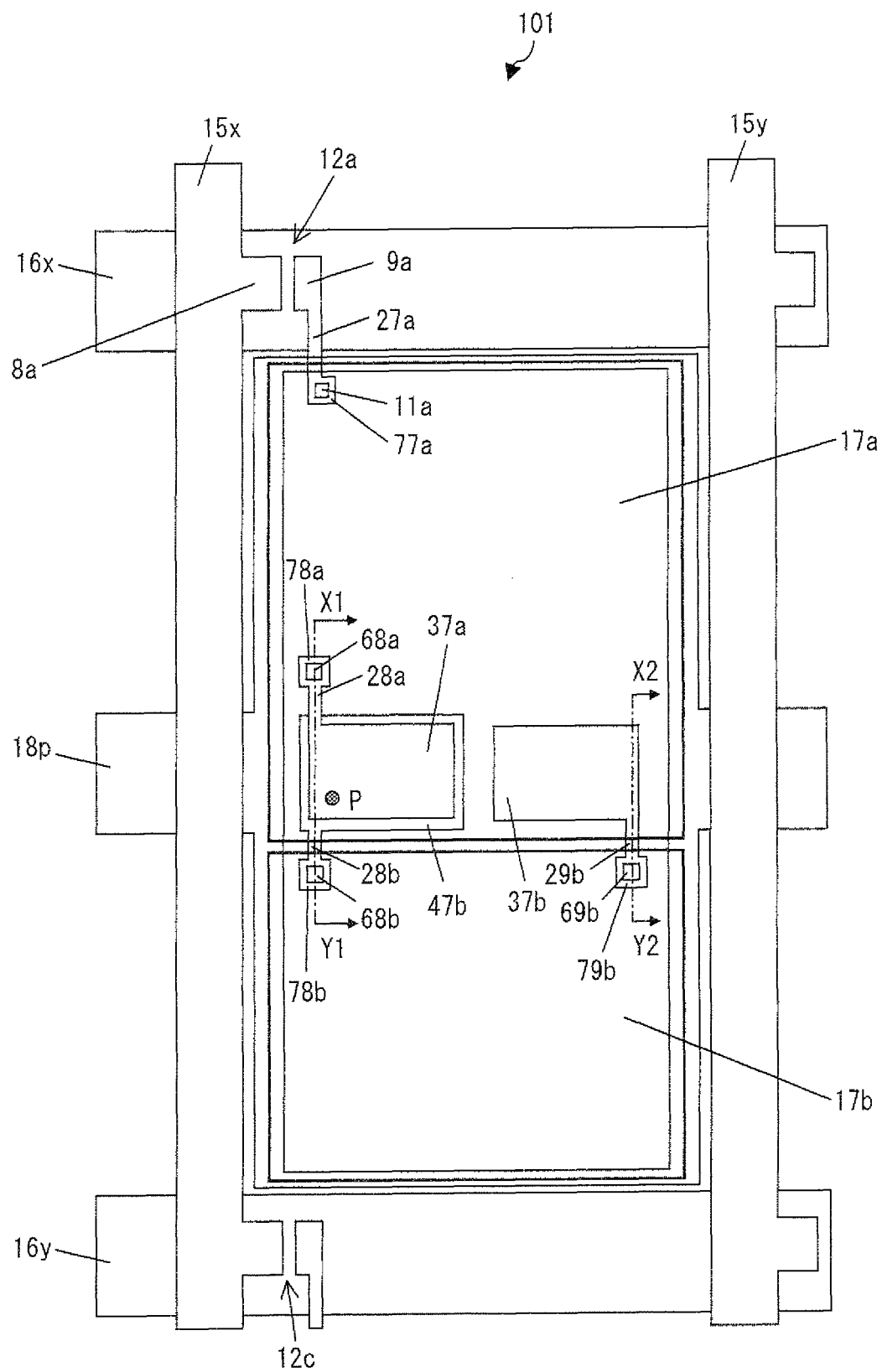
FIG. 16 is a plan view illustrating still another specific example of the liquid crystal panel of FIG. 1.

The pixel 101 illustrated in FIGS. 2 and 9 can be modified as illustrated in FIG. 16. According to the arrangement of FIG. 16, the first lower capacitor electrode 47a illustrated in FIG. 9 is omitted. Further, in a region which overlaps the pixel electrode 17a, (i) the first and second upper capacitor electrodes 37a and 37b are arranged in the row direction, and (ii) the first upper capacitor electrode 37a overlaps the second lower capacitor electrode 47b. The retention capacitor line extension of the retention capacitor line 18p extends so as to (i) surround the pixel region and (ii) overlap three sides of each of the pixel electrodes 17a and 17b which three sides are sides other than the side that defines the gap between the pixel electrodes 17a and 17b.

The transistor 12a has a source electrode 8a and a drain electrode 9a both formed above the scanning signal line 16x. The source electrode 8a is connected with the data signal line 15x. The drain electrode 9a is connected with a drain extracting line 27a. The drain extracting line 27a is connected with a contact electrode 77a, which is in turn connected with the pixel electrode 17a via a contact hole 11a.

The first upper capacitor electrode 37a overlaps the second lower capacitor electrode 47b via a gate insulating film. Further, the first upper capacitor electrode 37a is connected with a first upper capacitor electrode extension 28a. The first upper capacitor electrode extension 28a is connected with a contact electrode 78a, which is in turn connected with the pixel electrode 17a via a contact hole 68a. Further, the second lower capacitor electrode 47b is connected with the second lower capacitor electrode extension 28b. The second lower capacitor electrode extension 28b is connected with a contact electrode 78b, which is in turn connected with the pixel electrode 17b via a contact hole 68b. With this configuration, the coupling capacitor Cab1 (see FIG. 1) between the pixel electrodes 17a and 17b is formed at the portion at which the first upper capacitor electrode 37a overlaps the second lower capacitor electrode 47b.

The second upper capacitor electrode 37b overlaps the pixel electrode 17a via an interlayer insulating film. Further, the second upper capacitor electrode 37b is connected with a second upper capacitor electrode extension 29b. The second upper capacitor electrode extension 29b is connected with a contact electrode 79b, which is in turn connected with the pixel electrode 17b via a contact hole 69b. With this configuration, the coupling capacitor Cab2 (see FIG. 1) between the pixel electrodes 17a and 17b is formed at the portion at which the second upper capacitor electrode 37b overlaps the pixel electrode 17a.

The pixel electrode 17a overlaps the retention capacitor line 18p via the interlayer insulating film and the gate insulating film. With this configuration, the retention capacitor Cha (see FIG. 1) is formed at a portion at which the pixel electrode 17a overlaps the retention capacitor line 18p. Further, the pixel electrode 17b overlaps the retention capacitor line 18p via the interlayer insulating film and the gate insulating film. With this configuration, the retention capacitor Chb (see FIG. 1) is formed at a portion at which the pixel electrode 17b overlaps the retention capacitor line 18p. Other pixels each have a configuration (specifically, how pixel constituents are shaped, positioned and connected) identical to that of the pixel 101.

According to the above arrangement, the sub-pixel including the pixel electrode 17a serves as "bright," and the sub-pixel including the pixel electrode 17b serves as "dark."

Figure 17:
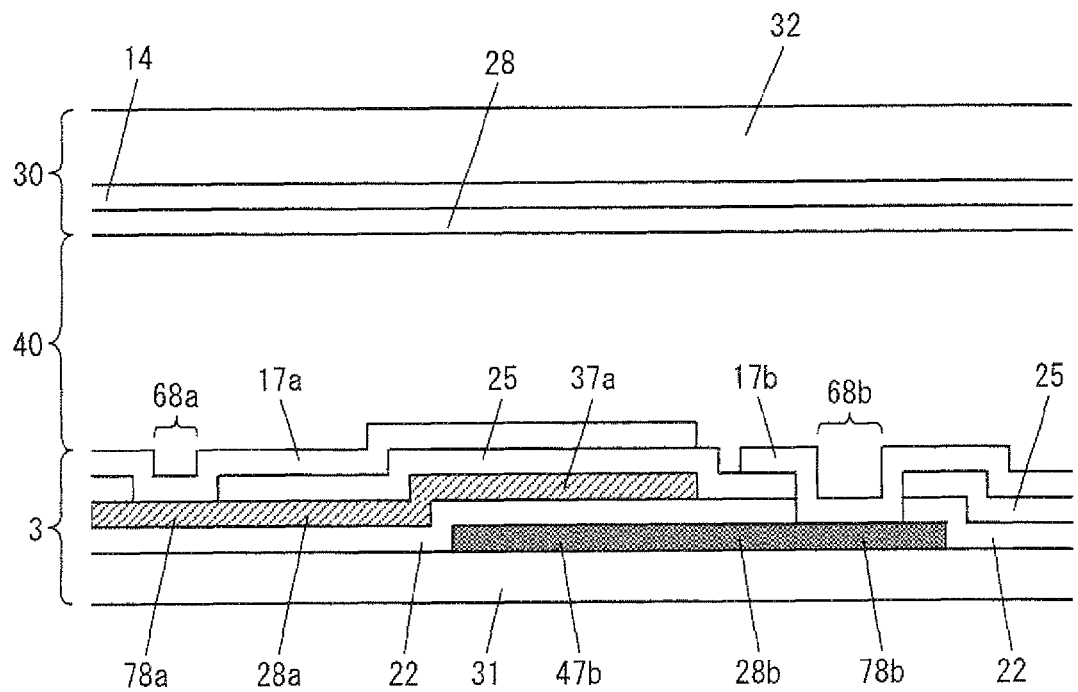
FIG. 17 is a cross-sectional view taken along a line X1-Y1 of FIG. 16.

FIG. 17 is a cross-sectional view taken along a line X1-Y1 of FIG. 16. As illustrated in FIG. 17, the present liquid crystal panel includes: an active matrix substrate 3; a color filter substrate 30 facing the active matrix substrate 3; and a liquid crystal layer 40 provided between the two substrates (3 and 30).

In the active matrix substrate 3, the second lower capacitor electrode 47b, the second lower capacitor electrode extension 28b, and the contact electrode 78b are formed on a glass substrate 31. An inorganic gate insulating film 22 is formed so as to cover the above members. Scanning signal lines (not shown) are also formed on the glass substrate 31. Formed on the inorganic gate insulating film 22 are members such as a semiconductor layer (i layer and n+ layer; not shown), the source electrode and the drain electrode (not shown) which have contact with the n+ layer, the first upper capacitor electrode 37a, the first upper capacitor electrode extension 28a, and the contact electrode 78a. An inorganic interlayer insulating film 25 is formed so as to cover the above members on the inorganic gate insulating film 22. The pixel electrodes 17a and 17b are formed on the inorganic interlayer insulating film 25. Further, an alignment film (not shown) is formed so as to cover the pixel electrodes 17a and 17b.

The inorganic interlayer insulating film 25 is penetrated at the contact hole 68a, which connects the pixel electrode 17a with the contact electrode 78a. The inorganic interlayer insulating film 25 and the inorganic gate insulating film 22 are penetrated at the contact hole 68b, which connects the pixel electrode 17b with the contact electrode 78b. In other words, the pixel electrode 17a and the first upper capacitor electrode 37a are electrically connected with each other, and the pixel electrode 17b and the second lower capacitor electrode 47b are electrically connected with each other. The first upper capacitor electrode 37a overlaps the second lower capacitor electrode 47b via the inorganic gate insulating film 22. As such, the coupling capacitor Cab1 is formed (see FIG. 1). The pixel electrode 17a is formed in a layer above the first upper capacitor electrode 37a with the inorganic interlayer insulating film 25 sandwiched in-between.

Figure 18:
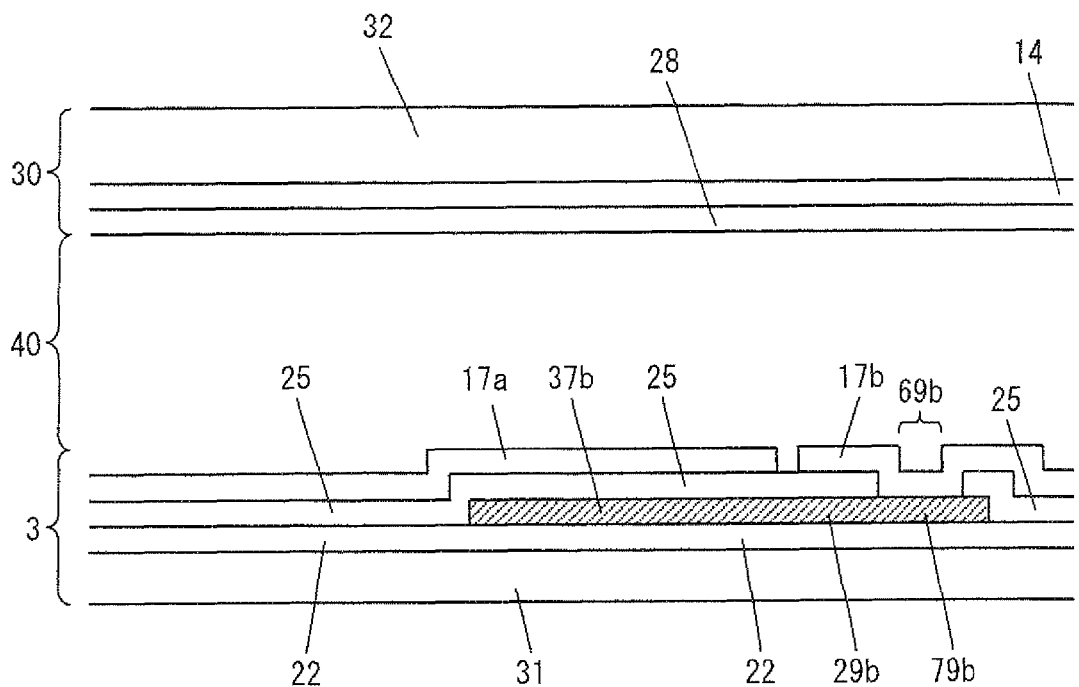
FIG. 18 is a cross-sectional view taken along a line X2-Y2 of FIG. 16.

FIG. 18 is a cross-sectional view taken along a line X2-Y2 of FIG. 16. As illustrated in FIG. 18, in the active matrix substrate 3, the inorganic gate insulating film 22 is formed on the glass substrate 31. Scanning signal lines (not shown) are also formed on the glass substrate 31. Formed on the inorganic gate insulating film 22 are members such as a semiconductor layer (i layer and n+ layer; not shown), the source electrode and the drain electrode (not shown) which have contact with the n+ layer, the second upper capacitor electrode 37b, the second upper capacitor electrode extension 29b, and the contact electrode 79b. The inorganic interlayer insulating film 25 is formed, so as to cover the above members on the inorganic gate insulating film 22. The pixel electrodes 17a and 17b are formed on the inorganic interlayer insulating film 25. Further, an alignment film (not shown) is formed so as to cover the pixel electrodes 17a and 17b.

The inorganic interlayer insulating film 25 is penetrated at the contact hole 69b, which connects the pixel electrode 17b with the contact electrode 79b. In other words, the pixel electrode 17b and the second upper capacitor electrode 37b are electrically connected with each other. The second upper capacitor electrode 37b overlaps the pixel electrode 17a via the inorganic interlayer insulating film 25. As such, the coupling capacitor Cab2 is formed (see FIG. 1).

As illustrated in FIGS. 17 and 18, in the color filter substrate 30, a colored layer 14 is provided on a glass substrate 32, a common electrode (com) 28 is provided on the colored layer 14, and an alignment film (not shown) is provided in such a manner as to cover the common electrode 28.

In the liquid crystal panel illustrated in FIG. 16, the pixel electrodes 17a and 17b are connected (capacitance-coupled) with each other via the two coupling capacitors (Cab1 and Cab2) which are provided in parallel to each other in a plan view. Therefore, in a case where there has occurred a short circuit between, for example, the first upper capacitor electrode 37a and the second lower capacitor electrode 47b or the data signal line 15x at P in FIG. 16 (during a production step or the like), it is possible to maintain the capacitive coupling between the pixel electrodes 17a and 17b by carrying out a correction step of cutting with a laser beam the first upper capacitor electrode 37a between (i) the contact hole 68a and (ii) a portion at which the short circuit has occurred. In a case where there has occurred a short circuit between the first upper capacitor electrode 37a and the second lower capacitor electrode 47b and the above laser beam cutting has been carried out in response, the pixel electrode 17b and the first upper capacitor electrode 37a become conductive with each other and thus become an identical potential. Further, the first upper capacitor electrode 37a overlaps the pixel electrode 17a via the inorganic interlayer insulating film 25. As such, it is possible to maintain the capacitive coupling between the pixel electrodes 17a and 17b.

Figure 19:
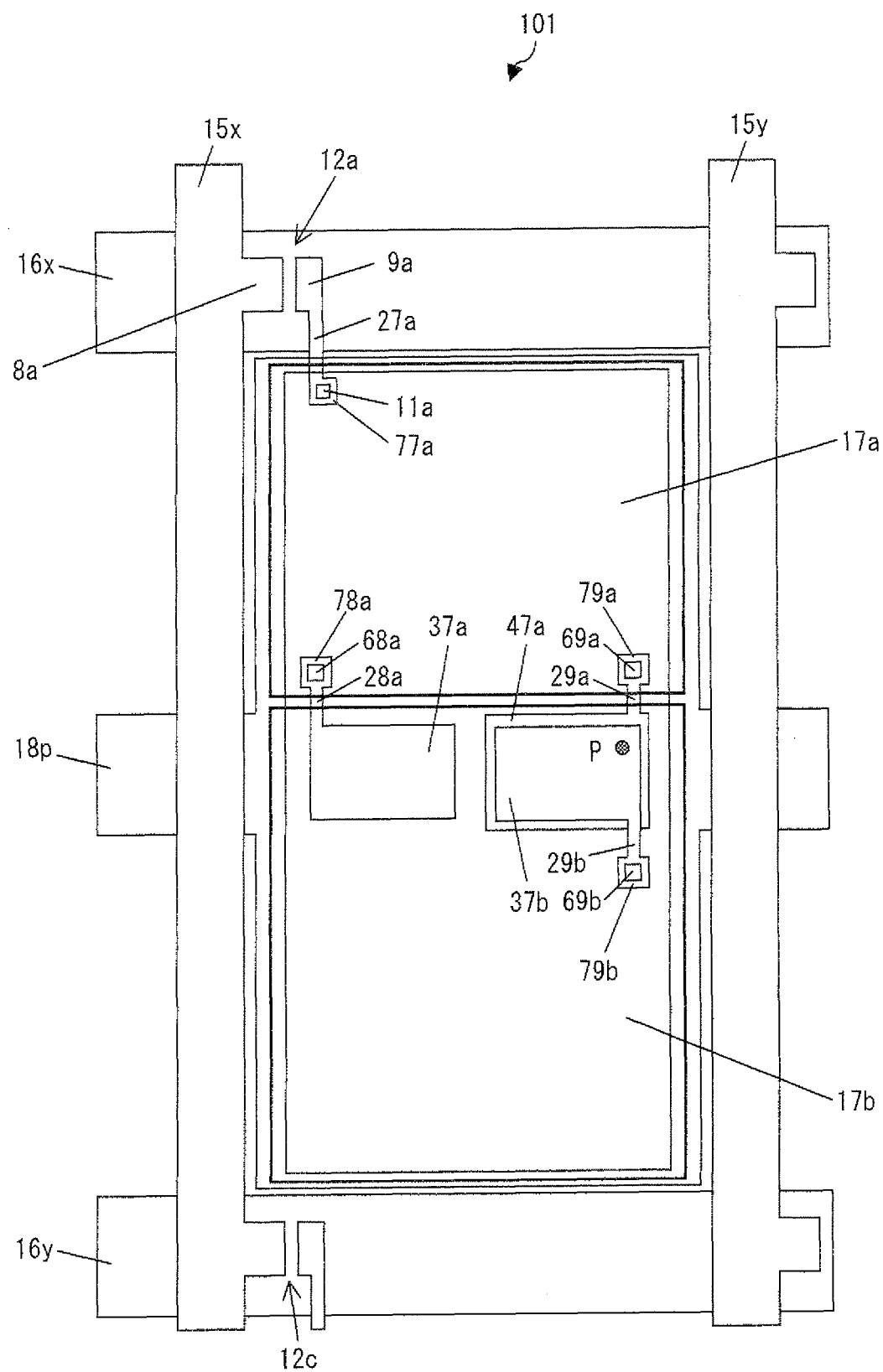
FIG. 19 is a plan view illustrating another specific example of the liquid crystal panel of FIG. 16.

The pixel 101 illustrated in FIG. 16 can be modified as illustrated in FIG. 19. According to the arrangement of FIG. 19, in a region which overlaps the pixel electrode 17b, (i) the first and second upper capacitor electrodes 37a and 37b are arranged in the row direction, and (ii) the second upper capacitor electrode 37b overlaps the first lower capacitor electrode 47a.

According to the above arrangement, the first upper capacitor electrode 37a overlaps the pixel electrode 17b via an interlayer insulating film. Further, the first upper capacitor electrode 37a is connected with a first upper capacitor electrode extension 28a. The first upper capacitor electrode extension 28a is connected with a contact electrode 78a, which is in turn connected with the pixel electrode 17a via a contact hole 68a. With this configuration, the coupling capacitor Cab1 (see FIG. 1) between the pixel electrodes 17a and 17b is formed at a portion at which the first upper capacitor electrode 37a overlaps the pixel electrode 17b.

The second upper capacitor electrode 37b overlaps the first lower capacitor electrode 47a via a gate insulating film. Further, the second upper capacitor electrode 37b is connected with a second upper capacitor electrode extension 29b. The second upper capacitor electrode extension 29b is connected with a contact electrode 79b, which is in turn connected with the pixel electrode 17b via a contact hole 69b. Further, the first lower capacitor electrode 47a is connected with a first lower capacitor electrode extension 29a. The first lower capacitor electrode extension 29a is connected with a contact electrode 79a, which is in turn connected with the pixel electrode 17a via a contact hole 69a. With this configuration, the coupling capacitor Cab2 (see FIG. 1) between the pixel electrodes 17a and 17b is formed at a portion at which the second upper capacitor electrode 37b overlaps the first lower capacitor electrode 47a.

Similarly to the liquid crystal panel illustrated in FIG. 16, in the liquid crystal panel illustrated in FIG. 19, the pixel electrodes 17a and 17b are connected (capacitance-coupled) with each other via the two coupling capacitors (Cab1 and Cab2) which are provided in parallel to each other in a plan view. Therefore, in a case where there has occurred a short circuit between, for example, the second upper capacitor electrode 37b and the first lower capacitor electrode 47a or the data signal line 15y at P in FIG. 19 (during a production step or the like), it is possible to maintain the capacitive coupling between the pixel electrodes 17a and 17b by carrying out a correction step of cutting with a laser beam the second upper capacitor electrode 37b between (i) the contact hole 69b and (ii) a portion at which the short circuit has occurred. In a case where there has occurred a short circuit between the second upper capacitor electrode 37b and the first lower capacitor electrode 47a and the above laser beam cutting has been carried out in response, the pixel electrode 17a, and the second upper capacitor electrode 37b become conductive with each other and thus become an identical potential. Further, the second upper capacitor electrode 37b overlaps the pixel electrode 17b via the inorganic interlayer insulating film 25. As such, it is possible to maintain the capacitive coupling between the pixel electrodes 17a and 17b.

As described above, according to the respective arrangements of FIGS. 16 and 19, a first upper capacitor electrode overlaps a lower capacitor electrode at a first portion, a second upper capacitor electrode overlaps a pixel electrode at a second portion, and the first and second portions are arranged in parallel to each other in a plan view. As such, it is possible to improve a process yield of producing a liquid crystal panel and an active matrix substrate to be provided in the liquid crystal panel.

Embodiment 2

Figure 20:
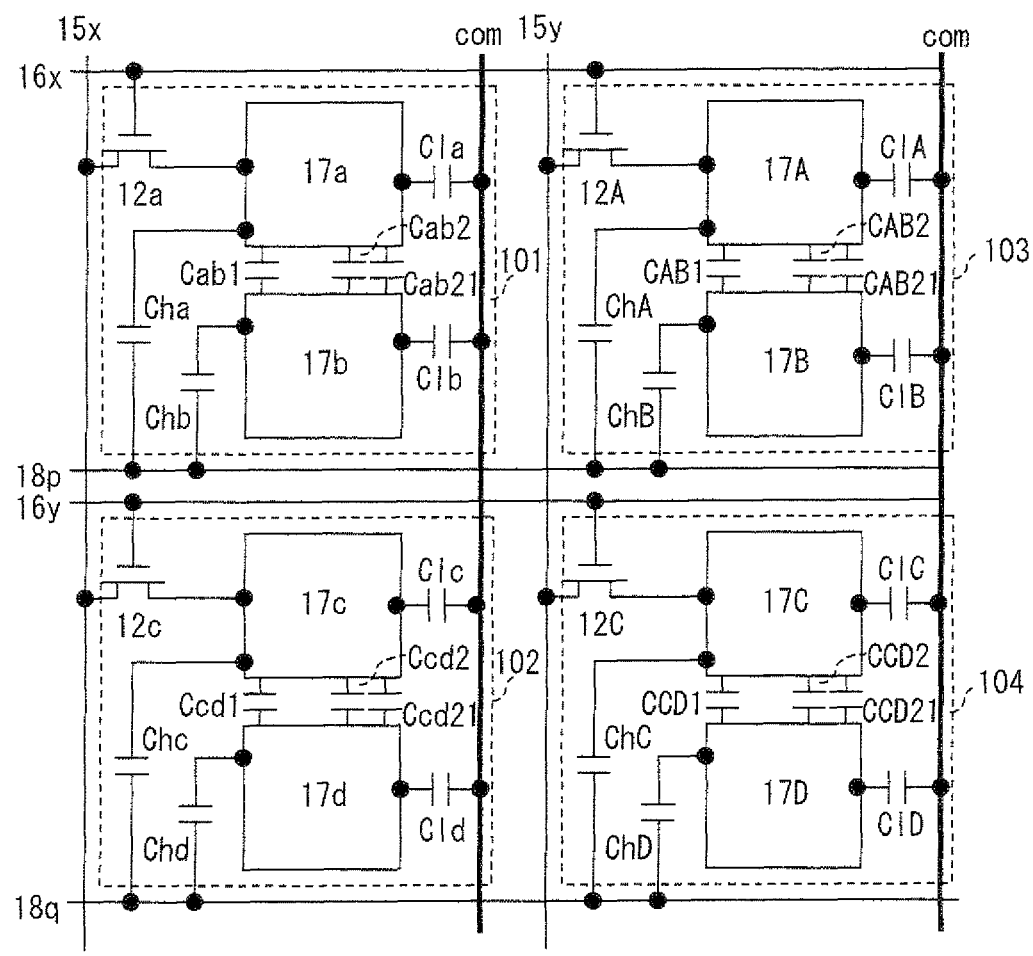
FIG. 20 is a circuit diagram illustrating a configuration of a liquid crystal panel in accordance with Embodiment 2.

FIG. 20 is an equivalent circuit diagram showing a part of a liquid crystal display panel in accordance with Embodiment 2. As illustrated in FIG. 20, the liquid crystal display panel includes: data signal lines (15x and 15y) extending in a column direction (up-down direction in the drawing); scanning signal lines (16x and 16y) extending in a row direction (right-left direction in the drawing); pixels (101-104) positioned in row and column directions; retention capacitor lines (18p and 18q); and a common electrode (counter electrode) com. Each pixel has the same structure. A pixel column including the pixels 101 and 102 is adjacent to a pixel column including the pixels 103 and 104. A pixel row including the pixels 101 and 103 is adjacent to a pixel row including the pixels 102 and 104.

In the liquid crystal panel, one data signal line and one scanning signal line are provided for each pixel. Further, each pixel includes two pixel electrodes arranged in the column direction: The pixel 101 includes two pixel electrodes 17a and 17b, the pixel 102 includes two pixel electrodes 17c and 17d, and the pixel electrodes 17a, 17b, 17c, and 17d are arranged in a line; the pixel 103 includes two pixel electrodes 17A and 17B, the pixel 104 includes two pixel electrodes 17C and 17D, and the pixel electrodes 17A, 17B, 17C, and 17D are arranged in a line. The pixel electrodes 17a and 17A are adjacent to each other in the row direction, the pixel electrodes 17b and 17B are adjacent to each other in the row direction, the pixel electrodes 17c and 17C are adjacent to each other in the row direction, and the pixel electrodes 17d and 17D are adjacent to each other in the row direction.

In the pixel 101, the pixel electrodes 17a and 17b are connected with each other via (i) coupling capacitors Cab1 and Cab2 formed in parallel to each other in a row direction in a plan view and (ii) a coupling capacitor Cab21 formed in parallel to the coupling capacitor Cab2 in a direction in which the coupling capacitors Cab21 and Cab2 are aligned, the pixel electrode 17a is connected with the data signal line 15x via a transistor 12a connected with the scanning signal line 16x, a retention capacitor Cha is formed between the pixel electrode 17a and the retention capacitor line 18p, a retention capacitor Chb is formed between the pixel electrode 17b and the retention capacitor line 18p, a liquid crystal capacitor Cla is formed between the pixel electrode 17a and the common electrode com, and a liquid crystal capacitor Clb is formed between the pixel electrode 17b and the common electrode com.

In the pixel 102 adjacent to the pixel 101 in the column direction, the pixel electrodes 17c and 17d are connected with each other via (i) coupling capacitors Ccd1 and Ccd2 formed in parallel to each other in the row direction in a plan view and a coupling capacitor Ccd21 formed in parallel to the coupling capacitor Ccd2 in a direction in which the coupling capacitors Ccd21 and Ccd2 are aligned, the pixel electrode 17c is connected with the data signal line 15x via a transistor 12c connected with the scanning signal line 16y, a retention capacitor Chc is formed between the pixel electrode 17c and the retention capacitor line 18q, a retention capacitor Chd is formed between the pixel electrode 17d and the retention capacitor line 18q, a liquid crystal capacitor Clc is formed between the pixel electrode 17c and the common electrode com, and a liquid crystal capacitor Cld is formed between the pixel electrode 17d and the common electrode com.

In the pixel 103 adjacent to the pixel 101 in the row direction, the pixel electrodes 17A and 17B are connected with each other via (i) coupling capacitors CAB1 and CAB2 formed in parallel to each other in the row direction in a plan view and (ii) a coupling capacitor CAB21 formed in parallel to the coupling capacitor CAB2 in a direction in which the coupling capacitors CAB21 and CAB2 are aligned, the pixel electrode 17A is connected with the data signal line 15y via a transistor 12A connected with the scanning signal line 16x, a retention capacitor ChA is formed between the pixel electrode 17A and the retention capacitor line 18p, a retention capacitor ChB is formed between the pixel electrode 17B and the retention capacitor line 18p, a liquid crystal capacitor ClA is formed between the pixel electrode 17A and the common electrode com, and a liquid crystal capacitor ClB is formed between the pixel electrode 17B and the common electrode com.

Assume that in a liquid crystal display device including the present liquid crystal panel, the data signal lines 15x and 15y are driven as illustrated in FIG. 5. In this case, in the frame F1, the sub-pixel including the pixel electrode 17a (positive polarity) serves as "bright," the sub-pixel including the pixel electrode 17b (positive polarity) serves as "dark," the sub-pixel including the pixel electrode 17e (negative polarity) serves as "bright," the sub-pixel including the pixel electrode 17d (negative polarity) serves as "dark," the sub-pixel including the pixel electrode 17A (negative polarity) serves as "bright," and the sub-pixel including the pixel electrode 17B (negative polarity) serves as "dark." (a) of FIG. 6 illustrates an overall state of the above sub-pixels for the frame F1. In the frame F2, the sub-pixel including the pixel electrode 17a (negative polarity) serves as "bright," the sub-pixel including the pixel electrode 17b (negative polarity) serves as "dark," the sub-pixel including the pixel electrode 17c (positive polarity) serves as "bright," the sub-pixel including the pixel electrode 17d (positive polarity) serves as "dark," the sub-pixel including the pixel electrode 17A (positive polarity) serves as "bright," and the sub-pixel including the pixel electrode 17B (positive polarity) serves as "dark." (b) of FIG. 6 illustrates an overall state of the above sub-pixels for the frame F2.

Figure 21:
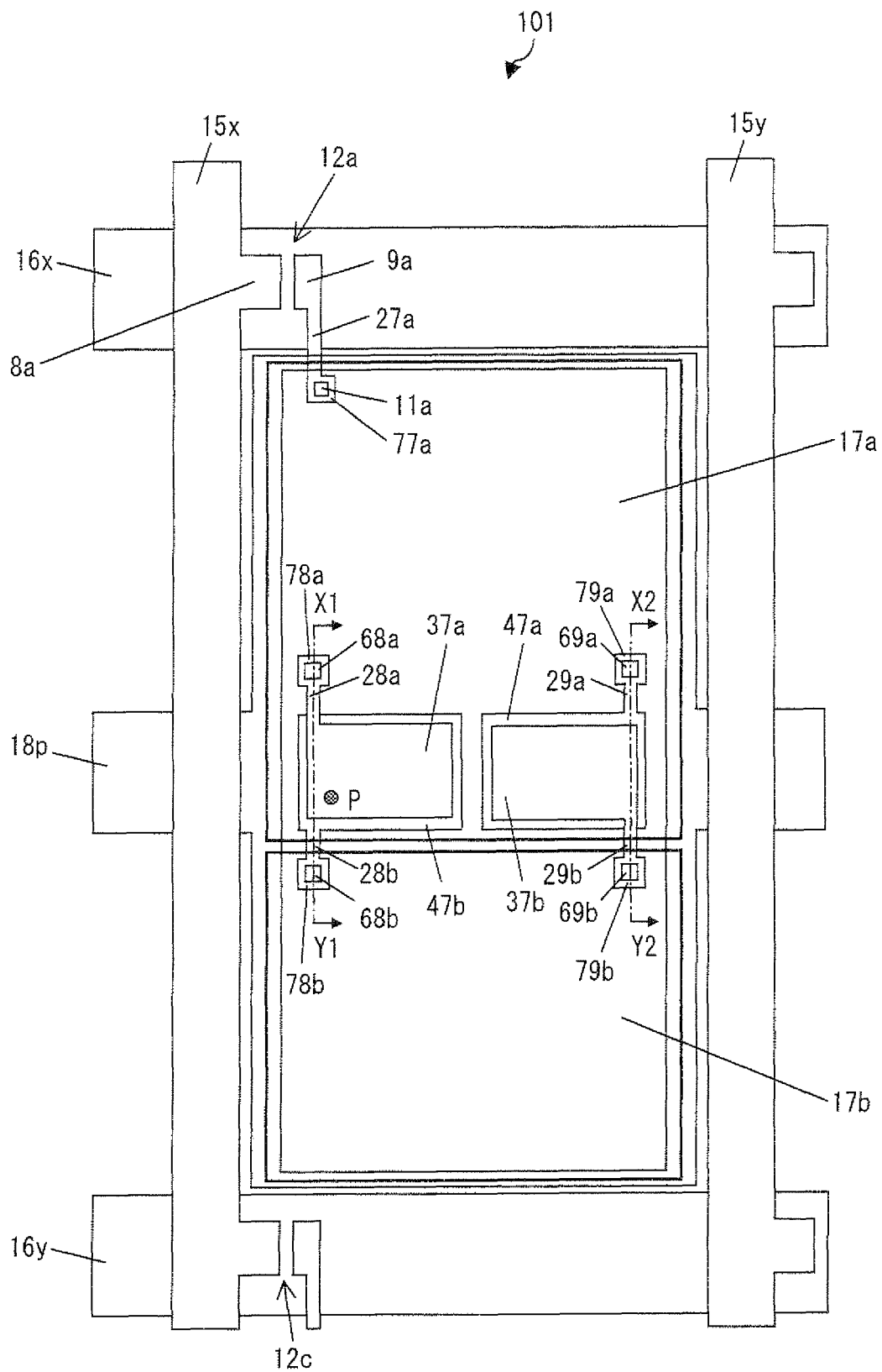
FIG. 21 is a plan view illustrating a specific example of the liquid crystal panel of FIG. 20.

A specific example of the pixel 101 of FIG. 20 is illustrated in FIG. 21. As illustrated in FIG. 21, the pixel 101 is configured as follows: The transistor 12a is provided in the vicinity of an intersection of the data signal line 15x with the scanning signal line 16x. The two signal lines (15x and 16x) define a pixel region, in which the pixel electrodes 17a and 17b, each in a rectangular shape, are arranged in the column direction. One of four sides forming a periphery of a first pixel electrode is adjacent to one of four sides forming a periphery of a second pixel electrode. The pixel 101 includes first and second upper capacitor electrodes 37a and 37b, which are both provided so as to overlap the pixel electrode 17a. The pixel 101 further includes first and second lower capacitor electrodes 47a and 47b. The first lower capacitor electrode 47a is provided so as to overlap the pixel electrode 17a and the second upper capacitor electrode 37b. The second lower capacitor electrode 47b is provided so as to overlap the pixel electrode 17a and the first upper capacitor electrode 37a. The retention capacitor line 18p includes a retention capacitor line extension which branches off from the retention capacitor line 18p. The retention capacitor line extension extends so as to overlap a part of an edge of each of the pixel electrodes 17a and 17b in a plan view.

More specifically, in a region which overlaps the pixel electrode 17a, the first and second upper capacitor electrodes 37a and 37b are arranged in the row direction, and the first and second lower capacitor electrodes 47a and 47b are also arranged in the row direction. The first upper capacitor electrode 37a overlaps the second lower capacitor electrode 47b at a first portion, whereas the second upper capacitor electrode 37b overlaps the first lower capacitor electrode 47a at a second portion, the first and second portions being arranged in the row direction. The retention capacitor line extension of the retention capacitor line 18p extends so as to (i) surround the pixel region and (ii) overlap three sides of each of the pixel electrodes 17a and 17b which three sides are sides other than the side that defines a gap between the pixel electrodes 17a and 17b.

The transistor 12a has a source electrode 8a and a drain electrode 9a both formed above the scanning signal line 16x. The source electrode 8a is connected with the data signal line 15x. The drain electrode 9a is connected with a drain extracting line 27a. The drain extracting line 27a is connected with a contact electrode 77a, which is in turn connected with the pixel electrode 17a via a contact hole 11a.

The first upper capacitor electrode 37a, which is provided in a layer in which the drain extracting line 27a is provided, overlaps the second lower capacitor electrode 47b via a gate insulating film. Further, the first upper capacitor electrode 37a is connected with a first upper capacitor electrode extension 28a. The first upper capacitor electrode extension 28a is connected with a contact electrode 78a, which is in turn connected with the pixel electrode 17a via a contact hole 68a. The second lower capacitor electrode 47b is connected with a second lower capacitor electrode extension 28b. The second lower capacitor electrode extension 28b is connected with a contact electrode 78b, which is in turn connected with the pixel electrode 17b via a contact hole 68b. With this configuration, the coupling capacitor Cab1 (see FIG. 20) between the pixel electrodes 17a and 17b is formed at the portion at which the first upper capacitor electrode 37a overlaps the second lower capacitor electrode 47b.

The second upper capacitor electrode 37b overlaps (i) the first lower capacitor electrode 47a via the gate insulating film and (ii) the pixel electrode 17a via an interlayer insulating film. Further, the second upper capacitor electrode 37b is connected with a second upper capacitor electrode extension 29b. The second upper capacitor electrode extension 29b is connected with a contact electrode 79b, which is in turn connected with the pixel electrode 17b via a contact hole 69b. The first lower capacitor electrode 47a is connected with a first lower capacitor electrode extension 29a. The first lower capacitor electrode extension 29a is connected with a contact electrode 79a, which is in turn connected with the pixel electrode 17a via a contact hole 69a. With this configuration, (i) the coupling capacitor Cab2 (see FIG. 20) between the pixel electrodes 17a and 17b is formed at the portion at which the second upper capacitor electrode 37b overlaps the first lower capacitor electrode 47a, and (ii) the coupling capacitor Cab21 (see FIG. 20) between the pixel electrodes 17a and 17b is formed at a portion at which the second upper capacitor electrode 37b overlaps the pixel electrode 17a.

The pixel electrode 17a overlaps the retention capacitor line 18p via the interlayer insulating film and the gate insulating film. With this configuration, the retention capacitor Cha (see FIG. 20) is formed at a portion at which the pixel electrode 17a overlaps the retention capacitor line 18p. Further, the pixel electrode 17b overlaps the retention capacitor line 18p via the interlayer insulating film and the gate insulating film. With this configuration, the retention capacitor Chb (see FIG. 20) is formed at a portion at which the pixel electrode 17b overlaps the retention capacitor line 18p. Other pixels each have a configuration (specifically, how pixel constituents are shaped, positioned and connected) identical to that of the pixel 101.

According to the above arrangement, the sub-pixel including the pixel electrode 17a serves as "bright," and the sub-pixel including the pixel electrode 17b serves as "dark."

Figure 22:
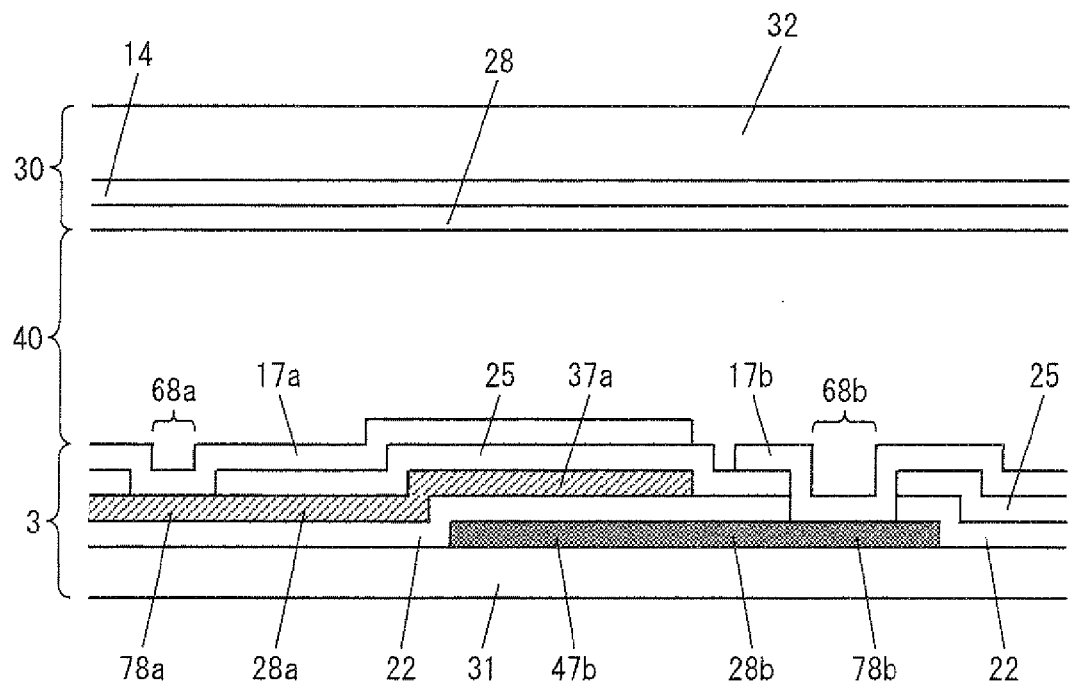
FIG. 22 is a cross-sectional view taken along a line X1-Y1 of FIG. 21.

FIG. 22 is a cross-sectional view taken along a line X1-Y1 of FIG. 21. As illustrated in FIG. 22, the present liquid crystal panel includes: an active matrix substrate 3; a color filter substrate 30 facing the active matrix substrate 3; and a liquid crystal layer 40 provided between the two substrates (3 and 30).

In the active matrix substrate 3, the second lower capacitor electrode 47b, the second lower capacitor electrode extension 28b, and the contact electrode 78b are formed on a glass substrate 31. An inorganic gate insulating film 22 is formed so as to cover the above members. Scanning signal lines (not shown) are also formed on the glass substrate 31. Formed on the inorganic gate insulating film 22 are members such as a semiconductor layer (i layer and n+ layer; not shown), the source electrode and the drain electrode (not shown) which have contact with the n+ layer, the first upper capacitor electrode 37a, the first upper capacitor electrode extension 28a, and the contact electrode 78a. An inorganic interlayer insulating film 25 is formed so as to cover the above members on the inorganic gate insulating film 22. The pixel electrodes 17a and 17b are formed on the inorganic interlayer insulating film 25. Further, an alignment film (not shown) is formed so as to cover the pixel electrodes 17a and 17b.

The inorganic interlayer insulating film 25 is penetrated at the contact hole 68a, which connects the pixel electrode 17a with the contact electrode 78a. The inorganic interlayer insulating film 25 and the inorganic gate insulating film 22 are penetrated at the contact hole 68b, which connects the pixel electrode 17b with the contact electrode 78b. In other words, the pixel electrode 17a and the first upper capacitor electrode 37a are electrically connected with each other, and the pixel electrode 17b and the second lower capacitor electrode 47b are electrically connected with each other. The first upper capacitor electrode 37a overlaps the second lower capacitor electrode 47b via the inorganic gate insulating film 22. As such, the coupling capacitor Cab1 is formed (see FIG. 20). The pixel electrode 17a is formed in a layer above the first upper capacitor electrode 37a via the inorganic interlayer insulating film 25.

Figure 23:
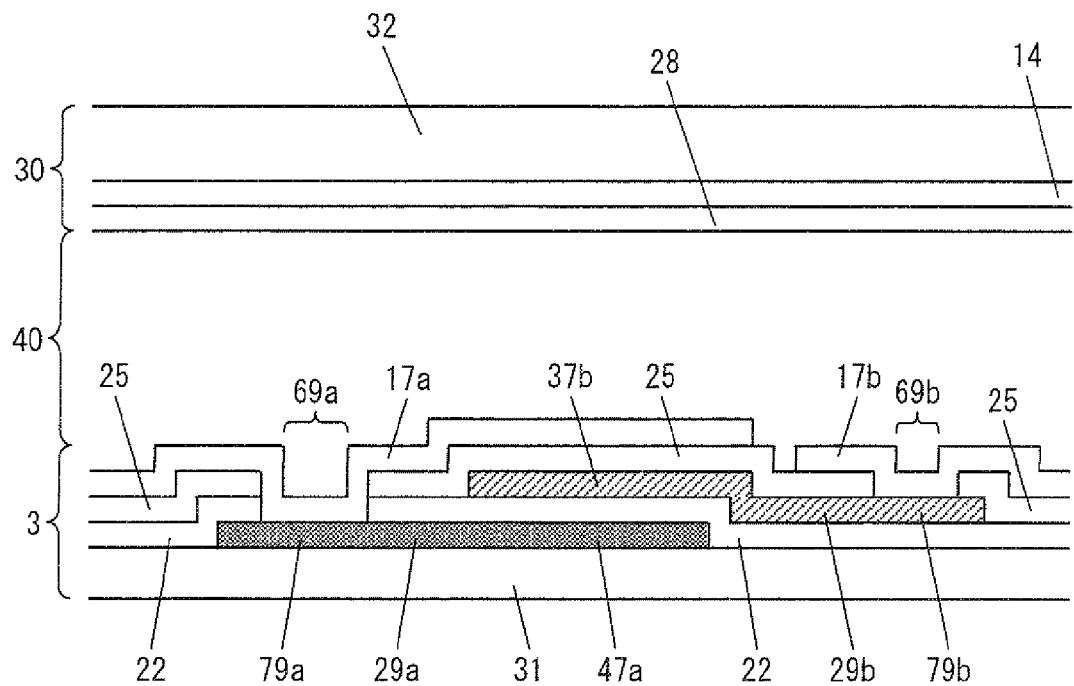
FIG. 23 is a cross-sectional view taken along a line X2-Y2 of FIG. 21.

FIG. 23 is a cross-sectional view taken along a line X2-Y2 of FIG. 21. As illustrated in FIG. 23, in the active matrix substrate 3, the first lower capacitor electrode 47a, the first lower capacitor electrode extension 29a, and the contact electrode 79a are formed on the glass substrate 31. The inorganic gate insulating film 22 is formed so as to cover the above members. Scanning signal lines (not shown) are also formed on the glass substrate 31. Formed on the inorganic gate insulating film 22 are members such as a semiconductor layer (i layer and n+ layer; not shown), the source electrode and the drain electrode (not shown) which have contact with the n+ layer, the second upper capacitor electrode 37b, the second upper capacitor electrode extension 29b, and the contact electrode 79b. The inorganic interlayer insulating film 25 is formed so as to cover the above members on the inorganic gate insulating film 22. The pixel electrodes 17a and 17b are formed on the inorganic interlayer insulating film 25. Further, an alignment film (not shown) is formed so as to cover the pixel electrodes 17a and 17b.

The inorganic interlayer insulating film 25 and the inorganic gate insulating film 22 are penetrated at the contact hole 69a, which connects the pixel electrode 17a with the contact electrode 79a. The inorganic interlayer insulating film 25 is penetrated at the contact hole 69b, which connects the pixel electrode 17b with the contact electrode 79b. In other words, the pixel electrode 17a and the first lower capacitor electrode 47a are electrically connected with each other, and the pixel electrode 17b and the second upper capacitor electrode 37b are electrically connected with each other. The second upper capacitor electrode 37b overlaps the first lower capacitor electrode 47a via the inorganic gate insulating film 22. As such, the coupling capacitor Cab2 is formed (see FIG. 20). The second upper capacitor electrode 37b overlaps the pixel electrode 17a via the inorganic interlayer insulating film 25. As such, the coupling capacitor Cab21 (see FIG. 20) is formed.

As illustrated in FIGS. 22 and 23, in the color filter substrate 30, a colored layer 14 is provided on a glass substrate 32, a common electrode (com) 28 is provided on the colored layer 14, and an alignment film (not shown) is provided in such a manner as to cover the common electrode 28.

In the liquid crystal panel illustrated in FIG. 21, the pixel electrodes 17a and 17b are connected (capacitance-coupled) with each other via the two coupling capacitors (Cab1 and (Cab2+Cab21)) which are provided in parallel to each other in a plan view. Therefore, in a case where there has occurred a short circuit between, for example, the first upper capacitor electrode 37a and the second lower capacitor electrode 47b or the data signal line 15x at P in FIG. 21 (during a production step or the like), it is possible to maintain the capacitive coupling between the pixel electrodes 17a and 17b by carrying out a correction step of cutting with a laser beam the first upper capacitor electrode 37a between (i) the contact hole 68a and (ii) a portion at which the short circuit has occurred. In a case where there has occurred a short circuit between the first upper capacitor electrode 37a and the second lower capacitor electrode 47b and the above laser beam cutting has been carried out in response, the pixel electrode 17b and the first upper capacitor electrode 37a become conductive with each other and thus share an identical potential. Further, the first upper capacitor electrode 37a overlaps the pixel electrode 17a via the inorganic interlayer insulating film 25. As such, it is possible to maintain the capacitive coupling between the pixel electrodes 17a and 17b. Further, even if the contact hole 68a becomes defective during a production process or the like, it is possible to maintain the capacitive coupling between the pixel electrodes 17a and 17b. In a case where there has occurred a short circuit between the second upper capacitor electrode 37b and, the first lower capacitor electrode 47a or the pixel electrode 17a, it is simply necessary to cut with a laser beam the second upper capacitor electrode 37b between (i) the contact hole 69b and (ii) a portion at which the short circuit has occurred.

In a case where the correction step is carried out, for example, the first upper capacitor electrode extension 28a (i.e., a portion between the contact hole 68a and the first upper capacitor electrode 37a) is irradiated with, a laser beam from a back surface side of the active matrix substrate (i.e., from a glass substrate side) so as to be cut. If there has occurred a short circuit between the first upper capacitor electrode 37a and the data signal line 15x or the pixel electrode 17b, a portion of the pixel electrode 17a which portion corresponds to the contact hole 68a is removed (trimmed) with a laser beam or the like so that the pixel electrode 17a and the first upper capacitor electrode 37a are electrically separated. This also makes it possible to maintain the capacitive coupling between the pixel electrodes 17a and 17b.

Thus, according to the present embodiment, it is possible to improve a process yield of producing a liquid crystal panel and an active matrix substrate to be provided in the liquid crystal panel.

In the liquid crystal panel of FIG. 21, each of the first and second lower capacitor electrodes 47a and 47b is larger in area than a corresponding one of the first and second upper capacitor electrodes 37a and 37b. The liquid crystal panel is thus advantageous in that even if the above capacitor electrodes are misaligned with respect to one another to an extent, a change is not easily caused to a total amount of the coupling capacitors (Cab1 and (Cab2+Cab21)), that is, a total amount of (i) an area by which the first lower capacitor electrode 47a overlaps the second upper capacitor electrode 37b and (ii) an area by which the second lower capacitor electrode 47b overlaps the first upper capacitor electrode 37a. Note that each of the first and second upper capacitor electrodes 37a and 37b may alternatively be larger in area than a corresponding one of the first and second lower capacitor electrodes 47a and 47b. The above advantage can be achieved even in this case.

Figure 24:
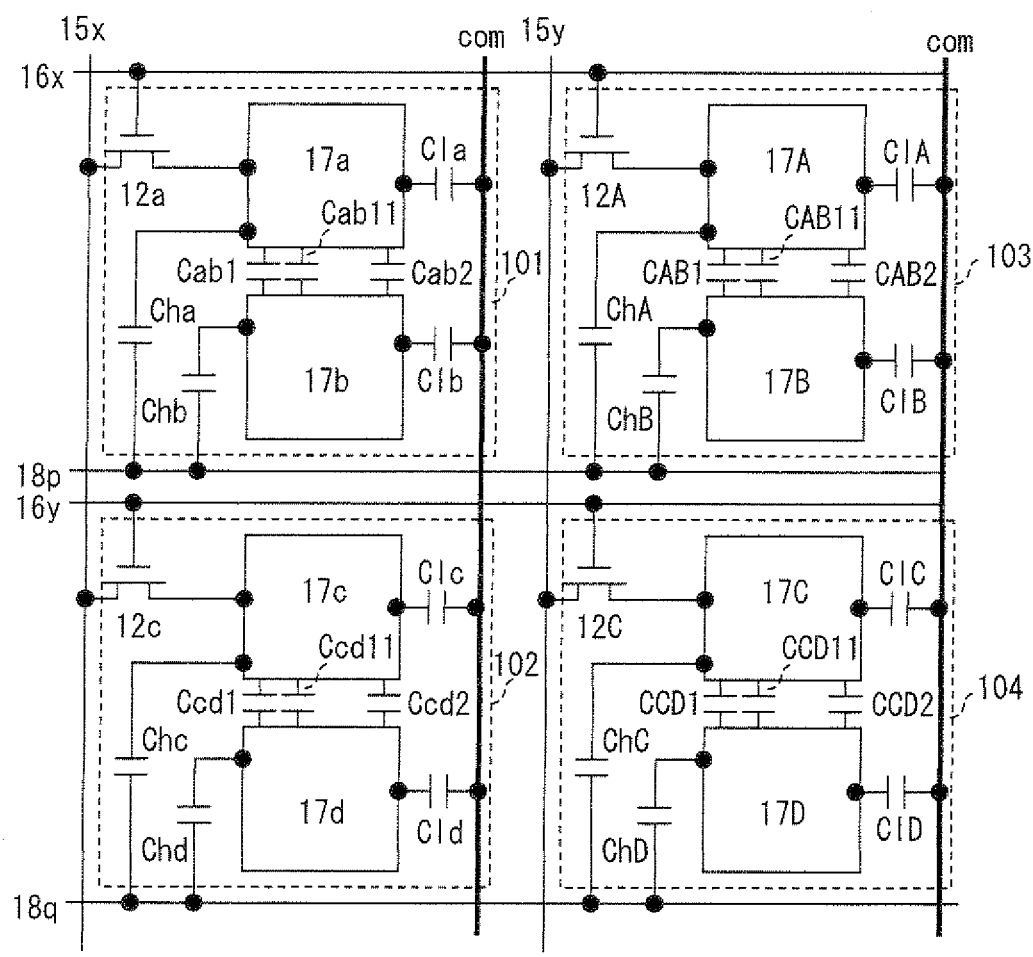
FIG. 24 is a circuit diagram illustrating another configuration of the liquid crystal panel in accordance with Embodiment 2.
Figure 25:
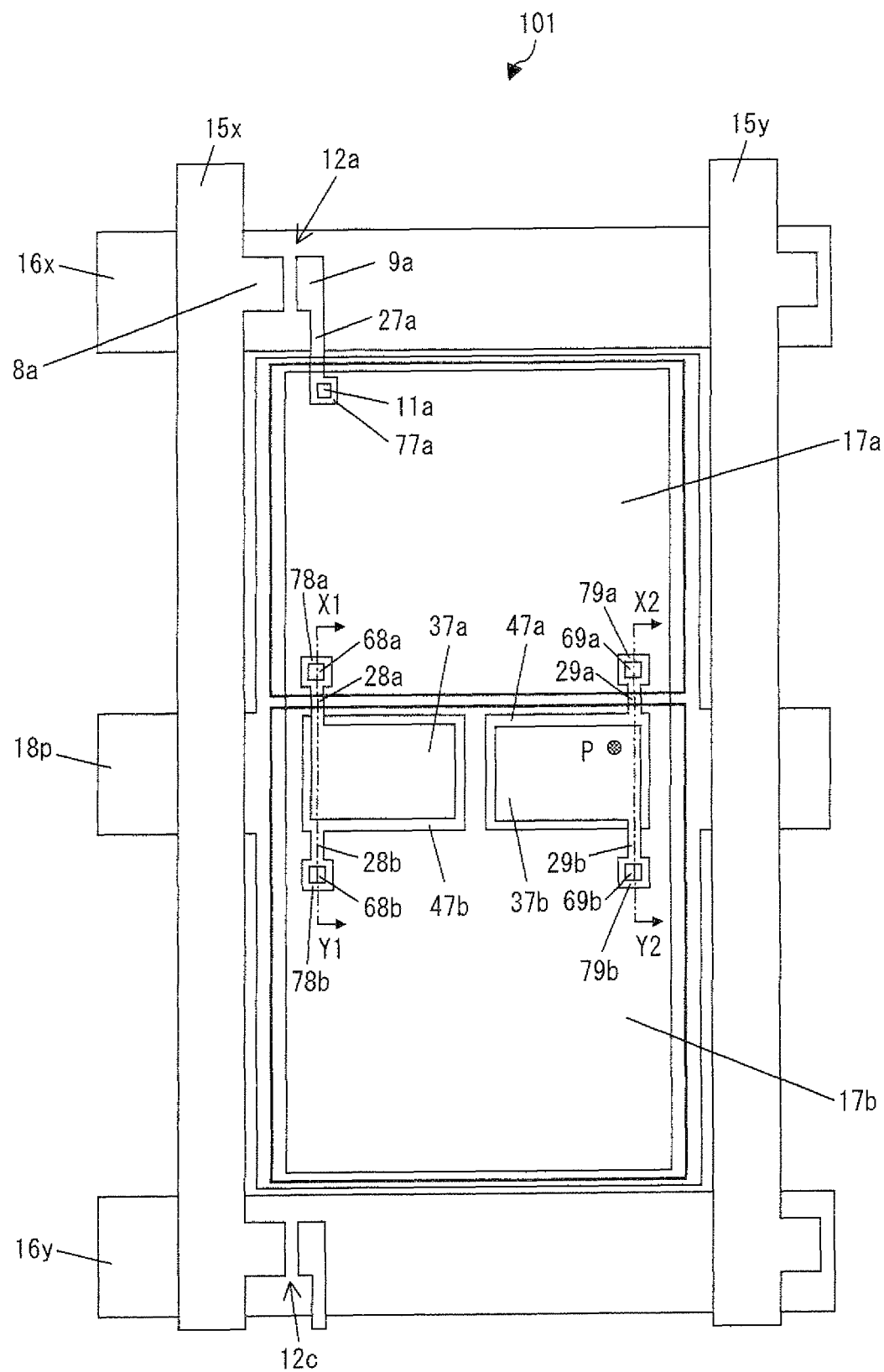
FIG. 25 is a plan view illustrating a specific example of the liquid crystal panel of FIG. 24.

The pixel 101 of FIG. 21 can be modified as illustrated in FIG. 25, which illustrates a liquid crystal panel. FIG. 24 is an equivalent circuit diagram of the liquid crystal panel illustrated in FIG. 25. As illustrated in FIG. 24, in, e.g., the pixel 101, the pixel electrodes 17a and 17b are connected with each other via (i) coupling capacitors Cab1 and Cab2 formed in parallel to each other in the row direction in a plan view and (ii) a coupling capacitor Cab11 formed in parallel to the coupling capacitor Cab1 in a direction in which the coupling capacitors Cab11 and Cab1 are aligned, the pixel electrode 17a is connected with the data signal line 15x via a transistor 12a connected with the scanning signal line 16x, a retention capacitor Cha is formed between the pixel electrode 17a and the retention capacitor line 18p, a retention capacitor Chb is formed between the pixel electrode 17b and the retention capacitor line 18p, a liquid crystal capacitor Cla is formed between the pixel electrode 17a and the common electrode com, and a liquid crystal capacitor Clb is formed between the pixel electrode 17b and the common electrode com.

Specifically, as illustrated in FIG. 25, the pixel 101 includes first and second upper capacitor electrodes 37a and 37b, which are both provided so as to overlap the pixel electrode 17b. The pixel 101 further includes first and second lower capacitor electrodes 47a and 47b. The first lower capacitor electrode 47a is provided so as to overlap the pixel electrode 17b and the second upper capacitor electrode 37b. The second lower capacitor electrode 47b is provided so as to overlap the pixel electrode 17b and the first upper capacitor electrode 37a. The retention capacitor line 18p includes a retention capacitor line extension which branches off from the retention capacitor line 18p. The retention capacitor line extension extends so as to overlap a part of an edge of each of the pixel electrodes 17a and 17b in a plan view.

More specifically, in a region which overlaps the pixel electrode 17b, the first and second upper capacitor electrodes 37a and 37b are arranged in the row direction, and the first and second lower capacitor electrodes 47a and 47b are also arranged in the row direction. The first upper capacitor electrode 37a overlaps the second lower capacitor electrode 47b at a first portion, whereas the second upper capacitor electrode 37b overlaps the first lower capacitor electrode 47a at a second portion, the first and second portions being arranged in the row direction. The retention capacitor line extension of the retention capacitor line 18*p* extends so as to (i) surround the pixel region and (ii) overlap three sides of each of the pixel electrodes 17*a* and 17*b* which three sides are sides other than the side that defines a gap between the pixel electrodes 17*a* and 17*b*.

The transistor 12*a* has a source electrode 8*a* and a drain electrode 9*a* both formed above the scanning signal line 16*x*. The source electrode 8*a* is connected with the data signal line 15*x*. The drain electrode 9*a* is connected with a drain extracting line 27*a*. The drain extracting line 27*a* is connected with a contact electrode 77*a*, which is in turn connected with the pixel electrode 17*a* via a contact hole 11*a*.

The first upper capacitor electrode 37*a* overlaps (i) the second lower capacitor electrode 47*b* via a gate insulating film and (ii) the pixel electrode 17*b* via an interlayer insulating film. Further, the first upper capacitor electrode 37*a* is connected with a first upper capacitor electrode extension 28*a*. The first upper capacitor electrode extension 28*a* is connected with a contact electrode 78*a*, which is in turn connected with the pixel electrode 17*a* via a contact hole 68*a*. The second lower capacitor electrode 47*b* is connected with a second lower capacitor electrode extension 28*b*. The second lower capacitor electrode extension 28*b* is connected with a contact electrode 78*b*, which is in turn connected with the pixel electrode 17*b* via a contact hole 68*b*. With this configuration, (i) the coupling capacitor Cab1 (see FIG. 24) between the pixel electrodes 17*a* and 17*b* is formed at the portion at which the first upper capacitor electrode 37*a* overlaps the second lower capacitor electrode 47*b*, and (ii) the coupling capacitor Cab11 (see FIG. 24) between the pixel electrodes 17*a* and 17*b* is formed at a portion at which the first upper capacitor electrode 37*a* overlaps the pixel electrode 17*b*.

The second upper capacitor electrode 37*b* overlaps the first lower capacitor electrode 47*a* via the gate insulating film. Further, the second upper capacitor electrode 37*b* is connected with a second upper capacitor electrode extension 29*b*. The second upper capacitor electrode extension 29*b* is connected with a contact electrode 79*b*, which is in turn connected with the pixel electrode 17*b* via a contact hole 69*b*. The first lower capacitor electrode 47*a* is connected with a first lower capacitor electrode extension 29*a*. The first lower capacitor electrode extension 29*a* is connected with a contact electrode 79*a*, which is in turn connected with the pixel electrode 17*a* via a contact hole 69*a*. With this configuration, the coupling capacitor Cab2 (see FIG. 24) between the pixel electrodes 17*a* and 17*b* is formed at the portion at which the second upper capacitor electrode 37*b* overlaps the first lower capacitor electrode 47*a*.

The pixel electrode 17*a* overlaps the retention capacitor line 18*p* via the interlayer insulating film and the gate insulating film. With this configuration, the retention capacitor Cha (see FIG. 24) is formed at a portion at which the pixel electrode 17*a* overlaps the retention capacitor line 18*p*. Further, the pixel electrode 17*b* overlaps the retention capacitor line 18*p* via the interlayer insulating film and the gate insulating film. With this configuration, the retention capacitor Chb (see FIG. 24) is formed at a portion at which the pixel electrode 17*b* overlaps the retention capacitor line 18*p*.

Figure 26:
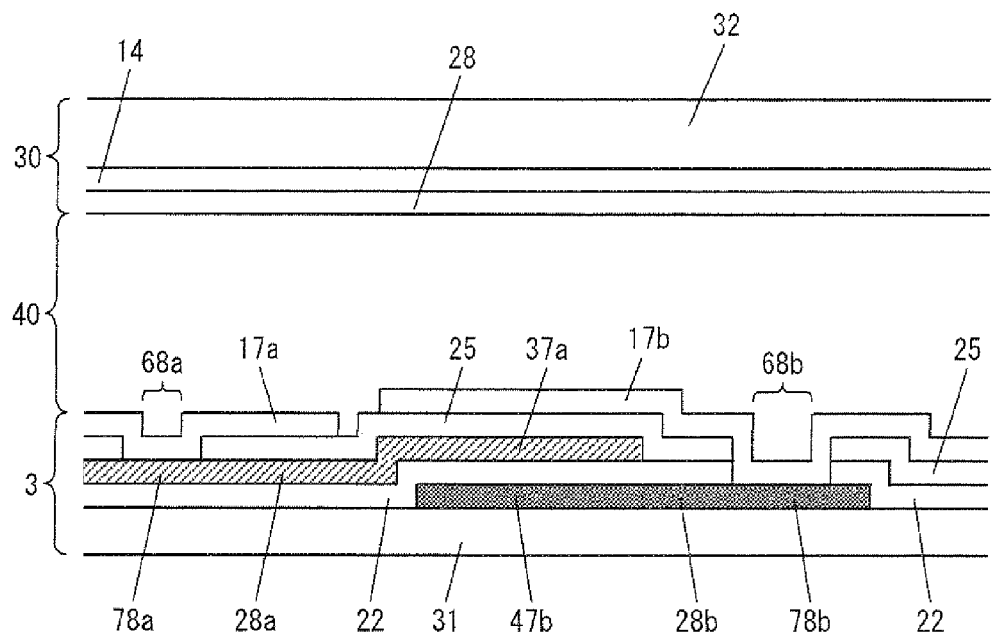
FIG. 26 is a cross-sectional view taken along a line X1-Y1 of FIG. 25.

FIG. 26 is a cross-sectional view taken along a line X1-Y1 of FIG. 25. As illustrated in FIG. 26, the present liquid crystal panel includes: an active matrix substrate 3; a color filter substrate 30 facing the active matrix substrate 3; and a liquid crystal layer 40 provided between the two substrates (3 and 30).

In the active matrix substrate 3, the second lower capacitor electrode 47*b*, the second lower capacitor electrode extension 28*b*, and the contact electrode 78*b* are formed on a glass substrate 31. An inorganic gate insulating film 22 is formed so as to cover the above members. Scanning signal lines (not shown) are also formed on the glass substrate 31. Formed on the inorganic gate insulating film 22 are members such as a semiconductor layer (i layer and n+ layer; not shown), the source electrode and the drain electrode (not shown) which have contact with the n+ layer, the first upper capacitor electrode 37*a*, the first upper capacitor electrode extension 28*a*, and the contact electrode 78*a*. An inorganic interlayer insulating film 25 is formed so as to cover the above members on the inorganic gate insulating film 22. The pixel electrodes 17*a* and 17*b* are formed on the inorganic interlayer insulating film 25. Further, an alignment film (not shown) is formed so as to cover the pixel electrodes 17*a* and 17*b*.

The inorganic interlayer insulating film 25 is penetrated at the contact hole 68*a*, which connects the pixel electrode 17*a* with the contact electrode 78*a*. The inorganic interlayer insulating film 25 and the inorganic gate insulating film 22 are penetrated at the contact hole 68*b*, which connects the pixel electrode 17*b* with the contact electrode 78*b*. In other words, the pixel electrode 17*a* and the first upper capacitor electrode 37*a* are electrically connected with each other, and the pixel electrode 17*b* and the second lower capacitor electrode 47*b* are electrically connected with each other. The first upper capacitor electrode 37*a* overlaps the second lower capacitor electrode 47*b* via the inorganic gate insulating film 22. As such, the coupling capacitor Cab1 is formed (see FIG. 24). The first upper capacitor electrode 37*a* overlaps the pixel electrode 17*b* via the inorganic interlayer insulating film 25. As such, the coupling capacitor Cab11 (see FIG. 24) is formed.

Figure 27:
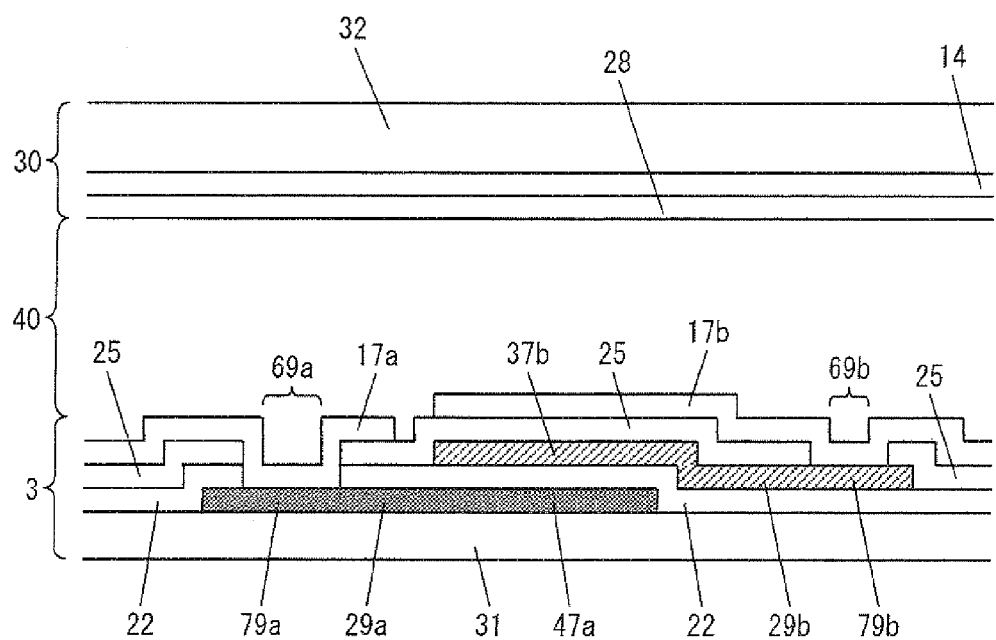
FIG. 27 is a cross-sectional view taken along a line X2-Y2 of FIG. 25.

FIG. 27 is a cross-sectional view taken along a line X2-Y2 of FIG. 25. As illustrated in FIG. 27, in the active matrix substrate 3, the first lower capacitor electrode 47*a*, the first lower capacitor electrode extension 29*a*, and the contact electrode 79*a* are formed on the glass substrate 31. The inorganic gate insulating film 22 is formed so as to cover the above members. Scanning signal lines (not shown) are also formed on the glass substrate 31. Formed on the inorganic gate insulating film 22 are members such as a semiconductor layer (i layer and n+ layer; not shown), the source electrode and the drain electrode (not shown) which have contact with the n+ layer, the second upper capacitor electrode 37*b*, the second upper capacitor electrode extension 29*b*, and the contact electrode 79*b*. The inorganic interlayer insulating film 25 is formed so as to cover the above members on the inorganic gate insulating film 22. The pixel electrodes 17*a* and 17*b* are formed on the inorganic interlayer insulating film 25. Further, an alignment film (not shown) is formed so as to cover the pixel electrodes 17*a* and 17*b*.

The inorganic interlayer insulating film 25 and the inorganic gate insulating film 22 are penetrated at the contact hole 69*a*, which connects the pixel electrode 17*a* with the contact electrode 79*a*. The inorganic interlayer insulating film 25 is penetrated at the contact hole 69*b*, which connects the pixel electrode 17*b* with the contact electrode 79*b*. In other words, the pixel electrode 17*a* and the first lower capacitor electrode 47*a* are electrically connected with each other, and the pixel electrode 17*b* and the second upper capacitor electrode 37*b* are electrically connected with each other. The second upper capacitor electrode 37*b* overlaps the first lower capacitor electrode 47*a* via the inorganic gate insulating film 22. As such, the coupling capacitor Cab2 is formed (see FIG. 24). The pixel electrode 17*b* is formed in a layer above the second upper capacitor electrode 37*b* via the inorganic interlayer insulating film 25.

As illustrated in FIGS. 26 and 27, in the color filter substrate 30, a colored layer 14 is provided on a glass substrate 32, a common electrode (corn) 28 is provided on the colored layer 14, and an alignment film (not shown) is provided in such a manner as to cover the common electrode 28.

In the liquid crystal panel illustrated in FIG. 25, the pixel electrodes 17a and 17b are connected (capacitance-coupled) with, each other via the two coupling capacitors ((Cab1+Cab11) and Cab2) which are provided in parallel to each other in a plan view. Therefore, in a case where there has occurred a short circuit between, for example, the second upper capacitor electrode 37b and the first lower capacitor electrode 47a or the data signal line 15y at P in FIG. 25 (during a production step or the like), it is possible to maintain the capacitive coupling between the pixel electrodes 17a and 17b by carrying out a correction step of cutting with a laser beam the second upper capacitor electrode 37b between (i) the contact hole 69b and (ii) a portion at which the short circuit has occurred. In a case where there has occurred a short circuit between the second upper capacitor electrode 37b and the first lower capacitor electrode 47a and the above laser beam cutting has been carried out in response, the pixel electrode 17a and the second upper capacitor electrode 37b become conductive with each other and thus share an identical potential. Further, the second upper capacitor electrode 37b overlaps the pixel electrode 17b via the inorganic interlayer insulating film 25. As such, it is possible to maintain the capacitive coupling between the pixel electrodes 17a and 17b.

Figure 28:
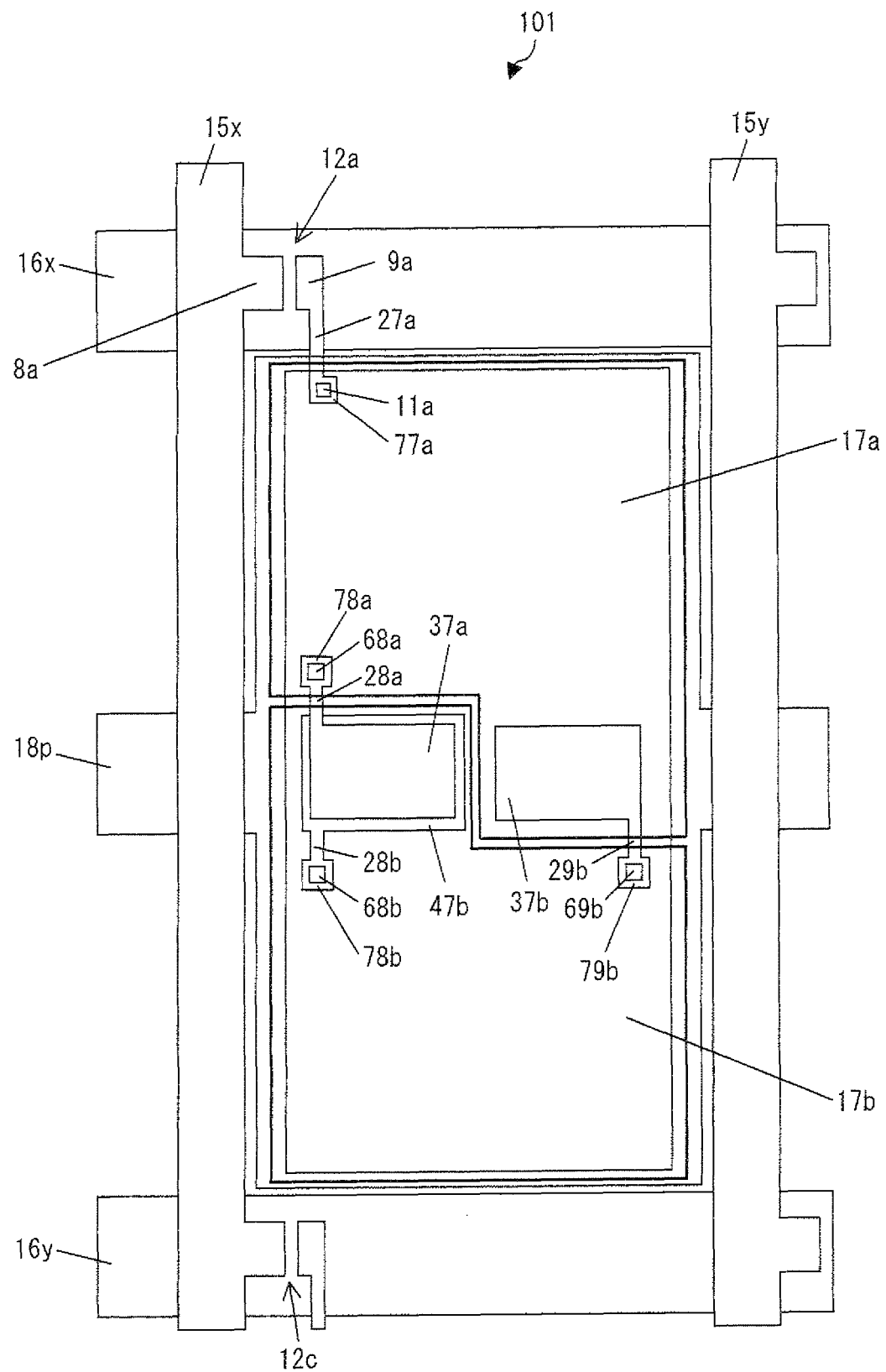
FIG. 28 is a plan view illustrating another specific example of the liquid crystal panel of FIG. 24.

The pixel 101 of FIGS. 21 and 25 can be modified as illustrated in FIG. 28. According to the arrangement of FIG. 28, the first lower capacitor electrode 47a illustrated in FIG. 21 is omitted, and the pixel electrodes 17a and 17b, each in a rectangular shape with a portion cut out, are arranged in the column direction so as to mesh with each other. The first upper capacitor electrode 37a is provided so as to overlap the pixel electrode 17b. The second upper capacitor electrode 37b is provided so as to (i) be adjacent to the first upper capacitor electrode 37a in the row direction and (ii) overlap the pixel electrode 17a. The second lower capacitor electrode 47b is provided so as to overlap the pixel electrode 17b and, the first upper capacitor electrode 37a. In other words, the first and second upper capacitor electrodes 37a and 37b are arranged in the row direction; the second lower capacitor electrode 47b, the first upper capacitor electrode 37a, and the pixel electrode 17b overlap one another at a first portion in that order in a direction in which the second lower capacitor electrode 47b, the first upper capacitor electrode 37a, and the pixel electrode 17b are stacked; the second upper capacitor electrode 37b and the pixel electrode 17a overlap each other at a second portion in a direction in which the second upper capacitor electrode 37b and the pixel electrode 17a are stacked; and the first and second portions are arranged in the row direction. The retention capacitor line extension of the retention capacitor line 18p extends so as to (i) surround the pixel region and (ii) overlap three sides of each of the pixel electrodes 17a and 17b which three sides are sides other than a side that defines a gap between the pixel electrodes 17a and 17b.

The transistor 12a has a source electrode 8a and a drain electrode 9a both formed above the scanning signal line 16x. The source electrode 8a is connected with the data signal line 15x. The drain electrode 9a is connected with a drain extracting line 27a. The drain extracting line 27a is connected with a contact electrode 77a, which is in turn connected with the pixel electrode 17a via a contact hole 11a.

The first upper capacitor electrode 37a overlaps (i) the second lower capacitor electrode 47b via a gate insulating film and (ii) the pixel electrode 17b via an interlayer insulating film. Further, the first upper capacitor electrode 37a is connected with a first upper capacitor electrode extension 28a. The first upper capacitor electrode extension 28a is connected with a contact electrode 78a, which is in turn connected with the pixel electrode 17a via a contact hole 68a. The second lower capacitor electrode 47b is connected with a second lower capacitor electrode extension 28b. The second lower capacitor electrode extension 28b is connected with a contact electrode 78b, which is in turn connected with the pixel electrode 17b via a contact hole 68b. With this configuration, (i) the coupling capacitor Cab1 (see FIG. 24) between the pixel electrodes 17a and 17b is formed at the portion at which the first upper capacitor electrode 37a overlaps the second lower capacitor electrode 47b, and (ii) the coupling capacitor Cab11 (see FIG. 24) between the pixel electrodes 17a and 17b is formed at a portion at which the first upper capacitor electrode 37a overlaps the pixel electrode 17b.

The second upper capacitor electrode 37b overlaps the pixel electrode 17a via the interlayer insulating film. Further, the second upper capacitor electrode 37b is connected with a second upper capacitor electrode extension 29b. The second upper capacitor electrode extension 29b is connected with a contact electrode 79b, which is in turn connected with the pixel electrode 17b via a contact hole 69b. With this configuration, the coupling capacitor Cab2 (see FIG. 24) between the pixel electrodes 17a and 17b is formed at the portion at which the second upper capacitor electrode 37b overlaps the pixel electrode 17a.

The pixel electrode 17a overlaps the retention capacitor line 18p via the interlayer insulating film and the gate insulating film. With this configuration, the retention capacitor Cha (see FIG. 24) is formed at a portion at which the pixel electrode 17a overlaps the retention capacitor line 18p. Further, the pixel electrode 17b overlaps the retention capacitor line 18p via the interlayer insulating film and the gate insulating film. With this configuration, the retention capacitor Chb (see FIG. 24) is formed at a portion at which the pixel electrode 17b overlaps the retention capacitor line 18p. Other pixels each have a configuration (specifically, how pixel constituents are shaped, positioned and connected) identical to that of the pixel 101.

According to the above arrangement, the sub-pixel including the pixel electrode 17a serves as "bright," and the sub-pixel including the pixel electrode 17b serves as "dark."

Figure 29:
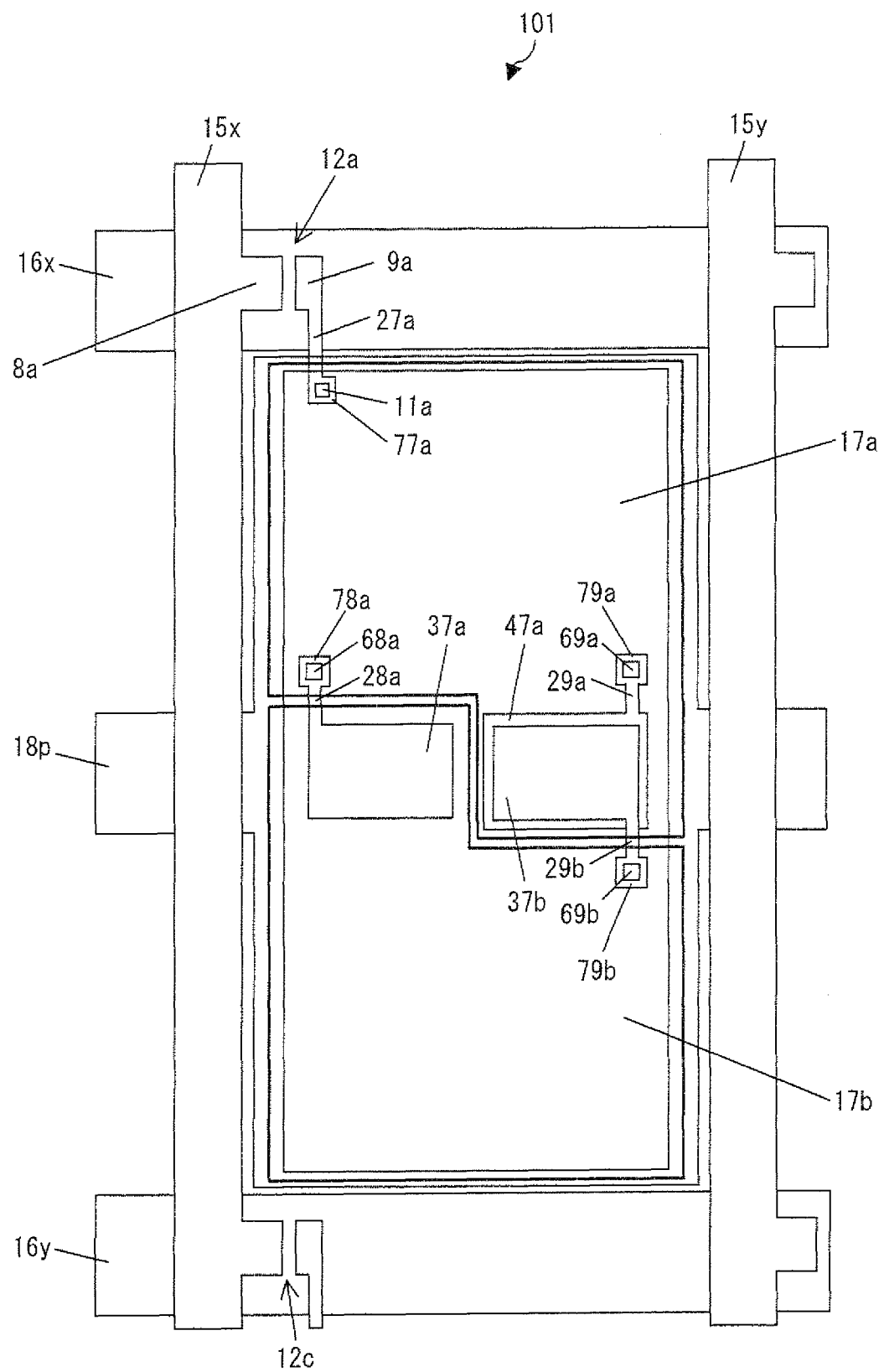
FIG. 29 is a plan view illustrating still another specific example of the liquid crystal panel of FIG. 24.

The pixel 101 of FIG. 28 can be modified as illustrated in FIG. 29. According to the arrangement of FIG. 29, the second lower capacitor electrode 47b overlapping the pixel electrode 17b is omitted, and the first lower capacitor electrode 47a overlaps the pixel electrode 17a. In other words, the first and second upper capacitor electrodes 37a and 37b are arranged in the row direction; the first upper capacitor electrode 37a and the pixel electrode 17b overlap each other at a first portion in a direction in which the first upper capacitor electrode 37a and the pixel electrode 17b are stacked; the first lower capacitor electrode 47a, the second upper capacitor electrode 37b, and the pixel electrode 17a overlap one another at a second portion in that order in a direction in which the first lower capacitor electrode 47a, the second upper capacitor electrode 37b, and the pixel electrode 17a are stacked; and the first and second portions are arranged in the row direction.

More specifically, the first upper capacitor electrode 37a overlaps the pixel electrode 17b via an interlayer insulating film. Further, the first upper capacitor electrode 37a is connected with a first upper capacitor electrode extension 28a. The first upper capacitor electrode extension 28a is connected with a contact electrode 78a, which is in turn connected with the pixel electrode 17a via a contact hole 68a. With this configuration, the coupling capacitor Cab1 (see FIG. 24) between the pixel electrodes 17a and 17b is formed at a portion at which the first upper capacitor electrode 37a overlaps the pixel electrode 17b.

The second upper capacitor electrode 37b overlaps the first lower capacitor electrode 47a via a gate insulating film. Further, the second upper capacitor electrode 37b is connected with a second upper capacitor electrode extension 29b. The second upper capacitor electrode extension 29b is connected with a contact electrode 79b, which is in turn connected with the pixel electrode 17b via a contact hole 69b.

The first lower capacitor electrode 47a is connected with a first lower capacitor electrode extension 29a. The first lower capacitor electrode extension 29a is connected with a contact electrode 79a, which is in turn connected with the pixel electrode 17a via a contact hole 69a. With this configuration, (i) the coupling capacitor Cab2 (see FIG. 24) between the pixel electrodes 17a and 17b is formed at a portion at which the second upper capacitor electrode 37b overlaps the first lower capacitor electrode 47a, and (ii) the coupling capacitor Cab21 (not shown) between the pixel electrodes 17a and 17b is formed at a portion at which the second upper capacitor electrode 37b overlaps the pixel electrode 17a.

Even with the respective arrangements of FIGS. 28 and 29, it is possible to improve a process yield of producing a liquid crystal panel and an active matrix substrate to be provided in the liquid crystal panel.

Embodiment 3

Figure 30:
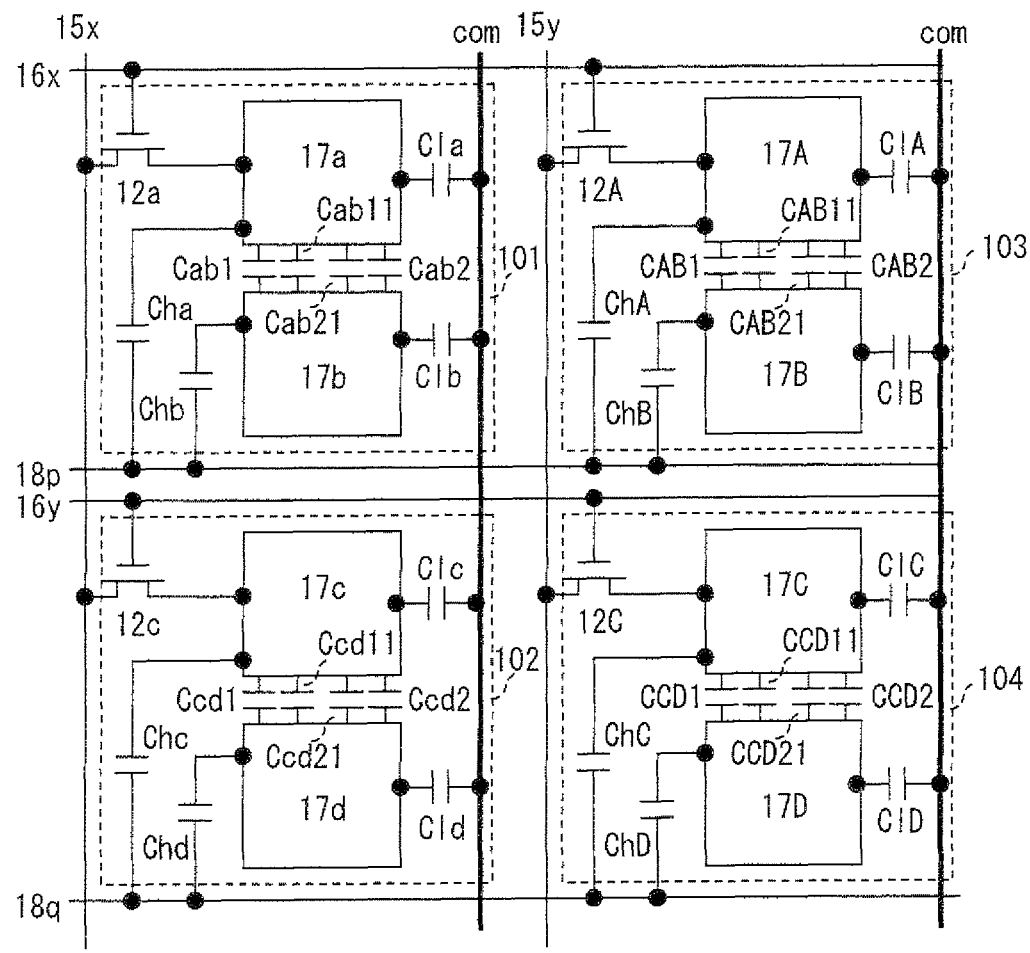
FIG. 30 is a circuit diagram illustrating a configuration of a liquid crystal panel in accordance with Embodiment 3.

FIG. 30 is an equivalent circuit diagram showing a part of a liquid crystal display panel in accordance with Embodiment 3. As illustrated in FIG. 30, the liquid crystal display panel includes: data signal lines (15x and 15y) extending in a column direction (up-down direction in the drawing); scanning signal lines (16x and 16y) extending in a row direction (right-left direction in the drawing); pixels (101-104) positioned in row and column directions; retention capacitor lines (18p and 18q); and a common electrode (counter electrode) corn. Each pixel has the same structure. A pixel column including the pixels 101 and 102 is adjacent to a pixel column including the pixels 103 and 104. A pixel row including the pixels 101 and 103 is adjacent to a pixel row including the pixels 102 and 104.

In the liquid crystal panel, one data signal line and one scanning signal line are provided for each pixel. Further, each pixel includes two pixel electrodes arranged in the column direction: The pixel 101 includes two pixel electrodes 17a and 17b, the pixel 102 includes two pixel electrodes 17c and 17d, and the pixel electrodes 17a, 17b, 17c, and 17d are arranged in a line; the pixel 103 includes two pixel electrodes 17A and 17B, the pixel 104 includes two pixel electrodes 17C and 17D, and the pixel electrodes 17A, 17B, 17C, and 17D are arranged in a line. The pixel electrodes 17a and 17A are adjacent to each other in the row direction, the pixel electrodes 17b and 17B are adjacent to each other in the row direction, the pixel electrodes 17c and 17C are adjacent to each other in the row direction, and the pixel electrodes 17d and 17D are adjacent to each other in the row direction.

In the pixel 101, the pixel electrodes 17a and 17b are connected with each other via (i) coupling capacitors Cab1 and Cab2 formed in parallel to each other in a row direction in a plan view, (ii) a coupling capacitor Cab11 formed in parallel to the coupling capacitor Cab1 in a direction in which the coupling capacitors Cab11 and Cab1 are aligned, and (iii) a coupling capacitor Cab21 formed in parallel to the coupling capacitor Cab2 in a direction in which the coupling capacitors Cab21 and Cab2 are aligned, the pixel electrode 17a is connected with the data signal line 15x via a transistor 12a connected with the scanning signal line 16x, a retention capacitor Cha is formed between the pixel electrode 17a and the retention capacitor line 18p, a retention capacitor Chb is formed between the pixel electrode 17b and the retention capacitor line 18p, a liquid crystal capacitor Cla is formed between the pixel electrode 17a and the common electrode corn, and a liquid crystal capacitor Clb is formed between the pixel electrode 17b and the common electrode corn.

In the pixel 102 adjacent to the pixel 101 in the column direction, the pixel electrodes 17c and 17d are connected with each other via (i) coupling capacitors Ccd1 and Ccd2 formed in parallel to each other in the row direction in a plan view, (ii) a coupling capacitor Ccd11 formed in parallel to the coupling capacitor Cec11 in a direction in which the coupling capacitors Ccd11 and Ccd1 are aligned, and (iii) a coupling capacitor Ccd21 formed in parallel to the coupling capacitor Ccd2 in a direction in which the coupling capacitors Ccd21 and Ccd2 are aligned, the pixel electrode 17c is connected with the data signal line 15x via a transistor 12c connected with the scanning signal line 16y, a retention capacitor Chc is formed between the pixel electrode 17c and the retention capacitor line 18q, a retention capacitor Chd is formed between the pixel electrode 17d and the retention capacitor line 18q, a liquid crystal capacitor Clc is formed between the pixel electrode 17c and the common electrode corn, and a liquid crystal capacitor Cld is formed between the pixel electrode 17d and the common electrode corn.

In the pixel 103 adjacent to the pixel 101 in the row direction, the pixel electrodes 17A and 17B are connected with each other via (i) coupling capacitors CAB1 and CAB2 formed in parallel to each other in the row direction in a plan view, (ii) a coupling capacitor CAB11 formed in parallel to the coupling capacitor CAB1 in a direction in which the coupling capacitors CAB11 and CAB1 are aligned, and (iii) a coupling capacitor CAB21 formed in parallel to the coupling capacitor CAB2 in a direction in which the coupling capacitors CAB21 and CAB2 are aligned, the pixel electrode 17A is connected with the data signal line 15y via a transistor 12A connected with the scanning signal line 16x, a retention capacitor ChA is formed between the pixel electrode 17A and the retention capacitor line 18p, a retention capacitor ChB is formed between the pixel electrode 17B and the retention capacitor line 18p, a liquid crystal capacitor ClA is formed between the pixel electrode 17A and the common electrode corn, and a liquid crystal capacitor ClB is formed between the pixel electrode 17B and the common electrode corn.

Assume that in a liquid crystal display device including the present liquid crystal panel, the data signal lines 15x and 15y are driven as illustrated in FIG. 5. In this case, in the frame F1, the sub-pixel including the pixel electrode 17a (positive polarity) serves as "bright," the sub-pixel including the pixel electrode 17b (positive polarity) serves as "dark," the sub-pixel including the pixel electrode 17c (negative polarity) serves as "bright," the sub-pixel including the pixel electrode 17d (negative polarity) serves as "dark," the sub-pixel including the pixel electrode 17A (negative polarity) serves as "bright," and the sub-pixel including the pixel electrode 17B (negative polarity) serves as "dark." (a) of FIG. 6 illustrates an overall state of the above sub-pixels for the frame F1. In the frame F2, the sub-pixel including the pixel electrode 17a (negative polarity) serves as "bright," the sub-pixel including the pixel electrode 17b (negative polarity) serves as "dark," the sub-pixel including the pixel electrode 17c (positive polarity) serves as "bright," the sub-pixel including the pixel electrode 17d (positive polarity) serves as "dark," the sub-pixel including the pixel electrode 17A (positive polarity) serves as "bright," and the sub-pixel including the pixel electrode 17B (positive polarity) serves as "dark." (b) of FIG. 6 illustrates an overall state of the above sub-pixels for the frame F2.

Figure 31:
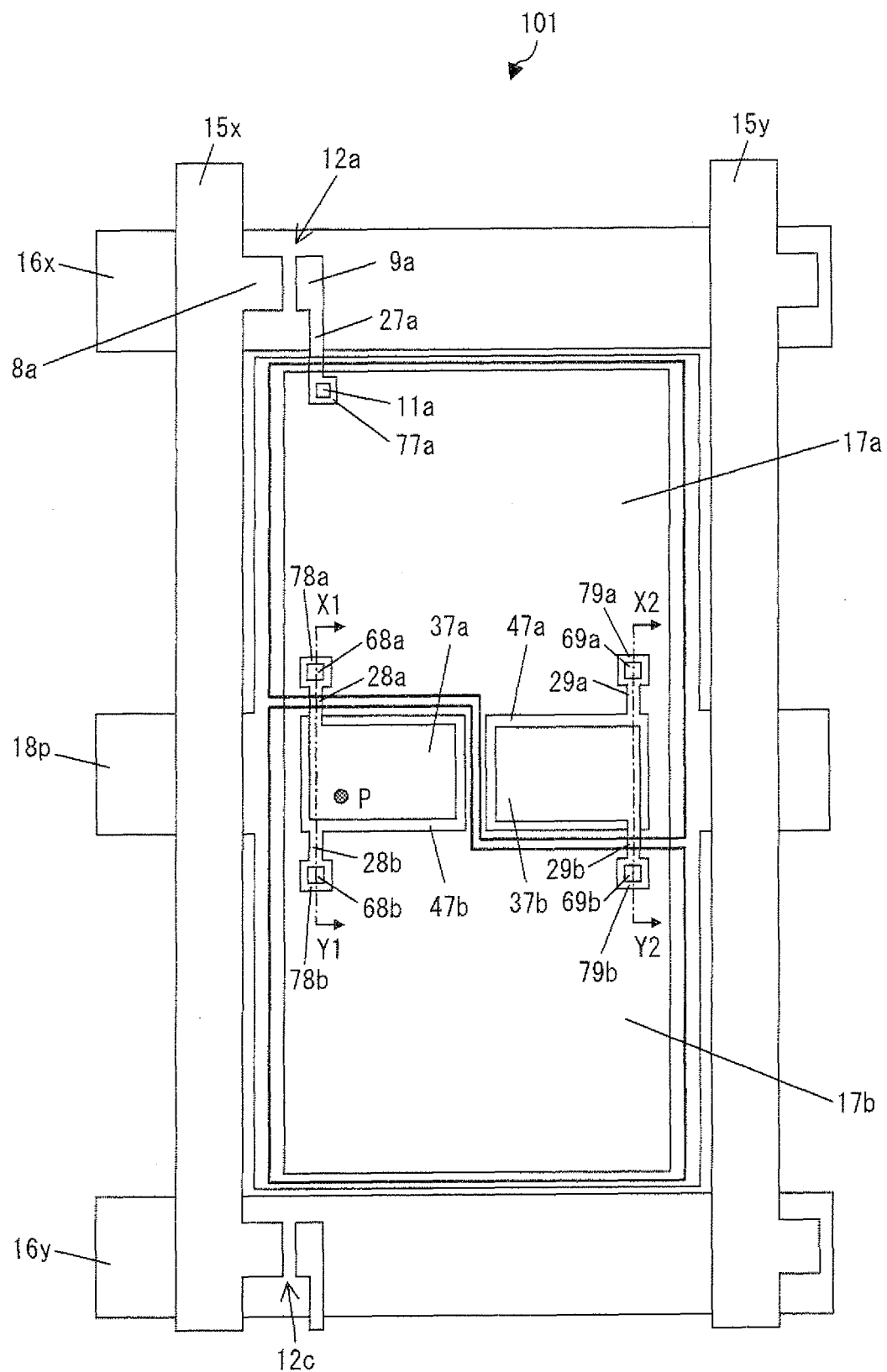
FIG. 31 is a plan view illustrating a specific example of the liquid crystal panel of FIG. 30.

A specific example of the pixel 101 of FIG. 30 is illustrated in FIG. 31. As illustrated in FIG. 31, the pixel 101 is configured as follows: The transistor 12a is provided in the vicinity of an intersection of the data signal line 15x with the scanning signal line 16x. The two signal lines (15x and 16x) define a pixel region, in which the pixel electrodes 17a and 17b, each in a rectangular shape with a portion cut out, are arranged in the column direction so as to mesh with each other. The pixel 101 includes first and second upper capacitor electrodes 37a and 37b. The first upper capacitor electrode 37a is provided so as to overlap the pixel electrode 17b. The second upper capacitor electrode 37b is provided so as to overlap the pixel electrode 17a. The pixel 101 further includes first and second lower capacitor electrodes 47a and 47b. The first lower capacitor electrode 47a is provided so as to overlap the pixel electrode 17a and the second upper capacitor electrode 37b. The second lower capacitor electrode 47b is provided so as to overlap the pixel electrode 17b and the first upper capacitor electrode 37a. The retention capacitor line 18p includes a retention capacitor line extension which branches off from the retention capacitor line 18p. The retention capacitor line extension extends so as to overlap a part of an edge of each of the pixel electrodes 17a and 17b in a plan view.

More specifically, the first and second upper capacitor electrodes 37a and 37b are arranged in the row direction, and the first and second lower capacitor electrodes 47a and 47b are also arranged in the row direction. The second lower capacitor electrode 47b, the first upper capacitor electrode 37a, and the pixel electrode 17b overlap one another at a first portion in that order in a direction in which the second lower capacitor electrode 47b, the first upper capacitor electrode 37a, and the pixel electrode 17b are stacked; the first lower capacitor electrode 47a, the second upper capacitor electrode 37b, and the pixel electrode 17a overlap one another at a second portion in that order in a direction in which the first lower capacitor electrode 47a, the second upper capacitor electrode 37b, and the pixel electrode 17a are stacked; and, the first and second portions are arranged in the row direction. The retention capacitor line extension of the retention capacitor line 18p extends so as to (i) surround the pixel region and (ii) overlap three sides of each of the pixel electrodes 17a and 17b which three sides are sides other than sides that define a gap between the pixel electrodes 17a and 17b.

The transistor 12a has a source electrode 8a and a drain electrode 9a both formed above the scanning signal line 16x. The source electrode 8a is connected with the data signal line 15x. The drain electrode 9a is connected with a drain extracting line 27a. The drain extracting line 27a is connected with a contact electrode 77a, which is in turn connected with the pixel electrode 17a via a contact hole 11a.

The first upper capacitor electrode 37a overlaps (i) the second lower capacitor electrode 47b via a gate insulating film and (ii) the pixel electrode 17b via an interlayer insulating film. Further, the first upper capacitor electrode 37a is connected with a first upper capacitor electrode extension 28a. The first upper capacitor electrode extension 28a is connected with a contact electrode 78a, which is in turn connected with the pixel electrode 17a via a contact hole 68a. The second lower capacitor electrode 47b is connected with a second lower capacitor electrode extension 28b. The second lower capacitor electrode extension 28b is connected with a contact electrode 78b, which is in turn connected with the pixel electrode 17b via a contact hole 68b. With this configuration, (i) the coupling capacitor Cab1 (see FIG. 30) between the pixel electrodes 17a and 17b is formed at the portion at which the first upper capacitor electrode 37a overlaps the second lower capacitor electrode 47b, and (ii) the coupling capacitor Cab11 (see FIG. 30) between the pixel electrodes 17a and 17b is formed at a portion at which the first upper capacitor electrode 37a overlaps the pixel electrode 17b.

The second upper capacitor electrode 37b overlaps (i) the first lower capacitor electrode 47a via the gate insulating film and (ii) the pixel electrode 17a via the interlayer insulating film. Further, the second upper capacitor electrode 37b is connected with a second upper capacitor electrode extension 29b. The second upper capacitor electrode extension 29b is connected with a contact electrode 79b, which is in turn connected with the pixel electrode 17b via a contact hole 69b. The first lower capacitor electrode 47a is connected with a first lower capacitor electrode extension 29a. The first lower capacitor electrode extension 29a is connected with a contact electrode 79a, which is in turn connected with the pixel electrode 17a via a contact hole 69a. With this configuration, (i) the coupling capacitor Cab2 (see FIG. 30) between the pixel electrodes 17a and 17b is formed at the portion at which the second upper capacitor electrode 37b overlaps the first lower capacitor electrode 47a, and (ii) the coupling capacitor Cab21 (see FIG. 30) between the pixel electrodes 17a and 17b is formed at a portion at which the second upper capacitor electrode 37b overlaps the pixel electrode 17a.

The pixel electrode 17a overlaps the retention capacitor line 18p via the interlayer insulating film and the gate insulating film. With this configuration, the retention capacitor Cha (see FIG. 30) is formed at a portion at which the pixel electrode 17a overlaps the retention capacitor line 18p. Further, the pixel electrode 17b overlaps the retention capacitor line 18p via the interlayer insulating film and the gate insulating film. With this configuration, the retention capacitor Chb (see FIG. 30) is formed at a portion at which the pixel electrode 17b overlaps the retention capacitor line 18p. Other pixels each have a configuration (specifically, how pixel constituents are shaped, positioned and connected) identical to that of the pixel 101.

According to the above arrangement, the sub-pixel including the pixel electrode 17a serves as "bright," and the sub-pixel including the pixel electrode 17b serves as "dark."

Figure 32:
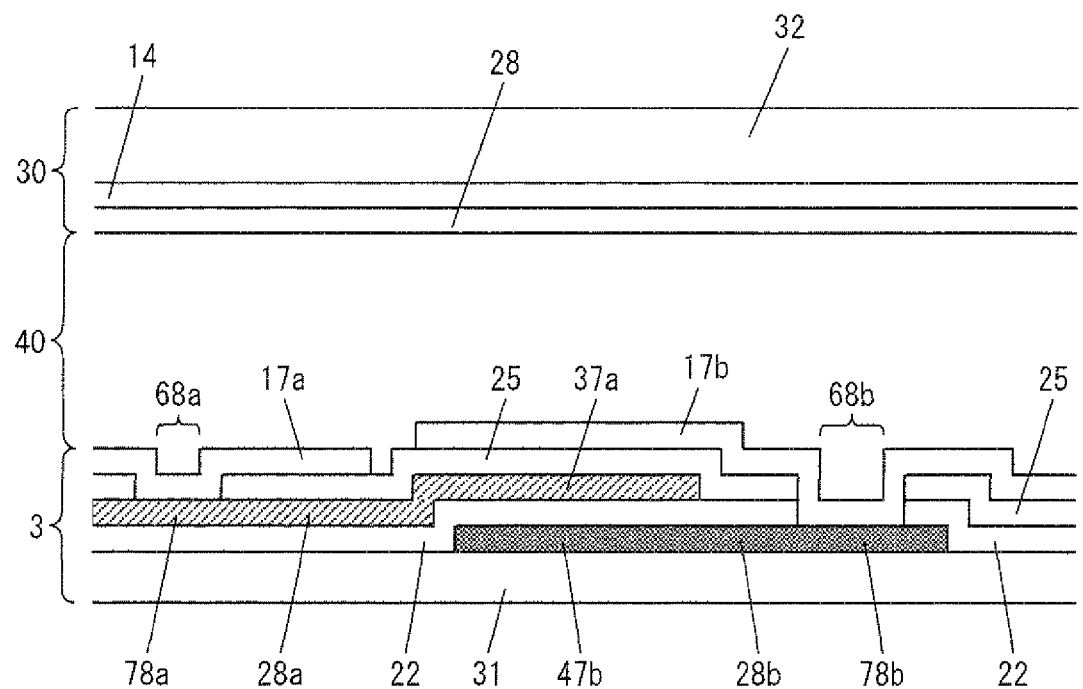
FIG. 32 is a cross-sectional view taken along a line X1-Y1 of FIG. 31.

FIG. 32 is a cross-sectional view taken along a line X1-Y1 of FIG. 31. As illustrated in FIG. 32, the present liquid crystal panel includes: an active matrix substrate 3; a color filter substrate 30 facing the active matrix substrate 3; and a liquid crystal layer 40 provided between the two substrates (3 and 30).

In the active matrix substrate 3, the second lower capacitor electrode 47b, the second lower capacitor electrode extension 28b, and the contact electrode 78b are formed on a glass substrate 31. An inorganic gate insulating film 22 is formed so as to cover the above members. Scanning signal lines (not shown) are also formed on the glass substrate 31. Formed on the inorganic gate insulating film 22 are members such as a semiconductor layer (i layer and n+ layer; not shown), the source electrode and the drain electrode (not shown) which have contact with the n+ layer, the first upper capacitor electrode 37a, the first upper capacitor electrode extension 28a, and the contact electrode 78a. An inorganic interlayer insulating film 25 is formed so as to cover the above members on the inorganic gate insulating film 22. The pixel electrodes 17a and 17b are formed on the inorganic interlayer insulating film 25. Further, an alignment film (not shown) is formed so as to cover the pixel electrodes 17a and 17b.

The inorganic interlayer insulating film 25 is penetrated at the contact hole 68a, which connects the pixel electrode 17a with the contact electrode 78a. The inorganic interlayer insulating film 25 and the inorganic gate insulating film 22 are penetrated at the contact hole 68b, which connects the pixel electrode 17b with the contact electrode 78b. In other words, the pixel electrode 17a and the first upper capacitor electrode 37a are electrically connected with each other, and the pixel electrode 17b and the second lower capacitor electrode 47b are electrically connected with each other. The first upper capacitor electrode 37a overlaps the second lower capacitor electrode 47b via the inorganic gate insulating film 22. As such, the coupling capacitor Cab1 is formed (see FIG. 30). The first upper capacitor electrode 37a overlaps the pixel electrode 17b via the inorganic interlayer insulating film 25. As such, the coupling capacitor Cab11 (see FIG. 30) is formed.

Figure 33:
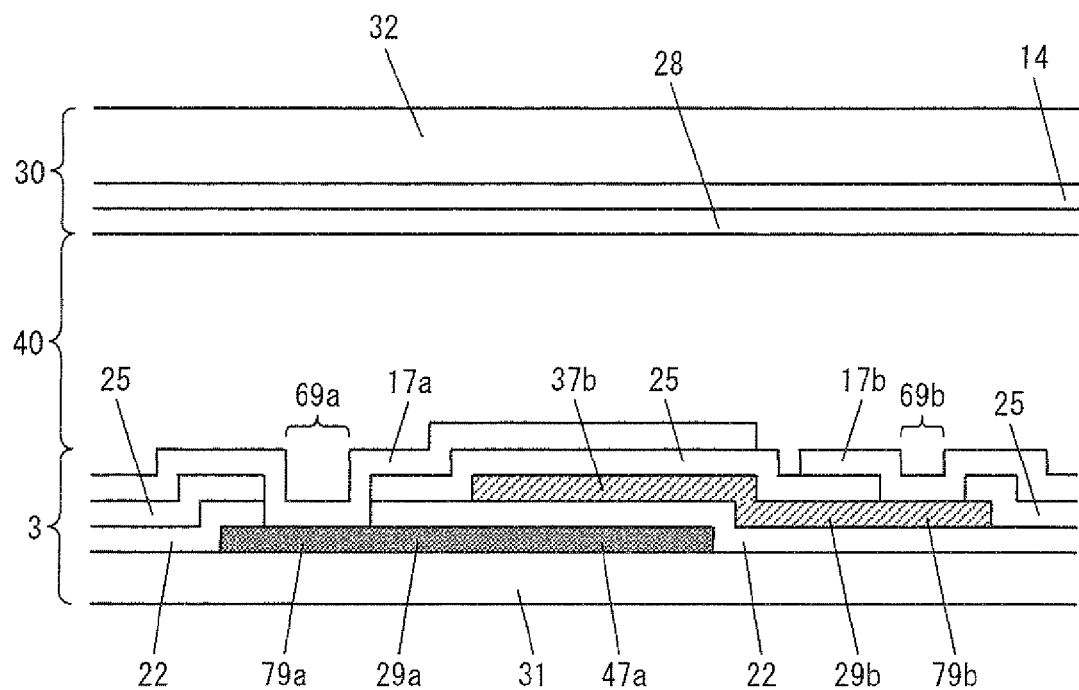
FIG. 33 is a cross-sectional view taken along a line X2-Y2 of FIG. 31.

FIG. 33 is a cross-sectional view taken along a line X2-Y2 of FIG. 31. As illustrated in FIG. 33, in the active matrix substrate 3, the first lower capacitor electrode 47a, the first lower capacitor electrode extension 29a, and the contact electrode 79a are formed on the glass substrate 31. The inorganic gate insulating film 22 is formed so as to cover the above members. Scanning signal lines (not shown) are also formed on the glass substrate 31. Formed on the inorganic gate insulating film 22 are members such as a semiconductor layer (i layer and n+ layer; not shown), the source electrode and the drain electrode (not shown) which have contact with the n+ layer, the second upper capacitor electrode 37b, the second upper capacitor electrode extension 29b, and the contact electrode 79b. The inorganic interlayer insulating film 25 is formed so as to cover the above members on the inorganic gate insulating film 22. The pixel electrodes 17a and 17b are formed on the inorganic interlayer insulating film 25. Further, an alignment film (not shown) is formed so as to cover the pixel electrodes 17a and 17b.

The inorganic interlayer insulating film 25 and the inorganic gate insulating film 22 are penetrated at the contact hole 69a, which connects the pixel electrode 17a with the contact electrode 79a. The inorganic interlayer insulating film 25 is penetrated at the contact hole 69b, which connects the pixel electrode 17b with the contact electrode 79b. In other words, the pixel electrode 17a and the first lower capacitor electrode 47a are electrically connected with each other, and the pixel electrode 17b and the second upper capacitor electrode 37b are electrically connected with each other. The second upper capacitor electrode 37b overlaps the first lower capacitor electrode 47a via the inorganic gate insulating film 22. As such, the coupling capacitor Cab2 is formed (see FIG. 30). The second upper capacitor electrode 37b overlaps the pixel electrode 17a via the inorganic interlayer insulating film 25. As such, the coupling capacitor Cab21 (see FIG. 30) is formed.

As illustrated in FIGS. 32 and 33, in the color filter substrate 30, a colored layer 14 is provided on a glass substrate 32, a common electrode (com) 28 is provided on the colored layer 14, and an alignment film (not shown) is provided in such a manner as to cover the common electrode 28.

In the liquid crystal panel illustrated in FIG. 31, the pixel electrodes 17a and 17b are connected (capacitance-coupled) with each other via the two coupling capacitors ((Cab1+Cab11) and (Cab2+Cab21)) which are provided in parallel to each other in a plan view. Therefore, in a case where there has occurred a short circuit between, for example, the first upper capacitor electrode 37a and the second lower capacitor electrode 47b or the pixel electrode 17b at P in FIG. 31 (during a production step or the like), it is possible to maintain the capacitive coupling between the pixel electrodes 17a and 17b by carrying out a correction step of cutting with a laser beam the first upper capacitor electrode 37a between (i) the contact hole 68a and (ii) a portion at which the short circuit has occurred. Further, even if the contact hole 68a becomes defective during a production process or the like, it is possible to maintain the capacitive coupling between the pixel electrodes 17a and 17b. In a case where there has occurred a short circuit between the second upper capacitor electrode 37b and the first lower capacitor electrode 47a or the pixel electrode 17a, it is simply necessary to cut with a laser beam the second upper capacitor electrode 37b between (i) the contact hole 69b and (ii) a portion at which the short circuit has occurred.

In a case where the correction step is carried out, for example, the first upper capacitor electrode extension 28a (i.e., a portion between the contact hole 68a and the first upper capacitor electrode 37a) is irradiated with a laser beam from a back surface side of the active matrix substrate (i.e., from a glass substrate side) so as to be cut. If there has occurred a short circuit between the first upper capacitor electrode 37a and the second lower capacitor electrode 47b or the pixel electrode 17b, a portion of the pixel electrode 17a which portion corresponds to the contact hole 68a is removed (trimmed) with a laser beam or the like so that the pixel electrode 17a and the first upper capacitor electrode 37a are electrically separated. This also makes it possible to maintain the capacitive coupling between the pixel electrodes 17a and 17b.

Thus, according to the present embodiment, it is possible to improve a process yield of producing a liquid crystal panel and an active matrix substrate to be provided in the liquid crystal panel. Further, the overlapping portions which form the coupling capacitors are provided partly in parallel in a plan view and partly in parallel in the stacking direction. As such, the liquid crystal panel of the present embodiment has a coupling capacitance value larger than that of the liquid crystal panel of FIG. 2. This makes it possible to, for example, obtain a desired coupling capacitance value even with use of capacitor electrodes small in area, and consequently increase an aperture ratio while maintaining the capacitive coupling.

In the liquid crystal panel of FIG. 31, each of the first and second lower capacitor electrodes 47a and 47b is larger in area than a corresponding one of the first and second upper capacitor electrodes 37a and 37b. The liquid crystal panel is thus advantageous in that even if the above capacitor electrodes are misaligned with respect to one another to an extent, a change is not easily caused to a total amount of the coupling capacitors ((Cab1 Cab11) and (Cab2+Cab21)), that is, a total amount of (i) an area by which the first lower capacitor electrode 47a overlaps the second upper capacitor electrode 37b and (ii) an area by which the second lower capacitor electrode 47b overlaps the first upper capacitor electrode 37a. Note that each of the first and second upper capacitor electrodes 37a and 37b may alternatively be larger in area than a corresponding one of the first and second lower capacitor electrodes 47a and 47b. The above advantage can be achieved even in this case.

Embodiment 4

Figure 34:
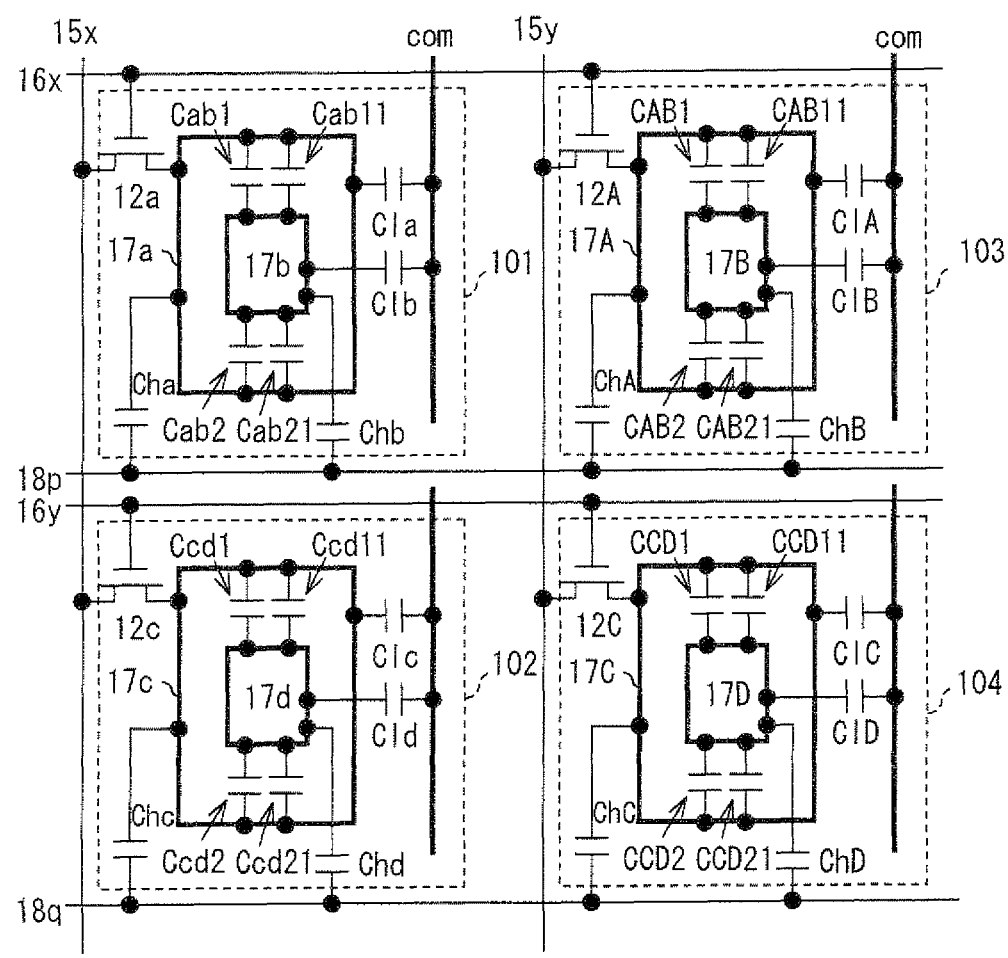
FIG. 34 is a circuit diagram illustrating a configuration of a liquid crystal panel in accordance with Embodiment 4.

FIG. 34 is an equivalent circuit diagram showing a part of a liquid crystal display panel in accordance with Embodiment 4. As illustrated in FIG. 34, the liquid crystal display panel includes: data signal lines (15x and 15y) extending in a column direction (up-down direction in the drawing); scanning signal lines (16*x* and 16*y*) extending in a row direction (right-left direction in the drawing); pixels (101-104) positioned in row and column directions; retention capacitor lines (18*p* and 18*q*); and a common electrode (counter electrode) com. Each pixel has the same structure. A pixel column including the pixels 101 and 102 is adjacent to a pixel column including the pixels 103 and 104. A pixel row including the pixels 101 and 103 is adjacent to a pixel row including the pixels 102 and 104.

In the liquid crystal panel, one data signal line and one scanning signal line are provided for one pixel. Two pixel electrodes are provided in one pixel so that one of the two pixel electrodes encloses the other one. In the liquid crystal panel, a pixel 101 includes pixel electrodes 17*a* and 17*b*, the pixel electrode 17*a* enclosing the pixel electrode 17*b*; a pixel 102 includes pixel electrodes 17*e* and 17*d*, the pixel electrode 17*c* enclosing the pixel electrode 17*d*; a pixel 103 includes pixel electrodes 17A and 17B, the pixel electrode 17A enclosing the pixel electrode 17B; and a pixel 104 includes pixel electrodes 17C and 17D, the pixel electrode 17C enclosing the pixel electrode 17D.

FIG. 35 illustrates a specific example of the pixel 101 illustrated in FIG. 34. As illustrated in FIG. 35, a transistor 12*a* is provided in the vicinity of an intersection of the data signal line 15*x* with the scanning signal line 16*x*. The data signal line 15*x* and the scanning signal line 16*x* define a pixel region, in which (i) the pixel electrode 17*b* which has a V-shape as viewed in a row direction and (ii) the pixel electrode 17*a* which encloses the pixel electrode 17*b* are provided. The retention capacitor line 18*p* extends in the row direction so as to cross a center of the pixel 101. Specifically, the pixel electrode 17*b* includes: a first side which is present above the retention capacitor line 18*p* and which is at an angle of substantially 90° with respect to the row direction; a second side which extends from one end of the first side at an angle of substantially 45° with respect to the row direction; a third side which extends from the other end of the first side at an angle of substantially 315° with respect to the row direction; a fourth side which has one end that is present above the retention capacitor line 18*p* and which is parallel to and shorter than the second side; a fifth side which is connected with one end of the fourth side and which is parallel to and shorter than the third side; a sixth side which connects the second side with the fourth side; and a seventh side which connects the third side with the fifth side. The pixel electrode 17*a* has an inner periphery formed of seven sides which face the respective first through seventh sides.

The pixel 101 has (i) a first gap K1 between the first side of the pixel electrode 17*b* and one side of the inner periphery of the pixel electrode 17*a* which one side faces the first side, (ii) a second gap K2 between the second side of the pixel electrode 17*b* and one side of the inner periphery of the pixel electrode 17*a* which one side faces the second side, (iii) a third gap K3 between the third side of the pixel electrode 17*b* and one side of the inner periphery of the pixel electrode 17*a* which one side faces the third side, (iv) a fourth gap K4 between the fourth side of the pixel electrode 17*b* and one side of the inner periphery of the pixel electrode 17*a* which one side faces the fourth side, and (v) a fifth gap K5 between the fifth side of the pixel electrode 17*b* and one side of the inner periphery of the pixel electrode 17*a* which one side faces the fifth side. The first and second upper capacitor electrodes 37*a* and 37*b* are each provided so as to (i) overlap the pixel electrodes 17*a* and 17*b* and (ii) extend across the third gap K3 at an angle of substantially 225° with respect to the row direction, in which the retention capacitor line 18*p* extends.

The transistor 12*a* has a source electrode 8*a* and a drain electrode 9*a* both formed above the scanning signal line 16*x*. The source electrode 8*a* is connected with the data signal line 15*x*. The drain electrode 9*a* is connected with a drain extracting line 27*a*. The drain extracting line 27*a* is connected with a contact electrode 77*a*, which is in turn connected with the pixel electrode 17*a* via a contact hole 11*a*.

The first upper capacitor electrode 37*a* overlaps (i) the second lower capacitor electrode 47*b* via a gate insulating film and (ii) the pixel electrode 17*b* via an interlayer insulating film. Further, the first upper capacitor electrode 37*a* is connected with a contact electrode 78*a*, which is in turn connected with the pixel electrode 17*a* via a contact hole 68*a*. The second lower capacitor electrode 47*b* is connected with a contact electrode 78*b*, which is in turn connected with the pixel electrode 17*b* via a contact hole 68*b*. With this configuration, (i) the coupling capacitor Cab1 (see FIG. 34) between the pixel electrodes 17*a* and 17*b* is formed at a portion at which the first upper capacitor electrode 37*a* overlaps the second lower capacitor electrode 47*b*, and (ii) the coupling capacitor Cab11 (see FIG. 34) between the pixel electrodes 17*a* and 17*b* is formed at a portion at which the first upper capacitor electrode 37*a* overlaps the pixel electrode 17*b*.

The second upper capacitor electrode 37*b* overlaps (i) the first lower capacitor electrode 47*a* via the gate insulating film and (ii) the pixel electrode 17*a* via the interlayer insulating film. Further, the second upper capacitor electrode 37*b* is connected with a contact electrode 79*b*, which is in turn connected with the pixel electrode 17*b* via a contact hole 69*b*. The first lower capacitor electrode 47*a* is connected with a contact electrode 79*a*, which is in turn connected with the pixel electrode 17*a* via a contact hole 69*a*. With this configuration, (i) the coupling capacitor Cab2 (see FIG. 34) between the pixel electrodes 17*a* and 17*b* is formed at a portion at which the second upper capacitor electrode 37*b* overlaps the first lower capacitor electrode 47*a*, and (ii) the coupling capacitor Cab21 (see FIG. 34) between the pixel electrodes 17*a* and 17*b* is formed at a portion at which the second upper capacitor electrode 37*b* overlaps the pixel electrode 17*a*.

The pixel electrode 17*a* overlaps the retention capacitor line 18*p* via the interlayer insulating film and the gate insulating film. With this configuration, the retention capacitor Cha (see FIG. 34) is formed at a portion at which the pixel electrode 17*a* overlaps the retention capacitor line 18*p*. Further, the pixel electrode 17*b* overlaps the retention capacitor line 18*p* via the interlayer insulating film and the gate insulating film. With this configuration, the retention capacitor Chb (see FIG. 34) is formed at a portion at which the pixel electrode 17*b* overlaps the retention capacitor line 18*p*. Other pixels each have a configuration (specifically, how pixel constituents are shaped, positioned and connected) identical to that of the pixel 101.

According to the above arrangement, the sub-pixel including the pixel electrode 17*a* serves as "bright," and the sub-pixel including the pixel electrode 17*b* serves as "dark."

in the liquid crystal panel illustrated in FIG. 35, the pixel electrodes 17*a* and 17*b* are connected (capacitance-coupled) with each other via coupling capacitors ((Cab1+Cab11) and (Cab2+Cab21)) which are provided partly in parallel in a plan view and partly in parallel in the stacking direction. Thus, as in the arrangement of Embodiment 3, it is possible to (i) improve a process yield of producing a liquid crystal panel and an active matrix substrate to be provided in the liquid crystal panel, and (ii) increase a coupling capacitance value. This makes it possible to, for example, obtain a desired coupling capacitance value even with use of capacitor electrodes small in area, and consequently increase an aperture ratio while maintaining the capacitive coupling.

In the liquid crystal panel illustrated in FIG. 35, the first and second upper capacitor electrodes 37a and 37b are each larger in area than a corresponding one of the first and second lower capacitor electrodes 47a and 47b. Further, the first upper capacitor electrode 37a overlaps the second lower capacitor electrode 47b at a first portion (first overlapping portion), whereas the second upper capacitor electrode 37b overlaps the first lower capacitor electrode 47a at a second portion (second overlapping portion), the first and second portions each being provided so as to cross a gap (third gap K3) between the pixel electrodes 17a and 17b. With this configuration, even if the above capacitor electrodes are misaligned with respect to one another, there is a mutual compensation among (i) the coupling capacitor (Cab1) formed at the portion at which the first upper capacitor electrode 37a overlaps the second lower capacitor electrode 47b, (ii) the coupling capacitor (Cab2) formed at the portion at which the second upper capacitor electrode 37b overlaps the first lower capacitor electrode 47a, and (iii) the coupling capacitors (Cab11 and Cab21) formed respectively at the portion at which the first upper capacitor electrode 37a overlaps the pixel electrode 17b and at the portion at which the second upper capacitor electrode 37b overlaps the pixel electrode 17a. The liquid crystal panel is thus advantageous in that a total amount of the coupling capacitors (Cab1+Cab11+Cab2+Cab21) is not easily changed.

The following description deals with a specific example of the mutual compensation with reference to FIG. 47. FIG. 47 illustrates a state in which a gate layer is misaligned with a source-drain layer in a direction (indicated by an arrow in FIG. 47) having an angle of substantially 225' with respect to the row direction, in which the retention capacitor line 18p extends. In comparison with the state of FIG. 35, in which no misalignment has occurred, the coupling capacitor Cab1 becomes Cab1–α a because the portion at which the first upper capacitor electrode 37a overlaps the second lower capacitor electrode 47b decreases in area to a degree, whereas the coupling capacitor Cab2 becomes Cab2+α because the portion at which the second upper capacitor electrode 37b overlaps the first lower capacitor electrode 47a increases in area to the same degree. Further, the coupling capacitor Cab11 becomes Cab11–β because the portion at which the first upper capacitor electrode 37a overlaps the pixel electrode 17b decreases in area to a degree, whereas the coupling capacitor Cab2 becomes Cab2+β because the portion at which the second upper capacitor electrode 37b overlaps the pixel electrode 17a increases in area to the same degree. As described above, even if misalignment has occurred, the four coupling capacitors mutually compensate for a change in capacitance value. As such, it is possible to prevent a change in capacitance value (total amount) of the coupling capacitors as a whole. Note that each of the first and second lower capacitor electrodes 47a and 47b may alternatively be larger in area than a corresponding one of the first and second upper capacitor electrodes 37a and 37b. The above advantage can be achieved even in this case.

Further, in the liquid crystal panel illustrated in FIG. 35, the pixel electrode 17a encloses the pixel electrode 17b which is electrically floating. Accordingly, the pixel electrode 17a can serve as a shield electrode so as to prevent, for example, electric charge from coming into the pixel electrode 17b. This allows preventing image sticking of the sub-pixel (dark sub-pixel) including the pixel electrode 17b.

Figure 36:
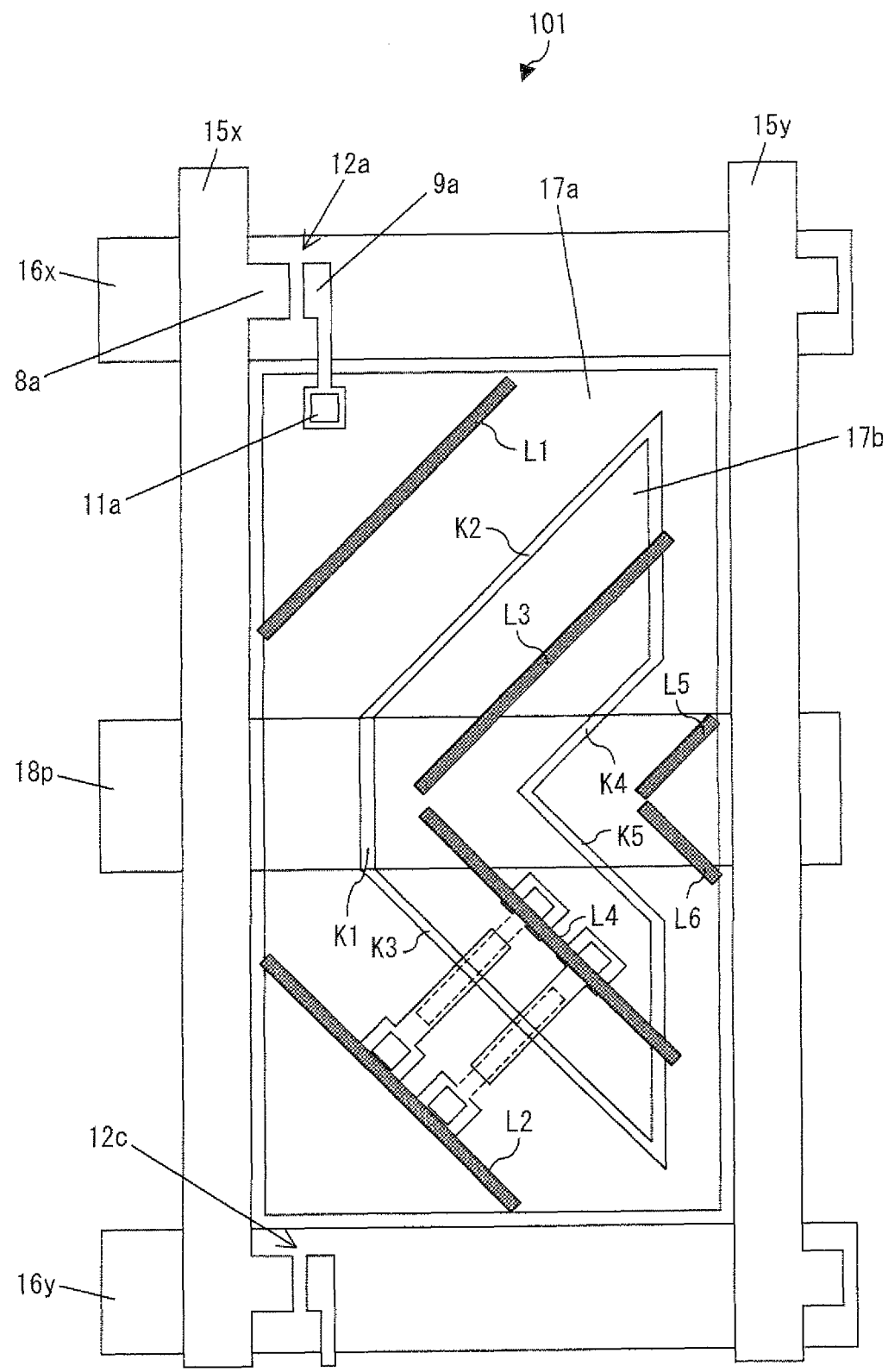
FIG. 36 is a plan view illustrating another specific example of the liquid crystal panel of FIG. 34.

FIG. 35 omits to illustrate an alignment-controlling structure. However, as illustrated in FIG. 36 for example, in the case of, e.g., an MVA (Multi-domain Vertical Alignment) liquid crystal panel, the gaps K2 through K5 between the pixel electrodes 17a and 17b serve as alignment-controlling structures; a rib L3 which is parallel to the gaps K2 and K4 and a rib L4 which is parallel to the gaps K3 and K5 are provided in an area of the color filter substrate which area positionally corresponds to the pixel electrode 17b; and (i) ribs L1 and L5 which are parallel to the gaps K2 and K4 and (ii) ribs L2 and L6 which are parallel to the gaps K3 and K5 are provided in an area of the color filter substrate which area positionally corresponds to the pixel electrode 17a. Instead of such alignment-controlling ribs, alignment-controlling slits can be provided in the common electrode of the color filter substrate.

In FIG. 34, one of two pixel electrodes provided in one pixel encloses the other one of the two pixel electrodes, and is connected with a corresponding transistor. The present invention is, however, not limited to this. Alternatively, as illustrated in FIG. 37, the other one of the two pixel electrodes can be connected with the corresponding transistor.

Figure 37:
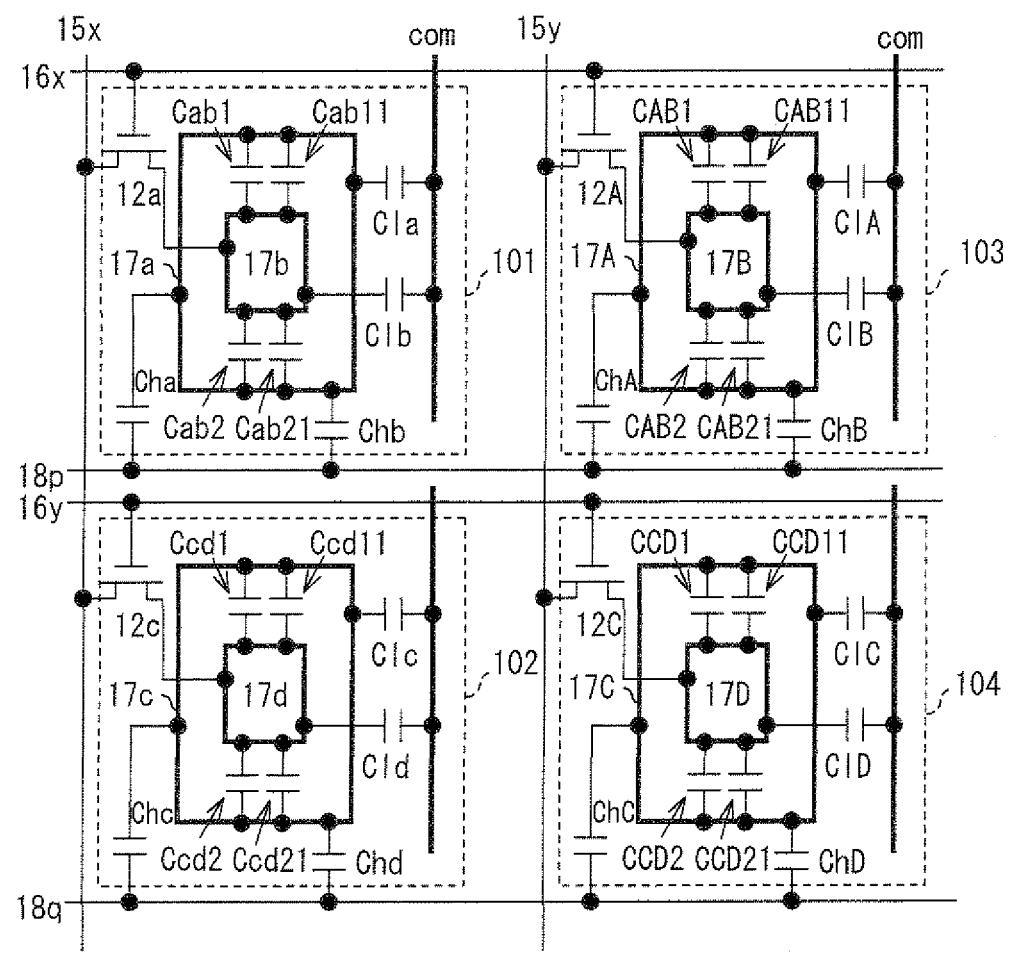
FIG. 37 is a circuit diagram illustrating another configuration of the liquid crystal panel in accordance with Embodiment 4.
Figure 38:
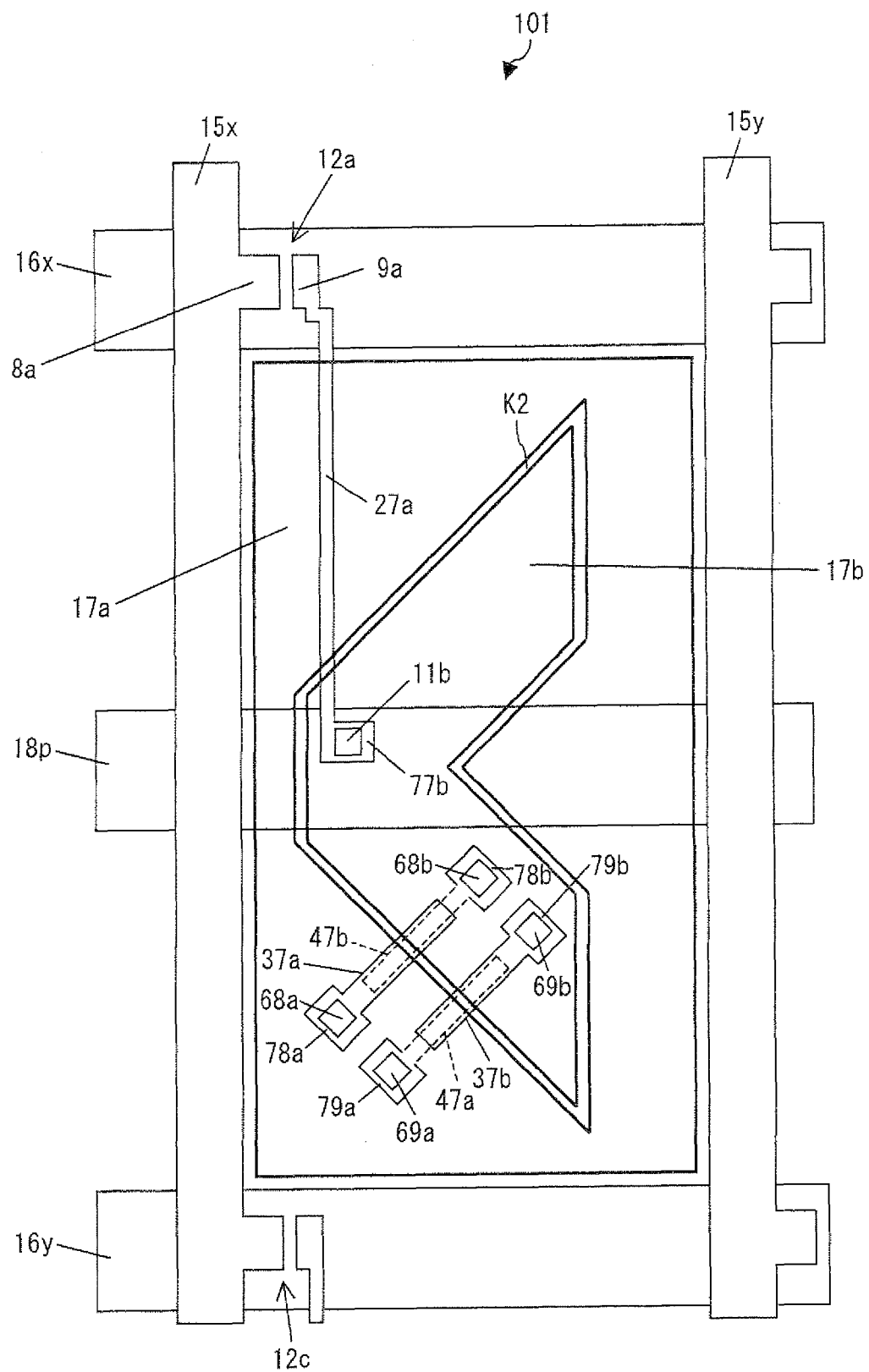
FIG. 38 is a plan view illustrating a specific example of the liquid crystal panel of FIG. 37.

FIG. 38 illustrates a specific example of the pixel 101 illustrated in FIG. 37. As illustrated in FIG. 38, the pixel electrodes 17a and 17b and the retention capacitor line 18p are shaped and positioned as in FIG. 35. The first and second upper capacitor electrodes 37a and 37b are each provided so as to (i) overlap the pixel electrodes 17a and 17b and (ii) extend across the third gap K3 at an angle of substantially 315° with respect to the row direction.

The transistor 12a has a source electrode 8a and a drain electrode 9a both formed above the scanning signal line 16x. The source electrode 8a is connected with the data signal line 15x. The drain electrode 9a is connected with a drain extracting line 27a. The drain extracting line 27a is connected with a contact electrode 77b, which is in turn connected with the pixel electrode 17b via a contact hole 11b.

The second upper capacitor electrode 37b overlaps (i) the first lower capacitor electrode 47a via a gate insulating film and (ii) the pixel electrode 17a via an interlayer insulating film. The second upper capacitor electrode 37b is connected with a contact electrode 79b, which is in turn connected with the pixel electrode 17b via, a contact hole 69b. The first lower capacitor electrode 47a is connected with a contact electrode 79a, which is in turn connected with the pixel electrode 17a via a contact hole 69a. With this configuration, (i) the coupling capacitor Cab1 (see FIG. 37) between the pixel electrodes 17a and 17b is formed at a portion at which the second upper capacitor electrode 37b overlaps the first lower capacitor electrode 47a, and (ii) the coupling capacitor Cab11 (see FIG. 37) between the pixel electrodes 17a and 17b is formed at a portion at which the second upper capacitor electrode 37b overlaps the pixel electrode 17a.

The first upper capacitor electrode 37a overlaps (i) the second lower capacitor electrode 47b via the gate insulating film and (ii) the pixel electrode 17b via the interlayer insulating film. The first upper capacitor electrode 37a is connected with a contact electrode 78a, which is in turn connected with the pixel electrode 17a via a contact hole 68a. The second lower capacitor electrode 47b is connected with a contact electrode 78b, which is in turn connected with the pixel electrode 17b via a contact hole 68b. With this configuration, (i) the coupling capacitor Cab2 (see FIG. 37) between the pixel electrodes 17a and 17b is formed at a portion at which the first upper capacitor electrode 37a overlaps the second lower capacitor electrode 47b, and the coupling capacitor Cab21 (see FIG. 37) between the pixel electrodes 17a and 17b is formed at a portion at which the first upper capacitor electrode 37a overlaps the pixel electrode 17b.

The pixel electrode 17a overlaps the retention capacitor line 18p via the interlayer insulating film and the gate insulating film. With this configuration, the retention capacitor Cha (see FIG. 37) is formed at a portion at which the pixel electrode 17a overlaps the retention capacitor line 18p. Further, the pixel electrode 17b overlaps the retention capacitor line 18p via the interlayer insulating film and the gate insulating film. With this configuration, the retention capacitor Chb (see FIG. 37) is formed at a portion at which the pixel electrode 17b overlaps the retention capacitor line 18p. Other pixels each have a configuration (specifically, how pixel constituents are shaped, positioned and connected) identical to that of the pixel 101.

According to the above arrangement, the sub-pixel including the pixel electrode 17a serves as "dark," and the sub-pixel including the pixel electrode 17b serves as "bright."

According to the liquid crystal panel of FIG. 38, it is possible to (i) improve a process yield of producing a liquid crystal panel and an active matrix substrate to be provided in the liquid crystal panel, and (ii) increase a coupling capacitance value. This makes it possible to, for example, obtain a desired coupling capacitance value even with use of capacitor electrodes small in area, and consequently increase an aperture ratio while maintaining the capacitive coupling. In addition, since the liquid crystal panel of FIG. 38 is arranged so that the pixel electrode 17a corresponding to a dark sub-pixel encloses the pixel electrode 17b corresponding to a bright sub-pixel, it is possible to clearly display a video image having a high spatial frequency.

Embodiment 5

Figure 39:
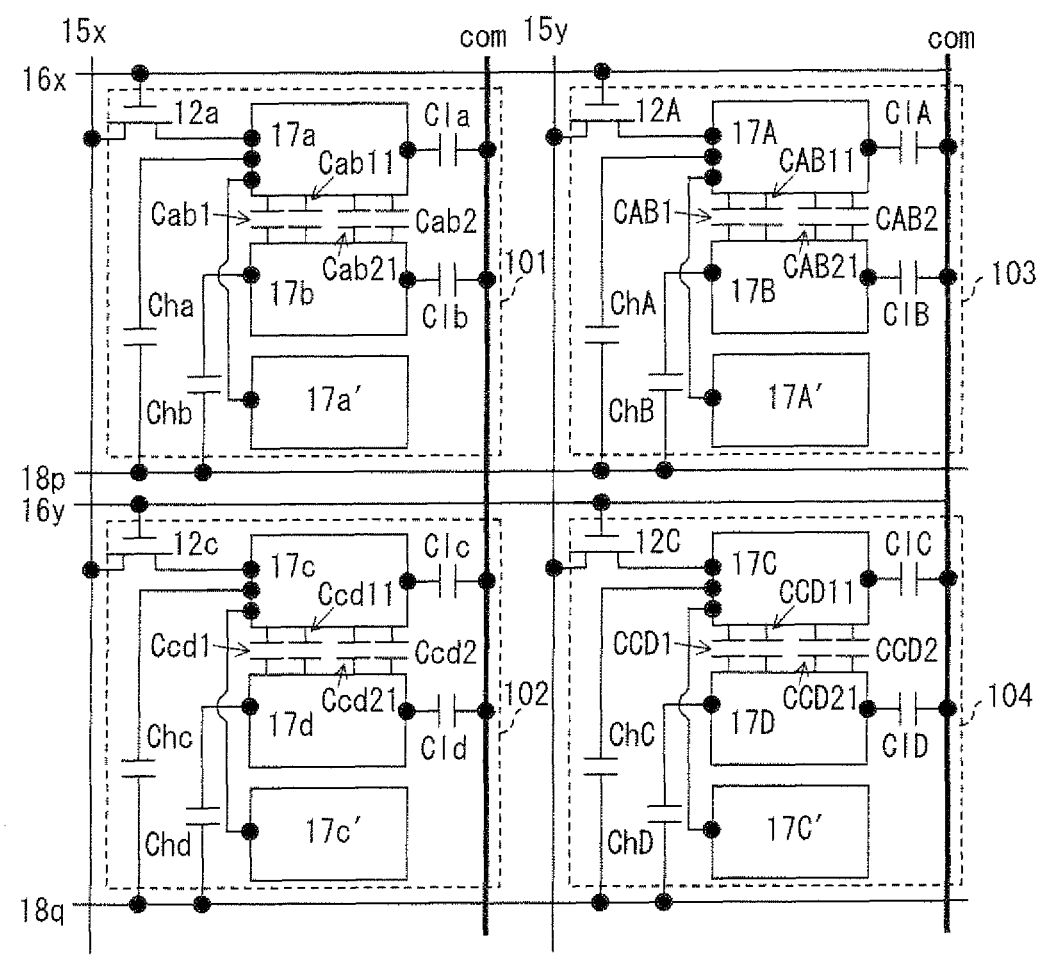
FIG. 39 is a circuit diagram illustrating a configuration of a liquid crystal panel in accordance with, Embodiment 5.

FIG. 39 is an equivalent circuit diagram showing a part of a liquid crystal display panel in accordance with Embodiment 5. As illustrated in FIG. 39, the liquid crystal display panel includes: data signal lines (15x and 15y) extending in a column direction (up-down direction in the drawing); scanning signal lines (16x and 16y) extending in a row direction (right-left direction in the drawing); pixels (101-104) positioned in row and column directions; retention capacitor lines (18p and 18q); and a common electrode (counter electrode) com. Each pixel has the same structure. A pixel column including the pixels 101 and 102 is adjacent to a pixel column including the pixels 103 and 104. A pixel row including the pixels 101 and 103 is adjacent to a pixel row including the pixels 102 and 104.

In the liquid crystal panel, one data signal line and one scanning signal line are provided for one pixel. Each pixel includes three pixel electrodes: The pixel 101 includes pixel electrodes 17a, 17b, and 17a'; the pixel 102 includes pixel electrodes 17c, 17d, and 17c'; the pixel 103 includes pixel electrodes 17A, 17B, and 17A'; and the pixel 104 includes pixel electrodes 17C, 17D, and 17C'.

Figure 40:
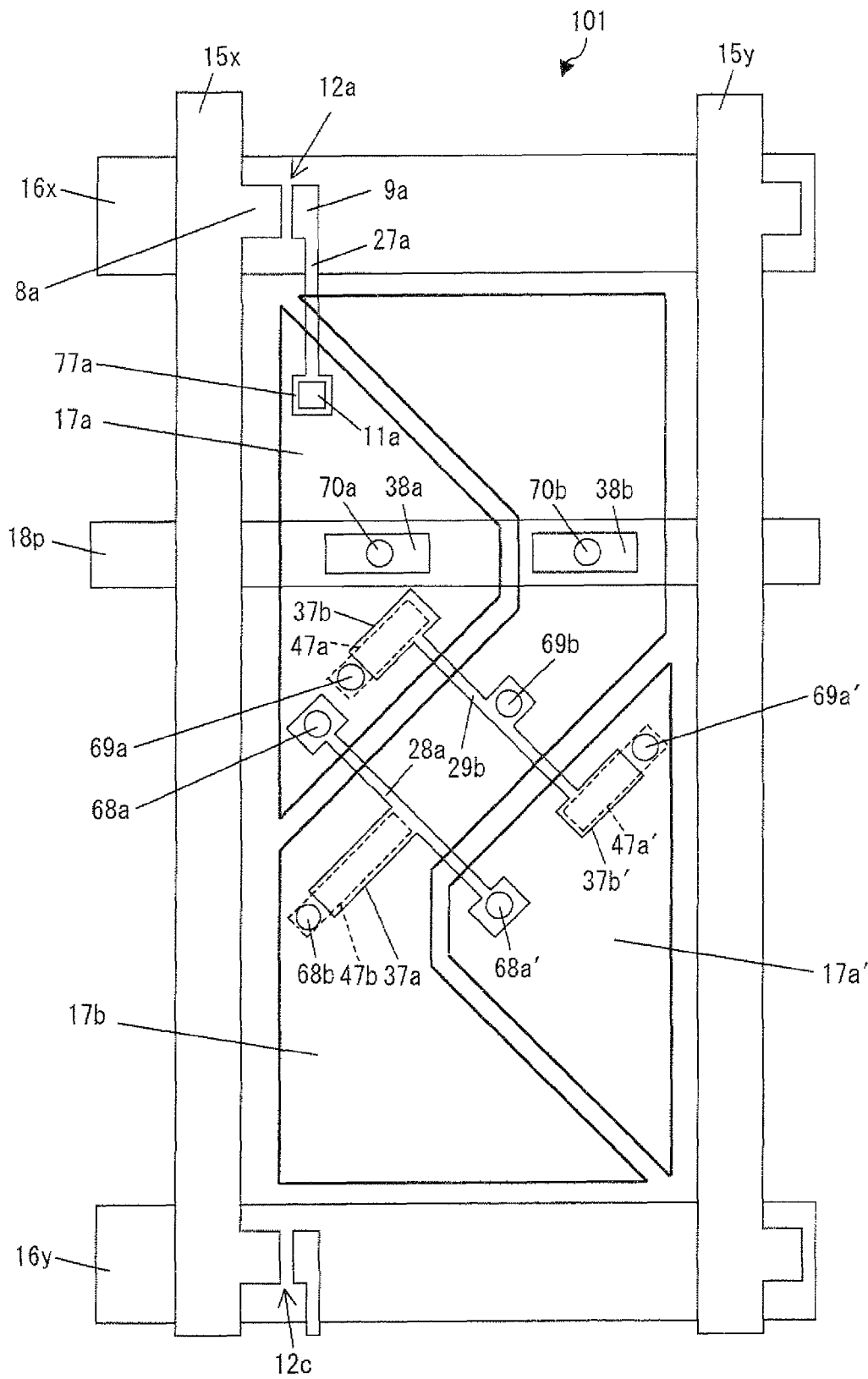
FIG. 40 is a plan view illustrating a specific example of the liquid crystal panel of FIG. 39.

A specific example of the pixel 101 of FIG. 39 is illustrated in FIG. 40. As illustrated in FIG. 40, a transistor 12a is provided in the vicinity of an intersection of the data signal line 15x with the scanning signal line 16x. The data signal line 15x and the scanning signal line 16x define a pixel region, in which there are provided (i) the pixel electrode 17a which has a trapezoidal shape, (ii) the pixel electrode 17a' which has a trapezoidal shape and which is provided so as to face the pixel electrode 17a at an angle of substantially 315° with respect to the row direction, in which the retention capacitor line 18p extends, and (iii) the pixel electrode 17b which is provided in a region between the pixel electrodes 17a and 17a' so as to fit in therebetween. The retention capacitor line 18p extends in the row direction across the pixel electrodes 17a and 17b.

With this configuration, the pixel electrode 17a has a portion which is close to the scanning signal line 16x; the pixel electrode 17a' has a portion which is close to the scanning signal line 16y; and the pixel electrode 17b has one end which is close to the scanning signal line 16x and the other end which is close to the scanning signal line 16y. In other words, the pixel electrodes 17a and 17a' are at least in part close to the scanning signal lines 16x and 16y, respectively; and the pixel electrode 17b extends in the column direction so as to connect the scanning signal lines 16x and 16y with each other.

The transistor 12a has a source electrode 8a and a drain electrode 9a both formed above the scanning signal line 16x. The source electrode 8a is connected with the data signal line 15x. The drain electrode 9a is connected with a drain extracting line 27a. The drain extracting line 27a is connected with a contact electrode 77a, which is in turn connected with the pixel electrode 17a via a contact hole 11a.

The pixel 101 includes a first upper capacitor electrode 37a which overlaps (i) the second lower capacitor electrode 47b via a gate insulating film and (ii) the pixel electrode 17b via an interlayer insulating film. The first upper capacitor electrode 37a is connected with a first upper capacitor electrode extension 28a, which is in turn connected with the pixel electrode 17a via a contact hole 68a. The pixel 101 includes a second lower capacitor electrode 47b which is connected with the pixel electrode 17b via a contact hole 68b. With this configuration, (i) a coupling capacitor Cab1 (see FIG. 39) between the pixel electrodes 17a and 17b is formed at a portion at which the first upper capacitor electrode 37a overlaps the second lower capacitor electrode 47b, and (ii) a coupling capacitor Cab11 (see FIG. 39) between the pixel electrodes 17a and 17b is formed at a portion at which the first upper capacitor electrode 37a overlaps the pixel electrode 17b.

The pixel 101 includes a second upper capacitor electrode 37b which overlaps (i) a first lower capacitor electrode 47a via the gate insulating film and (ii) the pixel electrode 17a via the interlayer insulating film. The second upper capacitor electrode 37b is connected with a second upper capacitor electrode extension 29b, which is in turn connected with the pixel electrode 17b via a contact hole 69b. The first lower capacitor electrode 47a is connected with the pixel electrode 17a via a contact hole 69a. With this configuration, (i) a coupling capacitor Cab2 (see FIG. 39) between the pixel electrodes 17a and 17b is formed at a portion at which the second upper capacitor electrode 37b overlaps the first lower capacitor electrode 47a, and (ii) a coupling capacitor Cab21 (see FIG. 39) between the pixel electrodes 17a and 17b is formed at a portion at which the second upper capacitor electrode 37b overlaps the pixel electrode 17a.

The pixel 101 includes a retention capacitor electrode 38a formed in a layer in which the first and second upper capacitor electrodes 37a and 37b are formed. The retention capacitor electrode 38a is connected with the pixel electrode 17a via a contact hole 70a. As such, a retention capacitor Cha (see FIG. 39) is formed. The pixel 101 further includes a retention capacitor electrode 38b in the layer in which the first and second upper capacitor electrodes 37a and 37b are formed. The retention capacitor electrode 38b is connected with the pixel electrode 17b via a contact hole 70b. As such, a retention capacitor Chb (see FIG. 39) is formed. Other pixels each have a configuration (specifically, how pixel constituents are shaped, positioned and connected) identical to that of the pixel 101.

According to the above arrangement, the respective sub-pixels including the pixel electrodes 17a and 17a' each serve as "bright," and the sub-pixel including the pixel electrode 17b serves as "dark."

The pixels can alternatively be configured so that a coupling capacitor is formed also between the pixel electrodes 17a' and 17b as illustrated in FIG. 40. Specifically, the pixel 101 can include a third upper capacitor electrode 37b' and a third lower capacitor electrode 47a' which overlap each other via the gate insulating film. The third upper capacitor electrode 37b' overlaps the pixel electrode 17a' via the interlayer insulating film, and is connected with a second upper capacitor electrode extension 29b, which is in turn connected with the pixel electrode 17b via a contact hole 69b. The third lower capacitor electrode 47a' is connected with the pixel electrode 17a' via a contact hole 69a'. With this configuration, (i) a coupling capacitor between the pixel electrodes 17a' and 17b is formed at a portion at which the third upper capacitor electrode 37b' overlaps the third lower capacitor electrode 47a', and (ii) another coupling capacitor between the pixel electrodes 17a' and 17b is formed at a portion at which the third upper capacitor electrode 37b' overlaps the pixel electrode 17a'.

According to the above arrangement, it is possible to (i) improve a process yield of producing a liquid crystal panel and an active matrix substrate to be provided in the liquid crystal panel, and (ii) increase a coupling capacitance value.

In the liquid crystal panel of FIG. 40, each of the first and second upper capacitor electrodes 37a and 37b is larger in area than a corresponding one of the first and second lower capacitor electrodes 47a and 47b. The liquid crystal panel is thus advantageous in that even if the above capacitor electrodes are misaligned with respect to one another to an extent, a change is not easily caused to a total amount of the coupling capacitors ((Cab1+Cab11) and (Cab2+Cab21)), that is, a total amount of (i) an area by which the first upper capacitor electrode 37a overlaps the second lower capacitor electrode 47b and (ii) an area by which the second upper capacitor electrode 37b overlaps the first lower capacitor electrode 47a. Note that each of the first and second lower capacitor electrodes 47a and 47b may alternatively be larger in area than a corresponding one of the first and second upper capacitor electrodes 37a and 37b. The above advantage can be achieved even in this case.

FIG. 41 illustrates a configuration of an MVA type of the liquid crystal panel illustrated in FIG. 2 for Embodiment 1. As illustrated in FIG. 41, (i) the pixel electrode 17a has alignment controlling slits S1-S4, (ii) the color filter substrate has alignment controlling ribs L1 and L2 at a portion corresponding to the pixel electrode 17a, the pixel electrode 17b has alignment controlling slits S5-S8, and (iv) the color filter substrate has alignment controlling ribs L3 and L4 at a portion corresponding to the pixel electrode 17b. Instead of the alignment controlling ribs as above, a common electrode of the color filter substrate may be provided with alignment controlling slits.

Figure 42:
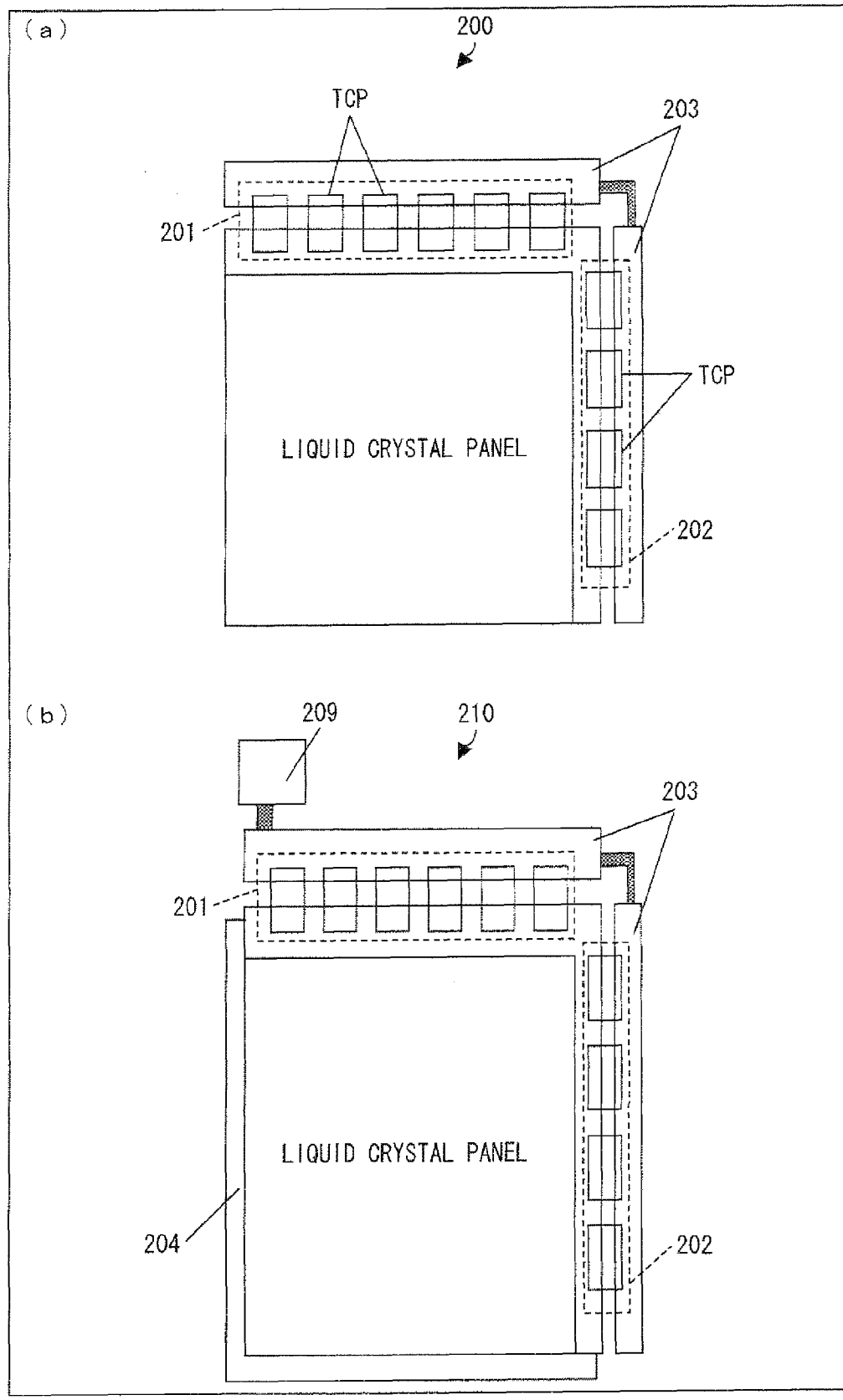
FIG. 42

Finally, the following description deals with an example of how a liquid crystal display unit and the liquid crystal display device of the present invention are constructed. In the above embodiments, the liquid crystal display unit and the liquid crystal display device of the present invention are configured as follows. That is, to either side of the liquid crystal panel of the present invention, two polarization plates A and B are combined so that polarization axes of the polarization plates A and B intersect at right angles to each other. Furthermore, an optical compensation sheet or the like may be laminated on each of the polarization plates if necessary. Next, as shown in (a) of FIG. 42, drivers (a gate driver 202 and a source driver 201) are connected. The following description explains a connection by a TCP (Tape Career Package) method as one example. First, an ACF (Anisotoropic Conductive Film) is temporarily pressed on a terminal section of the liquid crystal panel. Next, TCPs in which the drivers are loaded are punched out from a carrier tape. The TCPs are aligned with panel terminal electrodes, and are heated and finally pressed. Thereafter, (i) a circuit substrate 209 (PWB: Printed Wiring Board) for connecting the driver TCPs together and (ii) an input terminal of the TCPs are connected together with the ACF. With this, a liquid crystal display unit 200 is provided. Thereafter, as shown in (b) of FIG. 42, a display control circuit 209 is connected to the drivers (201 and 202) of the liquid crystal display unit via a circuit board 203. By integrating the liquid crystal display unit 200 and the display control circuit 209 with an illumination device (backlight unit) 204, a liquid crystal display device 210 is provided.

In this specification, a polarity of an electric potential refers to an electric potential not lower than a reference electric potential (i.e., positive electric potential) or an electric potential lower than the reference electric potential (negative electric potential). The reference electric potential can be Vcom (common electric potential) which is an electric potential of the common electrode (counter electrode) or any other electric potential.

FIG. 43 is a block diagram showing a configuration of a liquid crystal display device of the present invention. As illustrated in FIG. 43, the liquid crystal display device of the present invention includes a display section (liquid crystal panel), a source driver (SD), a gate driver (GD), and a display control circuit. The source driver drives gate signal lines, the gate driver drives scanning signal lines, and the display control circuit controls the source driver and the gate driver.

The display control circuit receives, from an outside signal source (e.g., a tuner), a digital video signal Dv indicative of an image to be displayed; a horizontal sync signal HSY and a vertical sync signal VSY each corresponding to the digital video signal Dv; and a control signal Dc for controlling display operation. Further, the control circuit generates, from the signals Dv, HSY, VSY, and Dc thus received, a data start pulse signal SSP, a data clock signal SCK, a charge share signal sh, a digital image signal DA indicative of an image to be displayed (signal corresponding to the video signal Dv), a gate start pulse signal GSP, a gate clock signal GCK, and, a gate driver output control signal (scanning signal output control signal) GOE, each serving as a signal for enabling the display section to display an image indicated by the digital video signal Dv. The display control circuit thus outputs these signals.

To be more specific, the video signal Dv is subjected to timing adjustment etc. in an internal memory if necessary and then outputted as the digital image signal DA from the display control circuit. The data clock signal SCK is generated as a signal consisting of pulses corresponding to pixels of the image indicated by the digital image signal DA. The data start pulse signal SSP is generated, based on the horizontal sync signal HSY, as a signal which has a high (H) level only during a predetermined period with respect to each horizontal scanning period. The gate start pulse signal GSP is generated, based on the vertical sync signal VSY, as a signal which has a H level only during a predetermined period with respect to each frame period (each vertical scanning period). The gate clock signal GCK is generated based on the horizontal sync signal HSY. The gate driver output control signal GOE and the charge share signal sh are generated based on the horizontal sync signal HSY and the control signal Dc.

Among the signals thus generated by the display control circuit, the digital image signal DA, the charge share signal sh, the signal POL for controlling a polarity of a signal potential (data signal potential), the data start pulse signal SSP, and the data clock signal SCK are input to the source driver, and the gate start pulse signal GSP, the gate clock signal GCK, and the gate driver output control signal GOE are input to the gate driver.

Based on the digital image signal DA, the data clock signal SCK, the charge share signal sh, the data start pulse signal SSP, and the polarity inversion signal POL, the source driver sequentially generates analog voltages (signal voltages) corresponding to pixel values in each scanning signal line of the image represented by the digital image signal DA, and 15x and 15X), respectively.

Based on the gate start pulse signal GSP, the gate clock signal GCK, and the gate driver output control signal GCSE, the gate driver generates gate-on pulses and outputs the gate-on pulses to the scanning signal lines, respectively, so as to selectively drive the scanning signal lines.

As described above, the source driver and, the gate driver respectively drive the data signal lines and, the scanning signal lines of the display section (liquid crystal panel), so that a signal potential is written into a pixel electrode from a data signal line via a transistor (TFT) connected with the selected scanning signal line. Thus, in individual sub-pixels, a voltage is applied to the liquid crystal layer, and application of the voltage controls transmittance of light from the backlight, enabling the sub-pixels to display the image indicated by the digital video signal Dv.

Next, the following explains one example of configuration of applying the liquid crystal display device according to the present invention to a television receiver. FIG. 44 is a block diagram showing a configuration of a display device 800 for a television receiver. The display device 800 includes a liquid crystal display unit 84, a Y/C separation circuit 80, a video chroma circuit 81, an A/D converter 82, a liquid crystal controller 83, a backlight drive circuit 85, a backlight 86, a microcomputer 87, and a gradation circuit 88. The liquid crystal display unit 84 includes: a liquid crystal panel; and a source driver and a gate driver each for driving the liquid crystal panel.

In the display device 800 of the aforementioned configuration, a complex color video signal Scv as a television signal is inputted from the outside to the Y/C separation circuit 80. In the Y/C separation circuit 80, the complex color video signal Scv is separated into a luminance signal and a color signal. The luminance signal and the color signal are converted to analog RGB signals corresponding to three primary colors of light in the video chroma circuit 81. Further, the analog ROB signals are converted to digital RGB signals by the A/D converter 82. The digital RGB signals are supplied to the liquid crystal controller 83. Moreover, in the Y/C separation circuit 80, horizontal and vertical sync signals are extracted from the complex color video signal Scv inputted from the outside. These sync signals are also supplied to the liquid crystal controller 83 via the microcomputer 87.

The liquid crystal display unit 84 receives, from the liquid crystal controller 83, the digital ROB signals as well as timing signals based on the sync signals with predetermined timing. Further, the gradation circuit 88 generates gradation potentials corresponding to three primary colors R, G, and B for color display, and supplies the gradation potentials to the liquid crystal display unit 84. In the liquid crystal display unit 84, drive signals (data signals=signal potentials, scanning signals etc.) are generated by the source driver, the gate driver etc. in accordance with the RGB signals, the timing signals, and the gradation potentials, and a color image is displayed by the liquid crystal panel in the liquid crystal display unit 84. In order to enable the liquid crystal display unit 84 to display an image, it is necessary to emit light from the backside of the liquid crystal panel in the liquid crystal display unit. In the liquid crystal display 800, under control of the microcomputer 87, the backlight drive circuit 85 drives the backlight 86 so as to emit light to the backside of the liquid crystal panel. Control of the whole system, including the aforementioned processes, is carried out by the microcomputer 87. As the video signal (complex color video signal) inputted from the outside, not only a video signal in accordance with television broadcasting but also a video signal picked up by a camera or supplied via the Internet line is also usable. In the liquid crystal display 800, image display in accordance with various video signals can be performed.

In displaying an image by the liquid crystal display device 800 in accordance with television broadcasting, a tuner section 90 is connected to the liquid crystal display device 800 as illustrated in FIG. 45 so that a television receiver 601 of the present invention is provided. The tuner section 90 extracts a channel signal to be received from waves (high-frequency signals) received by an antenna (not shown), and converts the channel signal to an intermediate frequency signal. The tuner section 90 detects the intermediate frequency signal, thereby extracting the complex color video signal Scv as the television signal. The complex color video signal Scv is supplied to the display device 800 as described above and an image is displayed by the display device 800 in accordance with the complex color video signal Scv.

FIG. 46 is an exploded perspective view showing one example of a configuration of the television receiver of the present invention. As illustrated in FIG. 46, the present television receiver 601 includes, as constituents thereof, a first housing 801 and a second housing 806 in addition to the display device 800. The liquid crystal display device 800 is arranged such that the first and second housings 801 and 806 hold the display device 800 so as to wrap therein the display device 800. The first housing 801 has an opening 801a for transmitting an image displayed on the liquid crystal display device 800. On the other hand, the second housing 806 covers a backside of the liquid crystal display device 800. The second housing 806 is provided with an operating circuit 805 for operating the display device 800. The second housing 806 is further provided with a supporting member 808 therebelow.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The active matrix substrate of the present invention and the liquid crystal panel including the active matrix substrate are preferably applicable to a liquid crystal television for example.

REFERENCE SIGNS LIST

101-104 pixel
12a, 12c, 12A, 12C transistor
15x, 15y data signal line
16x, 16y scanning signal line
17a, 17b, 17c, 17d pixel electrode
17A, 17B, 17C, 17D pixel electrode
17a', 17A', 17c', 17C' pixel electrode
18p, 18q retention capacitor line
22 inorganic gate insulating film (first insulating film)

25 inorganic interlayer insulating film (second insulating film)
26 organic interlayer insulating film
37*a* first upper capacitor electrode (first electric conductor)
37*b* second upper capacitor electrode (second electric conductor)
37*b*' third upper capacitor electrode (third electric conductor)
47*a* first lower capacitor electrode (first capacitor electrode)
47*b* second lower capacitor electrode (second capacitor electrode)
47*a*' third lower capacitor electrode (third capacitor electrode)
84 liquid crystal display unit
601 television receiver
800 liquid crystal display device

The invention claimed is:

1. An active matrix substrate comprising:
a scanning signal line;
a data signal line;
a transistor connected with the scanning signal line and the data signal line;
a first pixel electrode; and
a second pixel electrode,
the first and second pixel electrodes being provided in a single pixel region,
the active matrix substrate further comprising:
a first electric conductor electrically connected with the first pixel electrode;
a second electric conductor electrically connected with the second pixel electrode;
a first capacitor electrode that is provided in a first layer in which the scanning signal line is provided and that is electrically connected with the first pixel electrode; and
a second capacitor electrode that is provided in the first layer and that is electrically connected with the second pixel electrode,
the first pixel electrode being connected with the data signal line via the transistor,
a first capacitor being formed between the first electric conductor and the second capacitor electrode,
a second capacitor being formed between the second electric conductor and the first capacitor electrode, and
wherein a fourth capacitor is formed between the first electric conductor and the second pixel electrode, and a third capacitor is formed between the second electric conductor and the first pixel electrode.

2. The active matrix substrate according to claim 1, wherein:
the second electric conductor is provided in a layer between the first capacitor electrode and the first pixel electrode;
the second capacitor is formed by the first capacitor electrode and the second electric conductor overlapping each other via a first insulating film;
the second electric conductor and the first pixel electrode overlap each other via a second insulating film so that a third capacitor is formed between the second electric conductor and the first pixel electrode;
the first electric conductor is provided in a layer between the second capacitor electrode and the second pixel electrode;
the first capacitor is formed by the second capacitor electrode and the first electric conductor overlapping each other via the first insulating film; and
the first electric conductor and the second pixel electrode overlap each other via the second insulating film so that a fourth capacitor is formed between the first electric conductor and the second pixel electrode.

3. The active matrix substrate according to claim 2, wherein:
the first electric conductor and the second capacitor electrode overlap each other at a first overlapping portion;
the second electric conductor and the first capacitor electrode overlap each other at a second overlapping portion; and
the first and second overlapping portions each cross a gap between the first and second pixel electrodes.

4. The active matrix substrate according to claim 2, wherein: the first insulating film comprises a gate insulating film.

5. The active matrix substrate according to claim 2, wherein: the second insulating film comprises an interlayer insulating film covering a channel of the transistor.

6. The active matrix substrate according to claim 1, further comprising:
a third pixel electrode in the pixel region,
the third pixel electrode being electrically connected with the first pixel electrode.

7. The active matrix substrate according to claim 6, further comprising:
a third electric conductor electrically connected with the second pixel electrode; and
a third capacitor electrode that is provided in the first layer and that is electrically connected with the third pixel electrode,
a fifth capacitor being formed between the third electric conductor and the third capacitor electrode.

8. The active matrix substrate according to claim 7, wherein a sixth capacitor is formed between the third electric conductor and the third pixel electrode.

9. The active matrix substrate according to claim 1, wherein:
the first and second electric conductors are provided in a layer in which a conductive electrode of the transistor is provided.

10. The active matrix substrate according to claim 1, wherein:
a conductive electrode of the transistor is connected with (i) the first pixel electrode via a contact hole and with (ii) the first electric conductor via an extracting line extracted from the conductive electrode.

11. The active matrix substrate according to claim 1, wherein: a conductive electrode of the transistor is connected with the first pixel electrode via a contact hole; and the first pixel electrode is connected with the first electric conductor via a contact hole.

12. The active matrix substrate according to claim 1, wherein: a first one of the first and second pixel electrodes encloses a second one of the first and second pixel electrodes.

13. The active matrix substrate according to claim 1, wherein: the first and second pixel electrodes are arranged in a column direction with respect to a row direction in which the scanning signal line extends.

14. The active matrix substrate according to claim 13, wherein: the first pixel electrode provided in a first one of two pixel regions adjacent to each other in the row direction is adjacent in the row direction to the second pixel electrode provided in a second one of the two pixel regions.

15. The active matrix substrate according to claim 13, wherein: the first pixel electrode provided in a first one of two pixel regions adjacent to each other in the column direction is adjacent in the column direction to the second pixel electrode provided in a second one of the two pixel regions.

16. The active matrix substrate according to claim 1, further comprising: a retention capacitor line for (i) forming a seventh capacitor together with either the first pixel electrode or an electric conductor electrically connected with the first pixel electrode and (ii) forming an eighth capacitor together with either the second pixel electrode or an electric conductor electrically connected with the second pixel electrode.

17. The active matrix substrate according to claim 16, wherein:
the retention capacitor line includes a retention capacitor line extension which branches off from the retention capacitor line; and
the retention capacitor line extension extends, in a plan view, along the data signal line and the scanning signal line so as to surround the pixel region and overlap the first and second pixel electrodes.

18. The active matrix substrate according to claim 1, wherein:
a gap between the first and second pixel electrodes serves as an alignment-controlling structure.

19. The active matrix substrate according to claim 1, wherein:
the first electric conductor is larger in area than the second capacitor electrode, and the second electric conductor is larger in area than the first capacitor electrode; or
the first electric conductor is smaller in area than the second capacitor electrode, and the second electric conductor is smaller in area than the first capacitor electrode.

20. A liquid crystal panel comprising the active matrix substrate recited in claim 1.

21. A liquid crystal display unit comprising:
the liquid crystal panel recited in claim 20; and
a driver.

22. A liquid crystal display device comprising:
the liquid crystal display unit recited in claim 21; and
a light source device.

23. A television receiver comprising:
the liquid crystal display device recited in claim 22; and
a tuner section for receiving television broadcasting.

24. An active matrix substrate comprising:
a scanning signal line;
a data signal line;
a transistor connected with the scanning signal line and the data signal line;
a first pixel electrode; and
a second pixel electrode,
the first and second pixel electrodes being provided in a single pixel region,
the active matrix substrate further comprising:
a first electric conductor electrically connected with the first pixel electrode;
a second electric conductor electrically connected with the second pixel electrode; and
a second capacitor electrode that is provided in a layer in which the scanning signal line is provided and that is electrically connected with the second pixel electrode,
the first pixel electrode being connected with the data signal line via the transistor,
a first capacitor being formed between the first electric conductor and the second capacitor electrode, and
a second capacitor being formed between the second electric conductor and the first pixel electrode.

25. The active matrix substrate according to claim 24, wherein: a third capacitor is formed between the first electric conductor and the second pixel electrode.

26. An active matrix substrate comprising:
a scanning signal line;
a data signal line;
a transistor connected with the scanning signal line and the data signal line;
a first pixel electrode; and
a second pixel electrode,
the first and second pixel electrodes being provided in a single pixel region,
the active matrix substrate further comprising:
a first electric conductor electrically connected with the first pixel electrode;
a second electric conductor electrically connected with the second pixel electrode; and
a first capacitor electrode that is provided in a layer in which the scanning signal line is provided and that is electrically connected with the first pixel electrode,
the first pixel electrode being connected with the data signal line via the transistor,
a first capacitor being formed between the first electric conductor and the second pixel electrode, and
a second capacitor being formed between the second electric conductor and the first capacitor electrode.

27. The active matrix substrate according to claim 26, wherein: a third capacitor is formed between the second electric conductor and the first pixel electrode.

* * * * *